US012578106B2

(12) United States Patent
Chu et al.

(10) Patent No.: US 12,578,106 B2
(45) Date of Patent: Mar. 17, 2026

(54) AIR CLEANER

(71) Applicant: SAMSUNG ELECTRONICS CO., LTD., Suwon-si (KR)

(72) Inventors: Euysung Chu, Suwon-si (KR);
Taeyong Lee, Suwon-si (KR);
Youngseok Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 18/213,976

(22) Filed: Jun. 26, 2023

(65) Prior Publication Data

US 2024/0085040 A1     Mar. 14, 2024

Related U.S. Application Data

(63) Continuation of application No. PCT/KR2023/007736, filed on Jun. 7, 2023.

(30) Foreign Application Priority Data

Sep. 14, 2022     (KR) ........................ 10-2022-0115945

(51) Int. Cl.
| | |
|---|---|
| *B01D 46/00* | (2022.01) |
| *F24F 8/22* | (2021.01) |
| *F24F 13/28* | (2006.01) |

(52) U.S. Cl.
CPC ................ *F24F 8/22* (2021.01); *B01D 46/00* (2013.01); *B01D 46/0027* (2013.01); *F24F 13/28* (2013.01)

(58) Field of Classification Search
CPC ............................ B01D 46/00; B01D 46/0027
See application file for complete search history.

(56) References Cited

U.S. PATENT DOCUMENTS 9,943,794 B2 *   4/2018   Jung ........................ F24F 8/108
10,039,852 B2   8/2018   Yi et al.
(Continued)

FOREIGN PATENT DOCUMENTS

CN        209229905 U   *   8/2019
CN        213955552 U       8/2021
(Continued)

OTHER PUBLICATIONS

PCT/ISA/237 dated Oct. 6, 2023 in International Patent Application No. PCT/KR2023/007736.
(Continued)

*Primary Examiner* — Robert A Hopkins
(74) *Attorney, Agent, or Firm* — STAAS & HALSEY LLP

(57)     ABSTRACT

An air cleaner including a first housing including a first suction port and a first discharge port; a first flow path extending from the first suction port to the first discharge port; a first fan and a dust collector filter in the first flow path; a second housing including a second suction port and a second discharge port; a second flow path extending from the second suction port to the second discharge port; a second fan in the second flow path; a light source in the second flow path to radiate ultraviolet rays; and a connection flow path extending from at least a first portion of the first discharge port to the second suction port and configured so that at least a first portion of air discharged from the first discharge port flows into the connection flow path and to the second flow path through the second suction port.

14 Claims, 20 Drawing Sheets

(56) References Cited

U.S. PATENT DOCUMENTS

| | | |
|---|---|---|
| 11,794,143 B2 | 10/2023 | Han et al. |
| 2016/0271550 A1 | 9/2016 | Law |
| 2019/0078798 A1 | 3/2019 | Son et al. |
| 2019/0184324 A1 | 6/2019 | Lee et al. |
| 2019/0264948 A1 | 8/2019 | Jung et al. |
| 2020/0298161 A1 | 9/2020 | Jeon et al. |
| 2022/0016307 A1 | 1/2022 | Ahn et al. |

FOREIGN PATENT DOCUMENTS

| | | |
|---|---|---|
| JP | 2021-529089 | 10/2021 |
| KR | 10-2006-0105333 | 10/2006 |
| KR | 10-2015-0028163 | 3/2015 |
| KR | 10-2017-008992 | 1/2017 |
| KR | 10-2017-0067627 | 6/2017 |
| KR | 10-2018-0020663 | 2/2018 |
| KR | 10-2019-0101750 | 9/2019 |
| KR | 10-2019-0102538 | 9/2019 |
| KR | 10-2020-0064670 | 6/2020 |
| KR | 10-2020-0112595 | 10/2020 |
| KR | 10-2020-0127456 | 11/2020 |
| KR | 10-2020-0135261 | 12/2020 |
| KR | 10-2220214 | 2/2021 |
| KR | 10-2021-0027851 | 3/2021 |
| KR | 10-2021-0138353 | 11/2021 |
| KR | 10-2022-0052872 | 4/2022 |
| WO | WO 2022/013119 A1 | 1/2022 |

OTHER PUBLICATIONS

PCT/ISA/210 dated Oct. 6, 2023 in International Patent Application No. PCT/KR2023/007736.

Extended European Search Report dated Jul. 28, 2025 for European Application No. 23865655.7.

\* cited by examiner

10

AIR CLEANER

CROSS-REFERENCE TO RELATED APPLICATION(S)

This application is a continuation application, under 35 U.S.C. § 111(a), of international application No. PCT/KR2023/007736, filed on Jun. 7, 2023, which claims priority to Korean Patent Application No. 10-2022-0115945, filed on Sep. 14, 2022 in the Korean Intellectual Property Office, the disclosures of which are incorporated by reference herein in their entireties.

BACKGROUND

1. Field

The present disclosure relates to an air cleaner, and more particularly, to an air cleaner capable of performing a sterilization function.

2. Description of the Related Art

An air cleaner is a device used to remove contaminants from air. The air cleaner may remove odor-causing chemicals such as bacteria, viruses, molds, and particulates present in the suctioned air.

The air cleaner may include a suction port configured to suction contaminated air, a discharge port configured to discharge purified air, and a blower fan configured to cause a flow of air.

A filter configured to purify contaminated indoor air may be provided in the air cleaner. Air suctioned into the air cleaner may be purified into clean air as contaminants are removed from the air while the air passes through the filter, and the purified air may be discharged to the outside of the air cleaner.

An air flow path along which air flows from the suction port toward the discharge port may be formed in the air cleaner. The air flow path of the air cleaner may be provided in various ways according to the purpose of operation of the air cleaner. The shapes, positions, and the like of the suction port and the discharge port may be determined in various ways in consideration of the shape of the air flow path.

SUMMARY

Aspects of embodiments of the disclosure will be set forth in part in the description which follows and, in part, will be apparent from the description, or may be learned by practice of the presented embodiments.

According to an embodiment of the disclosure, an air cleaner may include a first housing including a first suction port and a first discharge port; a first flow path extending from the first suction port to the first discharge port inside the first housing; a first fan in the first flow path and configured to be drivable so that air flows through the first flow path; a dust collector filter in the first flow path; a second housing including a second suction port and a second discharge port; a second flow path extending from the second suction port to the second discharge port inside the second housing; a second fan in the second flow path and configured to be drivable so that air flows through the second flow path; a light source in the second flow path and to radiate ultraviolet rays; and a connection flow path extending from at least a first portion of the first discharge port to the second suction port and configured so that, at least a first portion of air discharged from the first discharge port is introduced into the connection flow path and flows to the second flow path through the second suction port.

According to an embodiment of the disclosure, a second portion of the air discharged from the first discharge port may be discharged to an outside of the air cleaner.

According to an embodiment of the disclosure, the air cleaner may further include a discharge flow path guide configured to guide a flow of the second portion of the air discharged from the first discharge port; a guide opening formed between an outer edge of the discharge flow path guide and an outer edge of the first discharge port; and a discharge flow path configured to have one side covered by the discharge flow path guide, and to extend from at least a second portion of the first discharge port toward the guide opening.

According to an embodiment of the disclosure, the discharge flow path may be formed in a direction outward from an edge of the connection flow path.

According to an embodiment of the disclosure, the discharge flow path guide may be arranged to face the first discharge port.

According to an embodiment of the disclosure, the air cleaner may further include an intermediate duct configured to connect the first housing and the second housing, wherein the connection flow path may be inside the intermediate duct.

According to an embodiment of the disclosure, the intermediate duct may be configured to cover the second suction port and the at least first portion of the first discharge port.

According to an embodiment of the disclosure, the first housing may include a discharge port cover configured to cover the first discharge port, the discharge port cover may include a central portion, and an edge grille positioned along an outer edge of the central portion, and including a penetrated shape, and the central portion may include a guide portion configured to extend from the edge grille toward the connection flow path to guide air from the edge grille to the connection flow path.

According to an embodiment of the disclosure, the connection flow path and the second flow path may be connected in a first direction, and the second fan may have a rotating shaft arranged to be parallel to a second direction orthogonal to the first direction.

According to an embodiment of the disclosure, the second fan may be configured so that air is discharged toward the light source in a direction orthogonal to the second direction.

According to an embodiment of the disclosure, the light source may extend in a first direction, the second flow path may include a radiation area to which ultraviolet rays are radiated from the light source and which extends in the first direction to correspond to the light source, and the air cleaner may further include a reflective cover configured to extend in the first direction to correspond to the radiation area, and configured about the light source to reflect the ultraviolet rays radiated from the light source.

According to an embodiment of the disclosure, the air cleaner may further include a light blocking member positioned at one side of the radiation area in the first direction in the second flow path, and configured to prevent the ultraviolet rays radiated from the light source from being incident on an outside of the radiation area.

According to an embodiment of the disclosure, the light blocking member may include a plurality of grille portions, and an air ventilation portion formed between the grille portions of the plurality of grille portions and configured to be penetrated to allow passage of air in the second flow path, and each of the grille portions of the plurality of grille portions may be formed so that a surface facing the grille portion adjacent thereto is inclined relative to the first direction.

According to an embodiment of the disclosure, the light source may include a lamp body configured to extend in the first direction, and an electrode portion provided at an end of the lamp body in the first direction and configured to receive power applied thereto, and the light blocking member may support the electrode portion.

According to an embodiment of the disclosure, the first flow path may be configured so that, in a state in which the first fan is driven, air introduced from the first suction port flows in an up-down direction to be discharged to the first discharge port; the second flow path may be configured so that, in a state in which the second fan is driven, air introduced from the second suction port flows in the up-down direction to be discharged to the second discharge port; and the connection flow path may be configured so that, in a state in which the first fan and the second fan are simultaneously driven, the at least first portion of the air discharged from the first discharge port flows in the up-down direction to be introduced into the second suction port.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
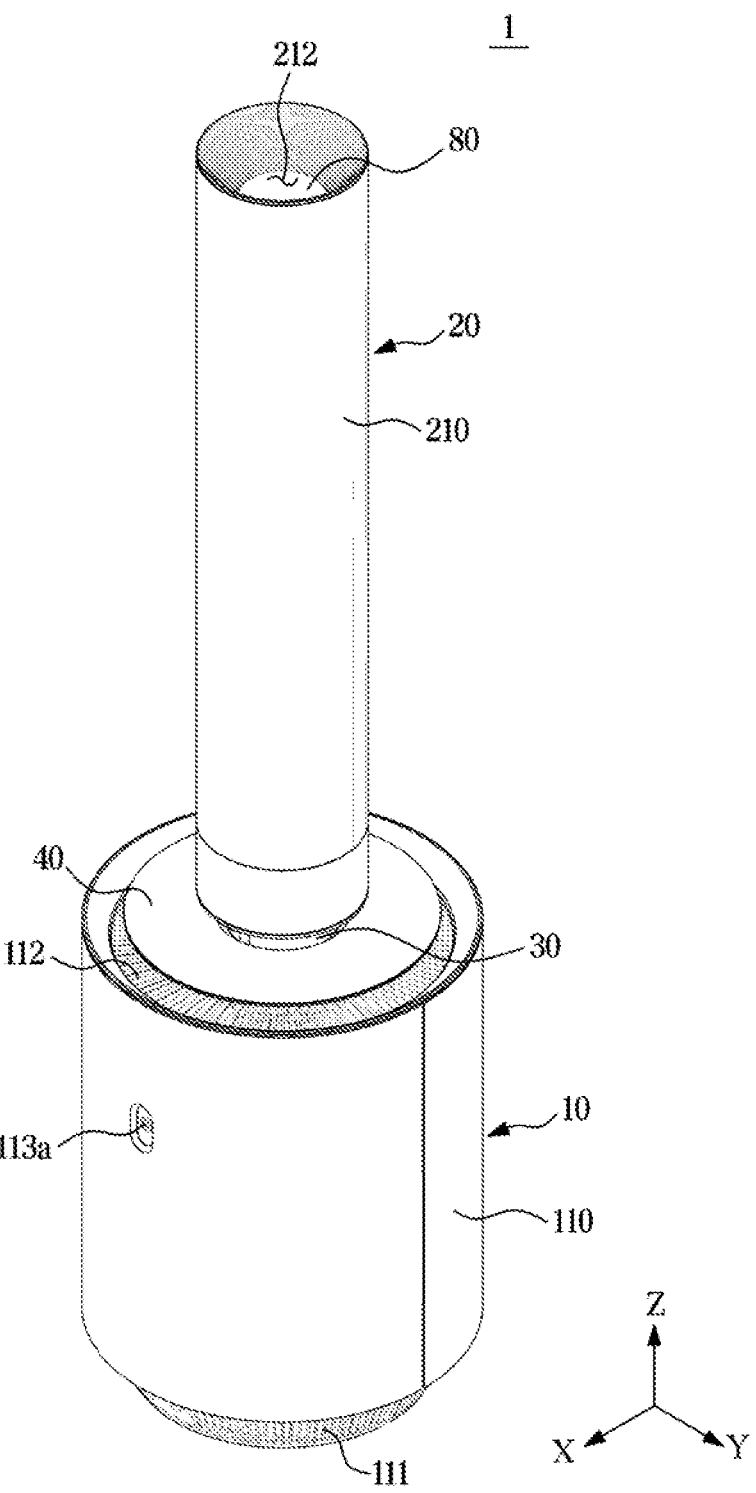
FIG. 1 is a perspective view of an air cleaner according to one embodiment of the present disclosure.

Embodiments described herein and configurations illustrated in the drawings are merely exemplary embodiments of the present disclosure, and various modifications which may replace the embodiments and the drawings herein may be present at the time of filing this application.

Also, like reference numerals or symbols presented in the drawings of the application indicate parts or elements that perform substantially the same functions.

Also, terms used herein are for describing the embodiments and are not intended to limit and/or restrict the disclosure. A singular expression includes a plural expression unless context clearly indicates otherwise. In the application, terms such as "include" or "have" are for designating that features, numbers, steps, operations, elements, parts, or combinations thereof are present, and do not preclude the possibility of presence or addition of one or more other features, numbers, steps, operations, elements, parts, or combinations thereof in advance.

Also, terms including ordinals such as "first" and "second" used herein may be used to describe various elements, but the elements are not limited by the terms, and the terms are only used for the purpose of distinguishing one element from another element. For example, a first element may be referred to as a second element while not departing from the scope of rights of the present disclosure, and likewise, a second element may also be referred to as a first element. The term "and/or" includes a combination of a plurality of associated listed items or any one item among the plurality of associated listed items.

Meanwhile, terms such as "up-down direction," "height direction," and "vertical direction" used in the following description indicate the Z-axis direction based on a perspective view of an air cleaner of FIG. 1, the term "horizontal direction" indicates the X-axis direction or Y-axis direction based on the perspective view of FIG. 1 and may indicate any direction along the X-Y plane, and the shape and position of each element are not limited by the terms.

The terms "portion," "module," "member," and "block" used herein may be implemented using software or hardware, and according to embodiments, a plurality of "portions," "modules," "members," or "blocks" may be implemented as a single element, or a single "portion," "module," "member," or "block" may include a plurality of elements.

Throughout the specification, when a certain portion is described as being "connected" to another portion, this includes a case in which the certain portion is indirectly connected to the other portion as well as a case in which the certain portion is directly connected to the other portion, and the indirect connection includes connection through a wireless network.

Embodiments of the disclosure may provide an air cleaner having an improved structure to improve air purification efficiency.

Embodiments of the disclosure may provide an air cleaner having an improved structure so that an air flow path can be configured in various ways.

Embodiments of the disclosure may provide an air cleaner having an improved structure so that, in an air cleaner including a plurality of air cleaning units, operations of the plurality of air cleaning units can be selectively controlled.

Hereinafter, embodiments according to the present disclosure will be described in detail with reference to the accompanying drawings.

Figure 2:
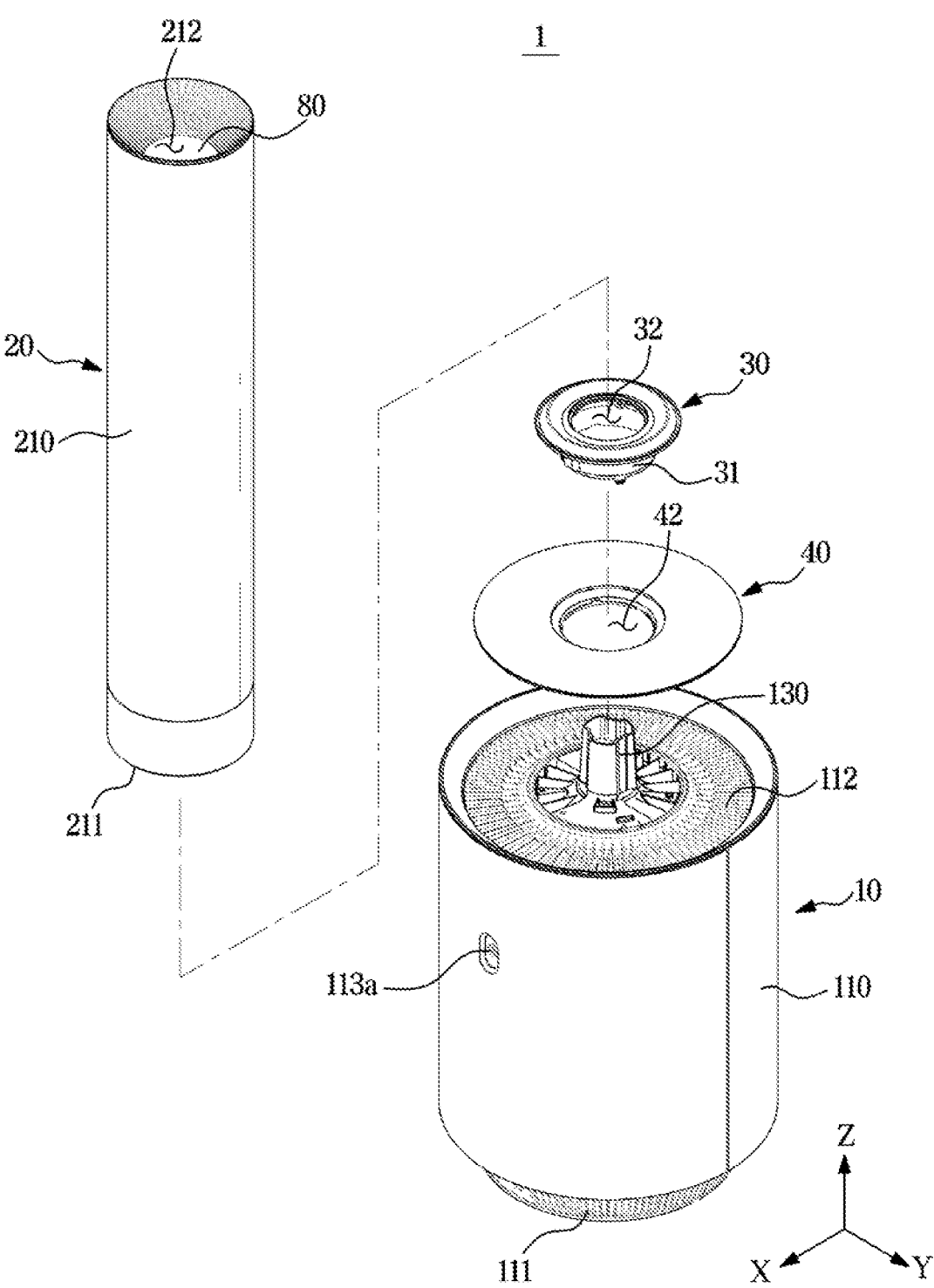
FIG. 2 is an exploded view of a partial configuration of the air cleaner according to one embodiment of the present disclosure.

FIG. 1 is a perspective view of an air cleaner according to one embodiment of the present disclosure. FIG. 2 is an exploded view of a partial configuration of the air cleaner according to one embodiment of the present disclosure Referring to FIGS. 1 and 2, an air cleaner 1 according to one embodiment of the present disclosure may include a first air cleaning unit 10 and a second air cleaning unit 20.

The first air cleaning unit 10 may be configured to purify air introduced from an outside and discharge the purified air back to the outside.

The first air cleaning unit 10 may include a first suction port 111, a first discharge port 112, and a first fan 150. The first air cleaning unit 10 may include a first flow path P1 provided between the first suction port 111 and the first discharge port 112. More specifically, the first flow path P1 may extend from the first suction port 111 to the first discharge port 112. In a case in which the first fan 150 is driven, air may be introduced through the first suction port 111, flow along the first flow path P1, and be discharged through the first discharge port 112 (see FIG. 5 and so on).

Air flowing along the first flow path P1 in the first air cleaning unit 10 may be purified and discharged to the first discharge port 112. For example, the first air cleaning unit 10 may include a dust collector filter 140 (see FIG. 4 and so on). The dust collector filter 140 may be provided in the first flow path P1. The dust collector filter 140 may be provided to collect foreign matter from air introduced through the first suction port 111. Foreign matter such as dust and organic matter including bacteria and viruses in the air flowing along the first flow path P1 may be removed from the air by the dust collector filter 140.

A detailed configuration of the first air cleaning unit 10 will be described below.

The second air cleaning unit 20 may be configured to purify air introduced from the outside and discharge the purified air back to the outside.

The second air cleaning unit 20 may include a second suction port 211, a second discharge port 212, and a second fan 250. The second air cleaning unit 20 may include a second flow path P2 provided between the second suction port 211 and the second discharge port 212. More specifically, the second flow path P2 may extend from the second suction port 211 to the second discharge port 212. In a case in which the second fan 250 is driven, air may be introduced through the second suction port 211, flow along the second flow path P2, and be discharged through the second discharge port 212 (see FIG. 9 and so on).

Air flowing along the second flow path P2 in the second air cleaning unit 20 may be purified and discharged to the second discharge port 212. For example, the second air cleaning unit 20 may include a light source 240 (see FIG. 7 and so on). The light source 240 may be provided in the second flow path P2. The light source 240 may be provided to radiate ultraviolet rays to air introduced through the second suction port 211. Organic matter such as bacteria and viruses in the air flowing along the second flow path P2 may be removed from the air by the ultraviolet rays emitted from the light source 240.

A detailed configuration of the second air cleaning unit 20 will be described below.

The first air cleaning unit 10 may be disposed to support the second air cleaning unit 20. Specifically, the first air cleaning unit 10 may support a lower portion of the second air cleaning unit 20. The second air cleaning unit 20 may be disposed to be seated on an upper side of the first air cleaning unit 10 and may be supported by the first air cleaning unit 10. The first air cleaning unit 10 and the second air cleaning unit 20 may be disposed in the up-down direction, and the second air cleaning unit 20 may be supported in a direction facing upward by the first air cleaning unit 10. In this respect, the first air cleaning unit 10 may also be referred to as a "lower air cleaning unit," and the second air cleaning unit 20 may also be referred to as an "upper air cleaning unit."

However, the present disclosure is not limited thereto, and for example, the first air cleaning unit 10 and the second air cleaning unit 20 may each be provided to have a lower portion supported by the ground.

The first air cleaning unit 10 and the second air cleaning unit 20 may be coupled to each other. The first air cleaning unit 10 and the second air cleaning unit 20 may be coupled so that the first flow path P1 and the second flow path P2 are connected to each other. In other words, the inside of the first air cleaning unit 10 and the inside of the second air cleaning unit 20 may communicate with each other.

The second air cleaning unit 20 may be coupled to the first air cleaning unit 10 so that the second suction port 211 faces the first discharge port 112 of the first air cleaning unit 10.

For example, as illustrated in FIG. 1, the second air cleaning unit 20 may be coupled to an upper portion of the first air cleaning unit 10. More specifically, the first discharge port 112 may be provided at the upper portion of the first air cleaning unit 10. The second suction port 211 may be provided at the lower portion of the second air cleaning unit 20. The first air cleaning unit 10 and the second air cleaning unit 20 may be coupled to each other in the up-down direction, and the first discharge port 112 provided at the upper portion of the first air cleaning unit 10 and the second suction port 211 provided at the lower portion of the second air cleaning unit 20 may be disposed to face each other in the up-down direction.

Unlike in FIG. 1 and so on, for example, the first air cleaning unit 10 and the second air cleaning unit 20 may be coupled to each other in a direction horizontal to the ground. Here, the first discharge port 112 of the first air cleaning unit 10 and the second suction port 211 of the second air cleaning unit 20 may be disposed to face each other in the direction horizontal to the ground.

Hereinafter, for convenience of description, description will be given on the basis of an embodiment in which the second air cleaning unit 20 is coupled to the upper portion of the first air cleaning unit 10 as illustrated in FIG. 1.

A specific configuration in which the first air cleaning unit 10 and the second air cleaning unit 20 are coupled to each other will be described below.

The air cleaner 1 may include an intermediate duct 30. The intermediate duct 30 may be provided between a first housing 110 of the first air cleaning unit 10 and a second housing 210 of the second air cleaning unit 20. The intermediate duct 30 may connect the first housing 110 of the first air cleaning unit 10 and the second housing 210 of the second air cleaning unit 20.

The intermediate duct 30 may communicate with each of the first discharge port 112 and the second suction port 211. The intermediate duct 30 may be provided so that at least one portion of air discharged from the first discharge port 112 is introduced into the second suction port 211.

The air cleaner 1 may include a connection flow path CP (see FIG. 11 and so on) provided inside the intermediate duct 30. The connection flow path CP may be provided to connect the first flow path P1 and the second flow path P2. The connection flow path CP may be provided between the first flow path P1 and the second flow path P2. The connection flow path CP may be provided to be branched from the first flow path P1 and connect the first flow path P1 and the second flow path P2. An area in which the connection flow path CP is branched from the first flow path P1 may be positioned adjacent to the first discharge port 112.

In other words, the second flow path P2 may extend from the connection flow path CP branched from the first flow path P1. Accordingly, the second flow path P2 may also be referred to as being formed to be branched from the first flow path P1.

The connection flow path CP may be provided so that at least one portion of air discharged from the first discharge port 112 is introduced into the second suction port 211. For example, the connection flow path CP may be provided between at least one portion of the first discharge port 112 and the second suction port 211. In other words, the connection flow path CP may be provided to extend from at least one portion of the first discharge port 112 to the second suction port 211. For example, while the second fan 250 is driven, air in the first flow path P1 may flow along the connection flow path CP and be introduced into the second flow path P2. In other words, the connection flow path CP may be provided so that at least one portion of air discharged from the first discharge port 112 is introduced into the connection flow path CP and flows to the second flow path P2 through the second suction port 211.

Detailed configurations of the intermediate duct 30, the connection flow path CP, and the like will be described below.

Figure 5:
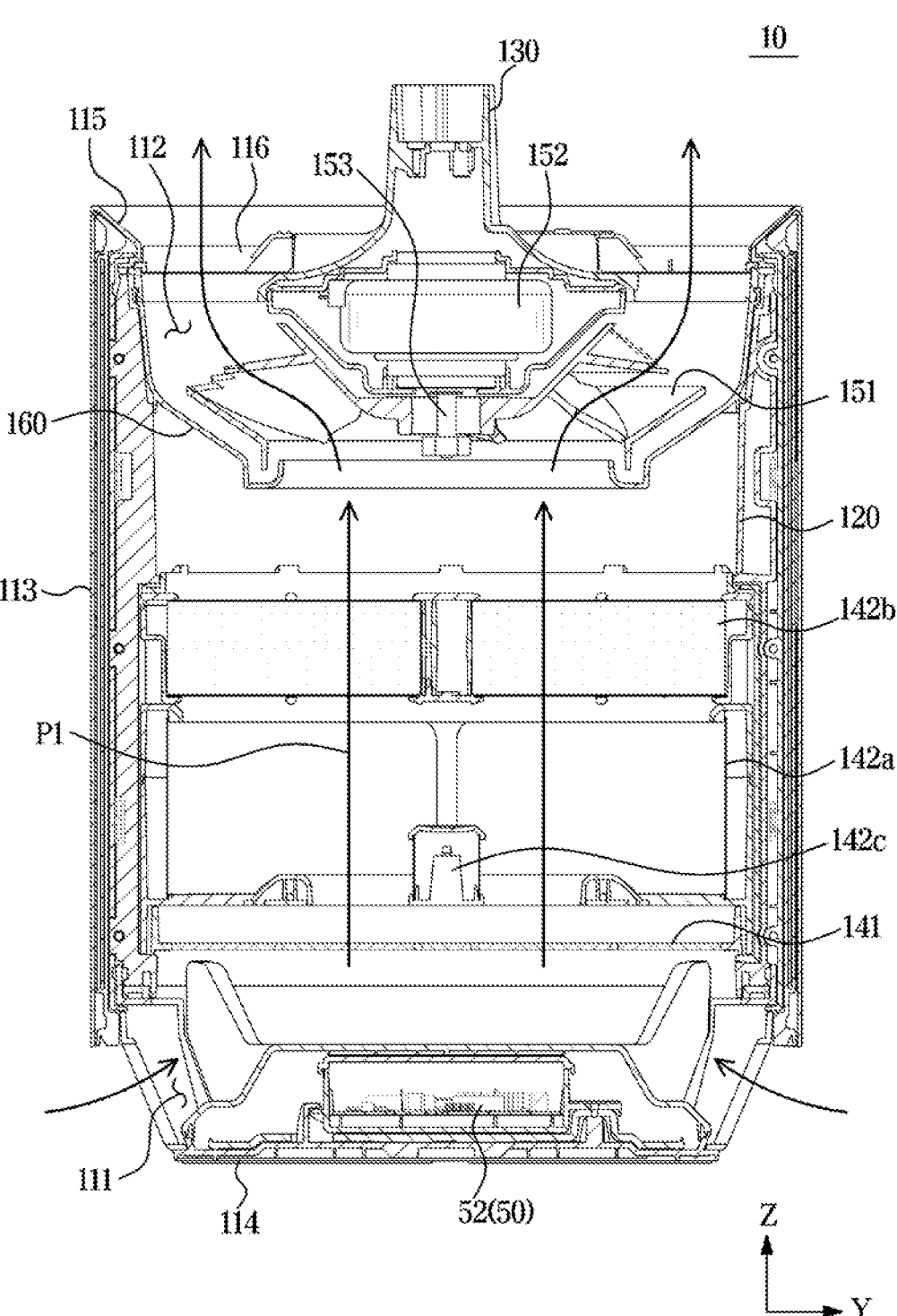
FIG. 5 is a lateral cross-sectional view of the first air cleaning unit of the air cleaner according to one embodiment of the present disclosure.

The air cleaner 1 may include a discharge flow path DP (see FIG. 5 and so on). The discharge flow path DP may be provided so that air in the first flow path P1 is discharged to the outside of the air cleaner 1 through the first discharge port 112. The discharge flow path DP may extend from the first flow path P1 and, more specifically, extend from the first discharge port 112 formed at one end of the first flow path P1. For example, while the first fan 150 is driven, air flowing along the first flow path P1 may be discharged to the outside of the first air cleaning unit 10 and the second air cleaning unit 20 along the discharge flow path DP.

Figure 3:
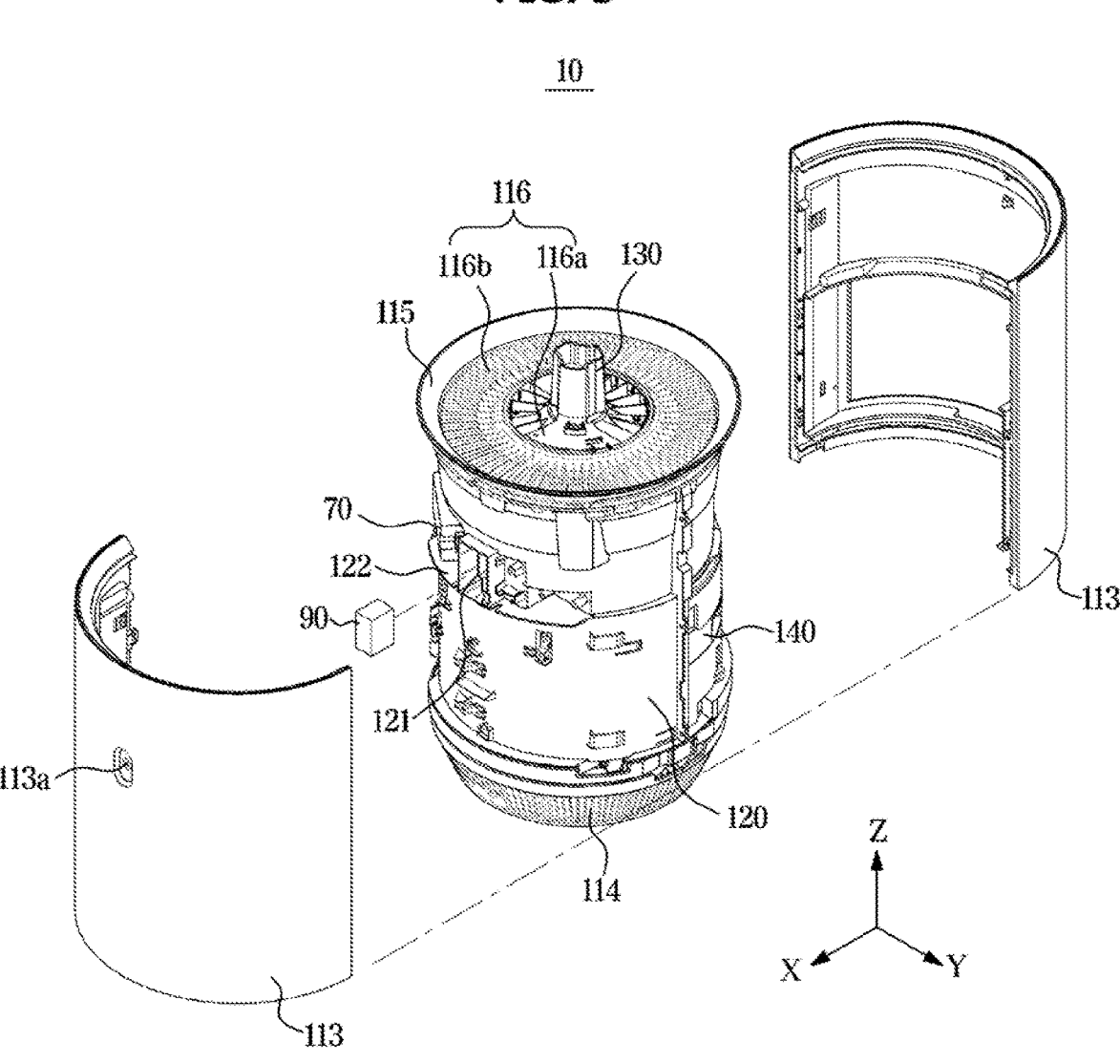
FIG. 3 is an exploded view of a partial configuration of a first air cleaning unit of the air cleaner according to one embodiment of the present disclosure.
Figure 4:
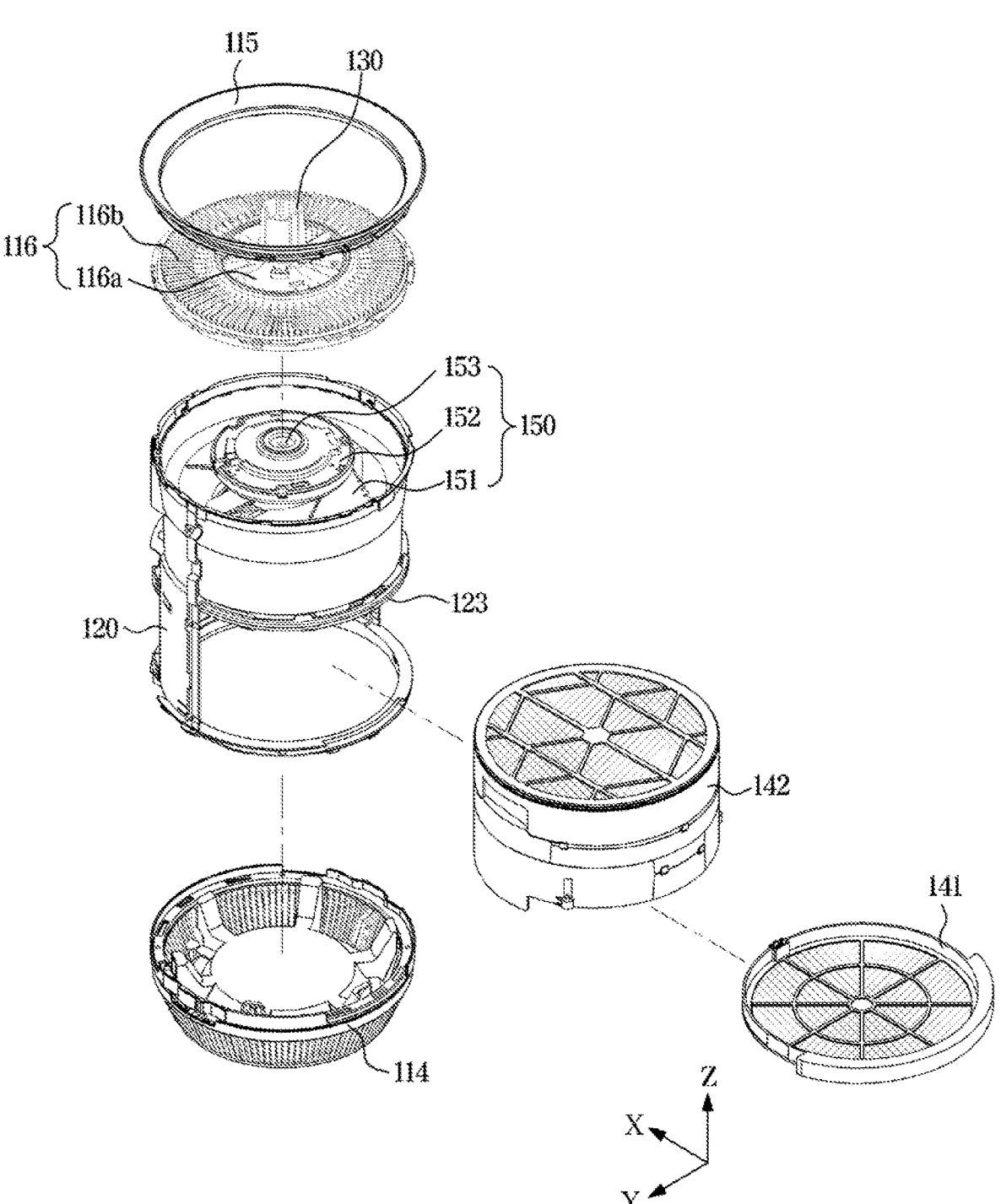
FIG. 4 is an exploded view of a partial configuration of the first air cleaning unit of the air cleaner according to one embodiment of the present disclosure.

The air cleaner 1 may include a discharge flow path guide 40. The discharge flow path guide 40 may be provided to guide a flow of air in the discharge flow path DP. While the first fan 150 and the second fan 250 are simultaneously driven, the discharge flow path guide 40 may guide at least another portion of air discharged through the first discharge port 112, excluding the portion of the air introduced into the second flow path P2 through the connection flow path CP, to flow along the discharge flow path DP. For example, the discharge flow path guide 40 may cover at least one portion of the first discharge port 112 from outside the first discharge port 112. As illustrated in FIGS. 3 to 5, the discharge flow path guide 40 may cover at least one portion of the first discharge port 112 from above the first discharge port 112.

The discharge flow path DP may be formed by the discharge flow path guide 40. More specifically, the discharge flow path DP may have one side covered by the discharge flow path guide 40 and may extend from at least one portion of the first discharge port 112 toward a guide opening OP (see FIG. 11) which will be described below. In other words, the discharge flow path DP may be formed between a first discharge port cover 116, which will be described below, and the discharge flow path guide 40.

However, the present disclosure is not limited thereto, and the discharge flow path guide 40 configured to guide the discharge flow path DP may not be provided in the air cleaner 1. Even when a separate discharge flow path guide is not provided, the discharge flow path DP may be provided to extend from the first flow path P1 so that air in the first flow path P1 is discharged to the outside of the first air cleaning unit 10 and the second air cleaning unit 20.

Detailed configurations of the discharge flow path guide 40, the discharge flow path DP, and the like will be described below.

FIG. 3 is an exploded view of a partial configuration of the first air cleaning unit of the air cleaner according to one embodiment of the present disclosure. FIG. 4 is an exploded view of a partial configuration of the first air cleaning unit of the air cleaner according to one embodiment of the present disclosure. FIG. 5 is a lateral cross-sectional view of the first air cleaning unit of the air cleaner according to one embodiment of the present disclosure.

Referring to FIGS. 3 to 5, the first air cleaning unit 10 may include the first housing 110 configured to have the first flow path P1 provided therein. The first housing 110 may form an exterior of the first air cleaning unit 10. The first housing 110 may be configured to accommodate various components of the first air cleaning unit 10.

The first housing 110 may include the first suction port 111 and the first discharge port 112. The first suction port 111 may be provided so that air outside the first housing 110 is introduced into the first housing 110. The first discharge port 112 may be provided so that air inside the first housing 110 is discharged to the outside of the first housing 110. While the first fan 150 is driven, due to pressure generated by the first fan 150, air outside the first housing 110 may be suctioned into the first housing 110 through the first suction port 111, and air inside the first housing 110 may be discharged to the outside of the first housing 110 through the first discharge port 112.

The first air cleaning unit 10 may include the first flow path P1 provided between the first suction port 111 and the first discharge port 112 inside the first housing 110. In other words, the first flow path P1 may extend from the first suction port 111 to the first discharge port 112. While the first fan 150 is driven, air suctioned into the first housing 110 through the first suction port 111 may flow along the first flow path P1 and may be discharged to the outside of the first housing 110 through the first discharge port 112. In other words, the first suction port 111 may be provided at one end of the first flow path P1, and the first discharge port 112 may be provided at the other end of the first flow path P1.

For example, the first suction port 111 may be formed at a lower portion of the first housing 110. For example, the first discharge port 112 may be formed at an upper portion of the first housing 110. For example, the first flow path P1 may be formed to have a shape the extends in the up-down direction. Accordingly, air introduced into the first housing 110 through the first suction port 111 may flow upward along the first flow path P1.

However, the present disclosure is not limited thereto, and the first suction port 111 and the first discharge port 112 may be formed at various other positions of the first housing 110. Corresponding thereto, the first flow path P1 provided between the first suction port 111 and the first discharge port 112 may extend in various directions.

The first housing 110 may include a first housing body 113, a base 114, a first upper cover 115, and the first discharge port cover 116. The first housing body 113, the base 114, the first upper cover 115, and the first discharge port cover 116 may each constitute a portion of the exterior of the first air cleaning unit 10.

The first housing body 113 may form a side surface of the first air cleaning unit 10 in the horizontal direction. The first housing body 113 may be provided to cover various components of the first air cleaning unit 10 in the horizontal direction. The first housing body 113 may connect the base 114 and the first upper cover 115.

The first housing body 113 may cover the first flow path P1 from outside the first flow path P1 in a radial direction. For example, the first flow path P1 may be formed between the base 114 and the first discharge port cover 116, and the first housing body 113 may cover the first flow path P1 from beside the first flow path P1 in the horizontal direction.

The first housing body 113 may extend in a direction parallel to the first flow path P1. For example, the first housing body 113 may extend in the up-down direction.

The first housing body 113 may be formed in a substantially hollow cylindrical shape. A space formed inside the first housing body 113 may be formed to have a substantially cylindrical shape. However, the present disclosure is not limited thereto, and the first housing body 113 may be formed to have various other shapes according to the outer shape of the first air cleaning unit 10.

The first housing body 113 may be formed to be divided into a plurality of panels as illustrated in FIG. 3. The plurality of panels constituting the first housing body 113 may be formed to constitute the first housing body 113 in a state in which the plurality of panels are coupled to each other. Accordingly, it may become easy to disassemble or assemble the first housing body 113, and ease of access to an internal configuration of the first housing 110 by a user may be improved. However, the present disclosure is not limited thereto, and the first housing body 113 may be a single configuration formed as one body.

The first housing body 113 may include a sensing hole 113*a* formed so that a sensor 90, which will be described below, communicates with the outside of the first housing 110. The sensing hole 113*a* may be formed at a position corresponding to the sensor 90. The sensor 90 may detect outside air introduced through the sensing hole 113*a*.

The base 114 may be provided at the lower portion of the first housing 110. The base 114 may form a bottom surface of the first air cleaning unit 10. While the first air cleaning unit 10 is placed on the ground, the base 114 may be provided to support the first air cleaning unit 10. Further, in a case in which the second air cleaning unit 20 is coupled to the upper portion of the first air cleaning unit 10, the base 114 may be provided to support the second air cleaning unit 20 as well as the first air cleaning unit 10. That is, the base 114 may be provided to support the air cleaner 1 in the up-down direction. The base 114 may be coupled to a lower portion of the first housing body 113.

As illustrated in FIGS. 3 to 5, the base 114 may be formed in a shape having a bottom surface for coming in contact with the ground in the vertical direction and a side surface which is formed along the circumference of the bottom surface of the base 114 and extends after being bent from the bottom surface. The bottom surface of the base 114 may extend in the horizontal direction. The side surface of the base 114 may be formed in the circumferential direction of the base 114. The side surface of the base 114 may extend from the bottom surface of the base 114 in the vertical direction or a direction having a predetermined angle relative to the vertical direction.

The first suction port 111 may be formed in the base 114. The first suction port 111 may be formed in the side surface of the base 114. The first suction port 111 may be disposed along the circumference of the base 114. In other words, the first suction port 111 may be disposed along the circumference of the bottom surface of the base 114. In this case, the side surface of the base 114 may be formed to include the shape of a grille to allow air to enter and exit through the first suction port 111.

However, the present disclosure is not limited thereto, and the first suction port 111 may be formed at various other positions. For example, the first suction port 111 may be formed in the side surface of the base 114 but may be formed only in a portion of the side surface instead of being formed along the circumference of the side surface. For example, the first suction port 111 may be formed to face only one direction in the side surface of the base 114. For example, the first suction port 111 may be formed at various positions of the first housing 110 such as the lower portion of the first housing body 113, other than the base 114.

The first upper cover 115 and the first discharge port cover 116 may be provided at the upper portion of the first housing 110. The first upper cover 115 and the first discharge port cover 116 may form an upper surface of the first air cleaning unit 10. The first upper cover 115 and the first discharge port cover 116 may be formed to cover a space inside the first housing 110 from above the space. The first upper cover 115 may form one portion of an upper surface of the first housing 110, and the first discharge port cover 116 may form another portion of the upper surface of the first housing 110.

The first discharge port 112 may be formed in the upper surface of the first housing 110. The first discharge port cover 116 may be provided to cover the first discharge port 112.

The first discharge port cover 116 may be formed to include the shape of a grille to allow air to enter and exit through the first discharge port 112. For example, the shape of the grille of the first discharge port cover 116 may be disposed along the circumference of the upper surface of the first housing 110. Alternatively, for example, the shape of the grille of the first discharge port cover 116 may be formed only in one portion of the upper surface of the first housing 110.

The first upper cover 115 may be disposed along the circumference of the first discharge port cover 116. In other words, the first upper cover 115 may be coupled to an edge of the first discharge port cover 116. The first upper cover 115 may be disposed outside the edge of the first discharge port cover 116.

The first upper cover 115 may have a shape that extends in a direction inclined relative to the horizontal direction. For example, as illustrated in FIGS. 3 to 5, the first upper cover 115 may extend to be inclined upward from the edge of the first discharge port cover 116 toward the outside of the edge. A flow direction of air flowing along the discharge flow path DP of air discharged through the first discharge port 112 may be guided by the first upper cover 115.

However, the present disclosure is not limited thereto, and the first upper cover 115 and the first discharge port cover 116 described above are only one example of a configuration forming the upper portion of the first housing 110.

Also, different from the above description, the first discharge port 112 may be formed at various other positions of the first housing 110 such as an upper portion of the first housing body 113.

Unlike in FIGS. 3 to 5, at least some of the first housing body 113, the base 114, the first upper cover 115, and the first discharge port cover 116, which constitute the first housing 110, may be integrally formed with each other. For example, the first upper cover 115 and the first discharge port cover 116 may be integrally formed with each other.

The first housing 110 described above is only one example of a configuration forming the exterior of the first air cleaning unit 10 and having the first flow path P1 provided therein, and the spirit of the present disclosure is not limited thereto.

The first air cleaning unit 10 may include a first inner frame 120. The first inner frame 120 may be disposed inside the first housing 110. The first inner frame 120 may be coupled to an inner surface of the first housing 110. The first inner frame 120 may support the inner surface of the first housing 110.

The first inner frame 120 may be provided to support various components of the first air cleaning unit 10. The components of the first air cleaning unit 10, such as a power supply 70, the sensor 90, the dust collector filter 140, and the first fan 150, may be supported by the first inner frame 120.

The first inner frame 120 may be covered by the first housing 110. For example, a side of the first inner frame 120 may be covered by the first housing body 113 in the horizontal direction. A bottom of the first inner frame 120 may be covered by the base 114 in the vertical direction. A top of the first inner frame 120 may be covered by the first upper cover 115 and the first discharge port cover 116 in the vertical direction.

The first inner frame 120 may be formed to be divided into a plurality of frames as illustrated in FIGS. 3, 4, and so on. The plurality of frames constituting the first inner frame 120 may be formed to constitute the first inner frame 120 in a state in which the plurality of frames are coupled to each other. Accordingly, it may become easy to disassemble or assemble the first inner frame 120, and ease of access to an internal configuration of the first inner frame 120 by a user may be improved. However, the present disclosure is not limited thereto, and the first inner frame 120 may be a single configuration formed as one body.

A space having a substantially cylindrical shape may be formed inside the first inner frame 120. The dust collector filter 140, the first fan 150, and the like may be disposed in the space inside the first inner frame 120. The first flow path P1 may be provided in the space inside the first inner frame 120. The first inner frame 120 may cover an outer side of the first flow path P1.

However, the present disclosure is not limited thereto, and the first inner frame 120 may be formed to have various other shapes. For example, the space formed inside the first inner frame 120 may have a shape other than the cylindrical shape. Alternatively, for example, the first inner frame 120 may be provided to support various components of the first air cleaning unit 10 without forming the space therein or covering the outer side of the first flow path P1.

The first inner frame 120 described above is only one example of a configuration provided to support various components of the first air cleaning unit 10, and the spirit of the present disclosure is not limited thereto.

The first air cleaning unit 10 may include a first unit coupler 130 provided to be coupled to the second air cleaning unit 20. The first unit coupler 130 may be provided to be coupled to a second unit coupler 230, which will be described below, so that the first air cleaning unit 10 and the second air cleaning unit 20 are coupled to each other. For example, the first unit coupler 130 and the second unit coupler 230 may be fastened by a screw (not illustrated) in a state in which the first unit coupler 130 and the second unit coupler 230 are engaged with each other.

For example, the first unit coupler 130 may be disposed at the upper portion of the first air cleaning unit 10. For example, the first unit coupler 130 may have a shape that extends upward from the upper portion of the first housing 110. For example, the first unit coupler 130 may extend upward from the first discharge port cover 116 and, further, may be integrally formed with the first discharge port cover 116.

However, the present disclosure is not limited thereto, and the first air cleaning unit 10 may include various other configurations provided to be coupled to the second air cleaning unit 20.

The first air cleaning unit 10 may include the first fan 150. The first fan 150 may be provided in the first flow path P1. The first fan 150 may be disposed between the first suction port 111 and the first discharge port 112. The first fan 150 may generate a suction force by rotating, and air outside the first air cleaning unit 10 may be suctioned into the first suction port 111 due to the suction force of the first fan 150. The air suctioned into the first suction port 111 may flow along the first flow path P1 and be discharged to the first discharge port 112.

The first fan 150 may include a first blade 151, a first motor 152 configured to supply power to the first blade 151, and a first fan rotating shaft 153 connected to the first blade 151 and the first motor 152 to transmit power generated by the first motor 152 to the first blade 151.

The first fan 150 may be configured to various types of fans. For example, the first fan 150 may be configured as an axial fan. Alternatively, for example, the first fan 150 may be configured as a centrifugal fan.

The first fan 150 may be disposed between the dust collector filter 140, which will be described below, and the first discharge port 112. While the first fan 150 is driven, air suctioned into the first suction port 111 may sequentially pass through the dust collector filter 140 and the first fan 150 and be discharged through the first discharge port 112.

However, the present disclosure is not limited thereto, and for example, the first fan 150 may be disposed between the dust collector filter 140 and the first suction port 111.

The first air cleaning unit 10 may include a first fan support frame 160. The first fan 150 may be supported by the first fan support frame 160.

More specifically, the first fan support frame 160 may support the first motor 152. The first motor 152 may be fixed to the first fan support frame 160. The first blade 151 of the first fan 150 is provided to be rotatable about the first fan rotating shaft 153 relative to the first motor 152 and thus may be provided to be rotatable relative to the first fan support frame 160. In other words, the first blade 151 may be rotatably supported by the first fan support frame 160.

An opening through which the first flow path P1 passes may be formed in the first fan support frame 160. As the first fan 150 is driven, air may pass through the opening of the first fan support frame 160 and flow. For example, in a case in which the first fan 150 is an axial fan, a plurality of openings disposed to oppose each other may be formed in the first fan support frame 160.

The first fan support frame 160 may be supported by the first inner frame 120. The first fan support frame 160 may be coupled to the first inner frame 120. For example, the first fan support frame 160 may be disposed inside the first inner frame 120 and may be coupled to an inner surface of the first inner frame 120.

However, the present disclosure is not limited thereto, and the first fan 150 may be supported by various other configurations.

The first fan 150 described above is only one example of a configuration generating pressure to allow air to flow along the first flow path P1 of the first air cleaning unit 10, and the spirit of the present disclosure is not limited thereto.

The first air cleaning unit 10 may include the dust collector filter 140 provided in the first flow path P1. While the first fan 150 is driven, air introduced through the first suction port 111 may flow along the first flow path P1 and pass through the dust collector filter 140. By the dust collector filter 140, foreign matter may be removed from the air flowing along the first flow path P1. Air purified as foreign matter is removed from the air by the dust collector filter 140 may be discharged through the first discharge port 112.

The dust collector filter 140 may be provided to collect foreign matter from air introduced through the first suction port 111. Foreign matter such as dust and organic matter including bacteria and viruses in the air flowing along the first flow path P1 may be removed from the air by the dust collector filter 140.

The dust collector filter 140 may be mounted on the first inner frame 120. For example, the dust collector filter 140 may be mounted inside the first inner frame 120. The dust collector filter 140 may be mounted on the inner surface of the first inner frame 120 in order to be disposed in the first flow path P1.

The dust collector filter 140 may have an outer peripheral surface formed to come in contact with an inner peripheral surface of the first inner frame 120. The dust collector filter 140 may be provided to substantially fully cover a transverse cross-section of the first flow path P1. Even in this case, since the dust collector filter 140 is configured to allow passage of air, air flowing along the first flow path P1 may pass through the dust collector filter 140. Further, since the dust collector filter 140 is provided so that, while the first fan 150 is driven, most of the air flowing along the first flow path P1 passes through the dust collector filter 140, efficiency of purifying the air of the first flow path P1 may be improved.

The dust collector filter 140 may be detachably mounted on the first inner frame 120. For example, the first inner frame 120 may include a dust collector filter mounting opening 123 formed so that the dust collector filter 140 is able to be inserted into or withdrawn from the inside of the first inner frame 120. The inside of the first inner frame 120 may be open through the dust collector filter mounting opening 123.

For example, the dust collector filter mounting opening 123 may be formed at one side of the first inner frame 120. The dust collector filter 140 may be inserted and mounted at the one side of the first inner frame 120 or may be withdrawn and detached at the one side of the first inner frame 120.

By such a configuration, a user may easily detach or assemble the dust collector filter 140 from or to the first inner frame 120, and repair, replacement, cleaning, or the like of the dust collector filter 140 may be facilitated.

However, the present disclosure is not limited thereto, and the dust collector filter 140 may be mounted on the first inner frame 120 in various other ways. Alternatively, the dust collector filter 140 may be supported by various other configurations in order to be disposed in the first flow path P1.

The dust collector filter 140 may include a pre-filter 141. The pre-filter 141 may be provided in the first flow path P1. The pre-filter 141 may be provided to primarily collect foreign matter from air suctioned into the first suction port 111. The pre-filter 141 may be provided to separate relatively large foreign matter from the air.

The dust collector filter 140 may include an electrostatic dust filter 142. The electrostatic dust filter 142 may be provided in the first flow path P1.

The electrostatic dust filter 142 may be configured to collect dust using an electrostatic force. The electrostatic dust filter 142 may receive power from the power supply 70 which will be described below. While power is applied to the electrostatic dust filter 142, an electric field may be formed in the electrostatic dust filter 142. Due to the electric field formed in the electrostatic dust filter 142, foreign matter such as dust may be collected from air. Also, due to the electric field formed in the electrostatic dust filter 142, organic matter such as bacteria and viruses may be decomposed. That is, the electrostatic dust filter 142 may perform a dust collection function and a sterilization function.

Specifically, the electrostatic dust filter 142 may include a filter case 142a, a dust collector 142b, and a charger 142c configured to form an exterior of the electrostatic dust filter 142.

The filter case 142a may support the dust collector 142b and the charger 142c. The filter case 142a may be supported by the first inner frame 120. At least one electrode configured to receive power from the power supply 70 may be provided in the filter case 142a. For example, an electrode of the first inner frame 120 that is electrically connected to the power supply 70 may be provided in the first inner frame 120, and while the dust collector filter 140 is mounted on the first inner frame 120, the electrode of the first inner frame 120 and the electrode of the filter case 142a may be connected to each other. The electrode of the first inner frame 120 or the electrode of the filter case 142a may be configured to include a conductive metal material. More specifically, at least one of the electrode of the first inner frame 120 and the electrode of the filter case 142a may be configured to include a leaf spring shape (not illustrated).

The charger 142c may be provided to charge foreign matter in air. The dust collector 142b may be provided to collect foreign matter charged by the charger 142c.

The dust collector 142b and the charger 142c may each be provided to receive power from the power supply 70. The dust collector 142b and the charger 142c may each be electrically connected to the electrode of the filter case 142a.

Electrodes of different polarities may be connected to the charger 142c and the dust collector 142b. An electric field may be formed between the charger 142c and the dust collector 142b. Foreign matter in air that is charged by the charger 142c may be charged to a polarity identical to the polarity of the charger 142c and may be charged to a polarity opposite to the polarity of the dust collector 142b. Accordingly, due to an electric force, the foreign matter in the air that is charged by the charger 142c may move to the dust collector 142b and be collected by the dust collector 142b. Also, due to the electric force, organic matter such as bacteria and viruses floating in the air may be decomposed.

The charger 142c may be provided at one side of the electrostatic dust filter 142, and the dust collector 142b may be provided at the other side of the electrostatic dust filter 142. The charger 142c and the dust collector 142b may be disposed to oppose each other. For example, the charger 142c and the dust collector 142b may be disposed to face each other in the up-down direction.

More specifically, the charger 142c may be provided upstream of the dust collector 142b in the first flow path P1. In other words, the charger 142c may be disposed between the dust collector 142b and the first suction port 111. In still other words, the dust collector 142b may be disposed between the charger 142c and the first discharge port 112. For example, the dust collector 142b may be provided at an upper portion of the electrostatic dust filter 142, and the charger 142c may be provided at a lower portion of the electrostatic dust filter 142.

By such a configuration, the electrostatic dust filter 142 may remove foreign matter from air flowing along the first flow path P1.

The pre-filter 141 may be disposed between the first suction port 111 and the electrostatic dust filter 142. In other words, the electrostatic dust filter 142 may be disposed between the first discharge port 112 and the pre-filter 141.

The pre-filter 141 may be detachably mounted on the electrostatic dust filter 142. More specifically, the pre-filter 141 may be detachably mounted on the filter case 142a of the electrostatic dust filter 142. The pre-filter 141 may be supported by the filter case 142a. Specifically, the pre-filter 141 may be supported by a lower portion of the filter case 142a.

The dust collector filter 140 described above is only one example of a configuration provided to remove foreign matter such as dust and organic matter from air flowing along the first flow path P1 of the first air cleaning unit 10, and the spirit of the present disclosure is not limited thereto.

For example, the pre-filter 141 included in the dust collector filter 140 may not be mounted on the electrostatic dust filter 142 and, further, may be disposed to be spaced apart from the electrostatic dust filter 142. That is, the pre-filter 141 and the electrostatic dust filter 142 may each be separately mounted on the first inner frame 120.

For example, the pre-filter 141 may not be included in the dust collector filter 140.

For example, the electrostatic dust filter 142 may not be included in the dust collector filter 140. Instead, various other filters such as a high efficiency particulate air (NEPA) filter may be included in the dust collector filter 140. Antibacterial treatment, such as application of an antibacterial substance, may be performed on a filter included in the dust collector filter 140, and accordingly, organic matter such as bacteria and viruses in air introduced through the first suction port 111 may be removed from the air by the dust collector filter 140.

The air cleaner 1 may include a control device 50 configured to control the operation of the air cleaner 1. The control device 50 may include a first printed circuit board assembly (PBA) 52. The first PBA 52 may be configured to control the operation of the air cleaner 1. The first PBA 52 may be formed by electronic components for controlling the operation of the air cleaner 1 being mounted on a printed circuit board (PCB). For example, the first PBA 52 may be a main board.

The first PBA 52 may be disposed in the first air cleaning unit 10. For example, the first PBA 52 may be supported by the base 114 of the first air cleaning unit 10.

The first PBA 52 may be electrically connected to various components disposed in the first air cleaning unit 10, such as the power supply 70, the sensor 90, and the first fan 150. Further, the first PBA 52 may be electrically connected to a second PBA 53 (see FIG. 6 and so on), which will be described below, provided in the second air cleaning unit 20. In the case in which the first PBA 52 is a main board, the first PBA 52 may be connected to the second PBA 53 via a wire and may transmit a command for controlling the operation of the second air cleaning unit 20 to the second PBA 53.

The present disclosure is not limited thereto, and the first PBA 52 may be disposed at various other positions. Also, the first PBA 52 may be configured in various other ways to control the operation of the air cleaner 1.

The air cleaner 1 may include the power supply 70 configured to supply power to various components of the air cleaner 1. The power supply 70 may be electrically connected to the first PBA 52. The power supply 70 may be configured to apply power to various components such as the electrostatic dust filter 142.

The power supply 70 may be disposed in the first air cleaning unit 10. For example, the power supply 70 may be mounted on the first inner frame 120. The first inner frame 120 may include a power supply mounting portion 122, and the power supply 70 may be mounted on the power supply mounting portion 122 by various methods such as fastening.

The power supply 70 may receive power from an external power source. The power supply 70 may be configured to immediately transmit power received from the external power source to components for driving the air cleaner 1 or configured to store power received from the external power source and then transmit the power to components for driving the air cleaner 1.

The present disclosure is not limited thereto, and the power supply 70 may be disposed at various other positions. Also, the power supply 70 may be configured in various other ways to supply power for driving the air cleaner 1.

The air cleaner 1 may include the sensor 90. The sensor 90 may be configured to sense a condition of air in an indoor space or the like where the air cleaner 1 is installed. For example, the sensor 90 may detect outside air through the sensing hole 113a.

Various types of sensors may be configured as the sensor 90. Examples of the sensor 90 may include a dust measuring sensor configured to measure concentration of dust in air, a carbon dioxide measuring sensor configured to measure concentration of carbon dioxide in air, a harmful gas measuring sensor configured to measure concentration of other harmful gases (e.g., total volatile organic compounds (TVOC)) in air, and an organic matter measuring sensor configured to measure concentration of organic matter in air.

For example, the sensor 90 may be disposed in the first air cleaning unit 10. More specifically, the sensor 90 may be mounted on the first inner frame 120. The first inner frame 120 may include a sensor mounting portion 121, and the sensor 90 may be mounted on the sensor mounting portion 121 by various methods such as fastening.

The present disclosure is not limited thereto, and the sensor 90 may be disposed at various other positions. Also, the sensor 90 may be configured in various other ways to sense an air condition that is to be detected to control the operation of the air cleaner 1.

For example, the sensor of the air cleaner 1 may be provided in the first flow path P1. Alternatively, for example, the sensor of the air cleaner 1 may be provided in the second flow path P2. Alternatively, for example, the sensor of the air cleaner 1 may be disposed at other positions such as a second inner frame 220, which will be described below, of the second air cleaning unit 20.

The configuration of the first air cleaning unit 10 described above with reference to FIGS. 3 to 5 is only one example for describing the first air cleaning unit of the air cleaner according to the spirit of the present disclosure, and the spirit of the present disclosure is not limited thereto. The first air cleaning unit of the air cleaner according to the spirit of the present disclosure may be provided to include various configurations for performing a function of purifying air flowing along the first flow path.

Figure 6:
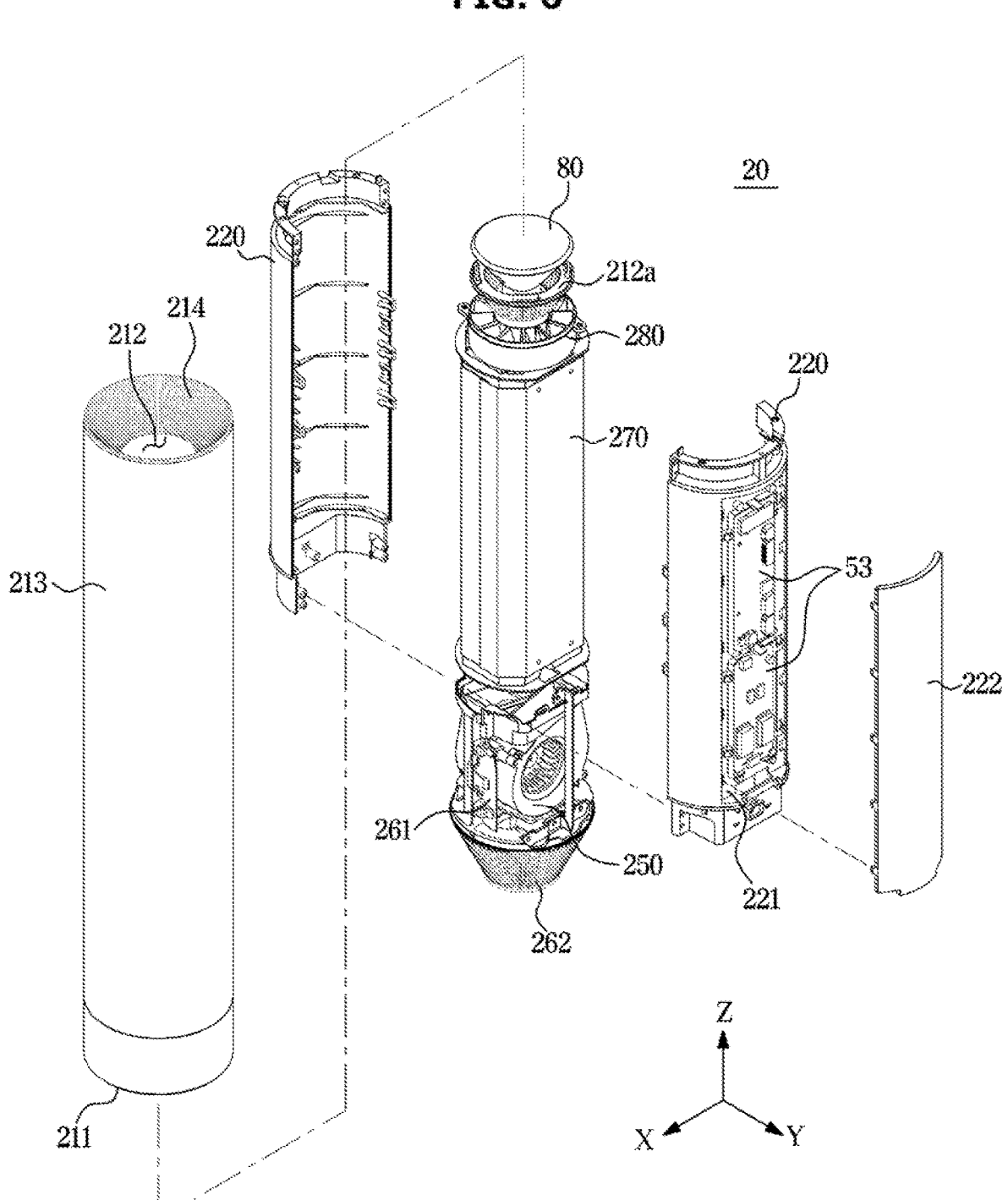
FIG. 6 is an exploded view of a partial configuration of a second air cleaning unit of the air cleaner according to one embodiment of the present disclosure.
Figure 7:
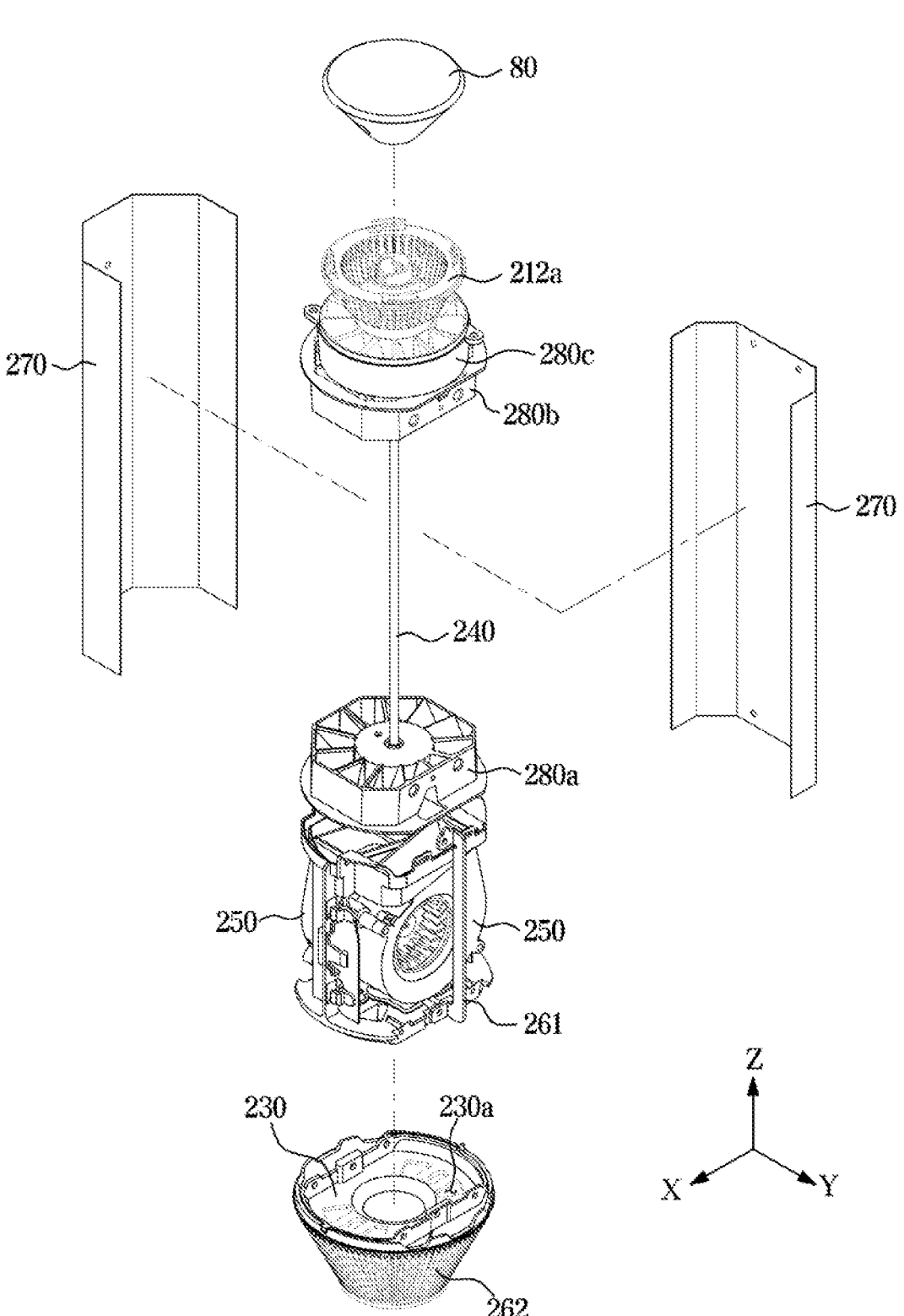
FIG. 7 is an exploded view of a partial configuration of the second air cleaning unit of the air cleaner according to one embodiment of the present disclosure.
Figure 8:
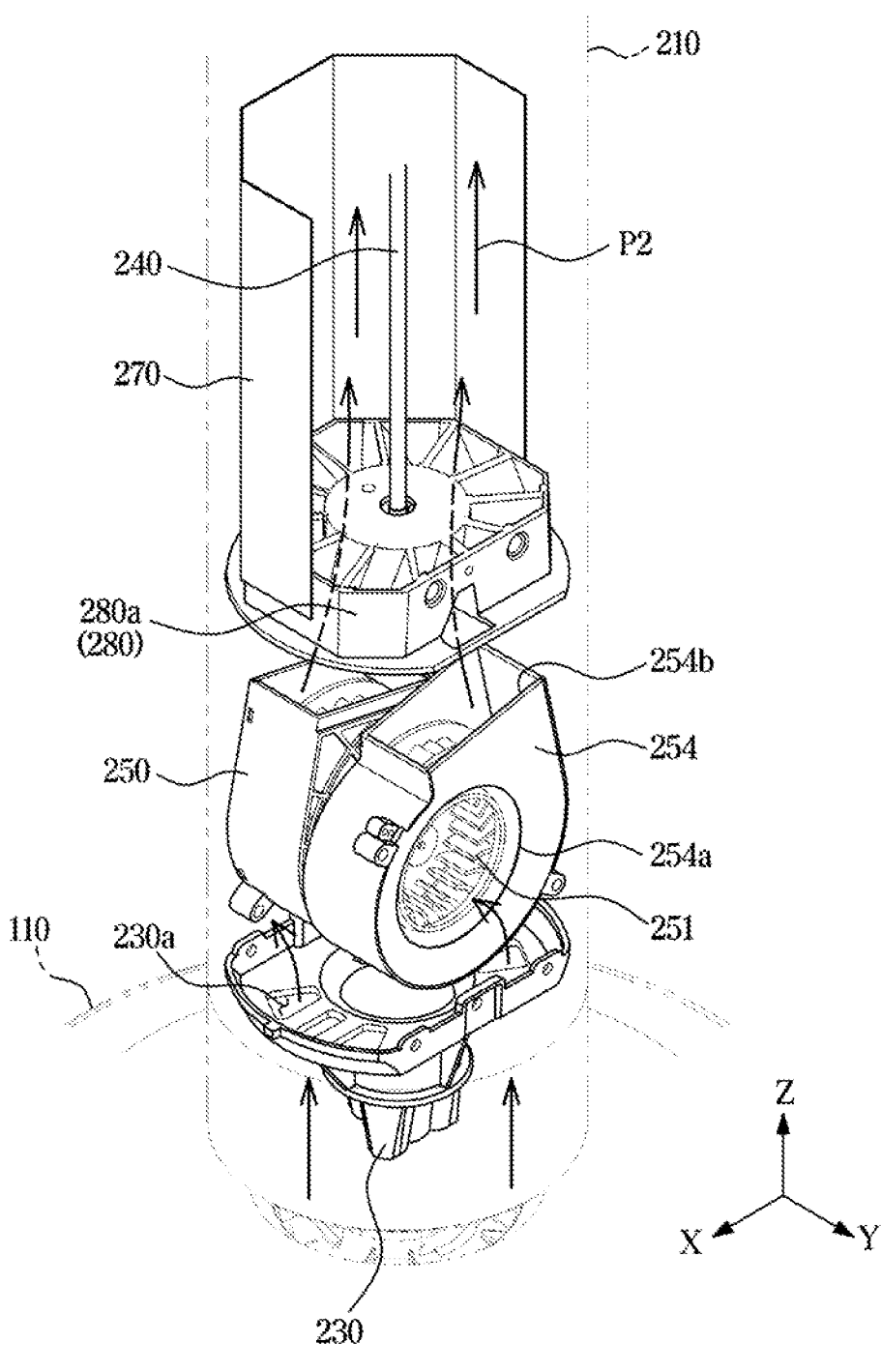
FIG. 8 is a view for describing a state in which air flows in the second air cleaning unit of the air cleaner according to one embodiment of the present disclosure.
Figure 9:
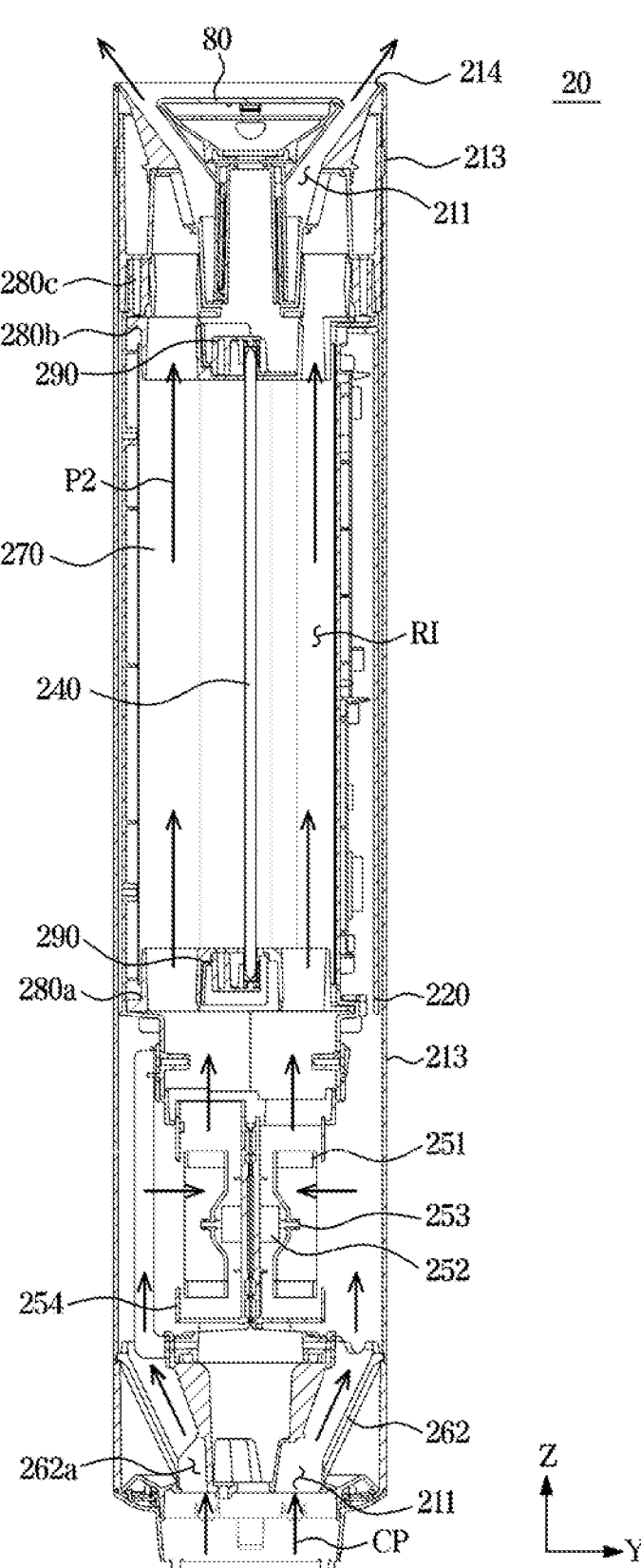
FIG. 9 is a lateral cross-sectional view of the second air cleaning unit of the air cleaner according to one embodiment of the present disclosure.

FIG. 6 is an exploded view of a partial configuration of the second air cleaning unit of the air cleaner according to one embodiment of the present disclosure. FIG. 7 is an exploded view of a partial configuration of the second air cleaning unit of the air cleaner according to one embodiment of the present disclosure. FIG. 8 is a view for describing a state in which air flows in the second air cleaning unit of the air cleaner according to one embodiment of the present disclosure. FIG. 9 is a lateral cross-sectional view of the second air cleaning unit of the air cleaner according to one embodiment of the present disclosure.

Referring to FIGS. 6 to 9, the second air cleaning unit 20 may include the second housing 210 configured to have the second flow path P2 provided therein. The second housing 210 may form an exterior of the second air cleaning unit 20. The second housing 210 may be configured to accommodate various components of the second air cleaning unit 20.

The second housing 210 may include the second suction port 211 and the second discharge port 212. The second suction port 211 may be provided so that air outside the second housing 210 is introduced into the second housing 210. More specifically, the second suction port 211 may be provided so that air inside the first housing 110 or air introduced into the connection flow path CP of air outside the first housing 110 and the second housing 210 is introduced into the second housing 210. The second discharge port 212 may be provided so that air inside the second housing 210 is discharged to the outside of the second housing 210.

While the second fan 250 is driven, due to pressure generated by the second fan 250, air outside the second housing 210 may be suctioned into the second housing 210 through the second suction port 211, and air inside the second housing 210 may be discharged to the outside of the second housing 210 through the second discharge port 212. More specifically, while the first fan 150 and the second fan 250 are simultaneously driven, at least one portion of air inside the first housing 110 may sequentially pass through the connection flow path CP and the second suction port 211 and flow to the second flow path P2, and air flowing along the second flow path P2 may be discharged through the second discharge port 212. While the first fan 150 is not driven and the second fan 250 is driven, air outside the first housing 110 and the second housing 210, that is, air outside the air cleaner 1, may, after being introduced into the first housing 110, more specifically, an upper side of the first housing 110, through the first discharge port 112, sequentially pass through the connection flow path CP and the second suction port 211 and flow to the second flow path P2. The air flowing along the second flow path P2 may be discharged through the second discharge port 212.

However, the present disclosure is not limited thereto, and for example, in the case in which the first fan 150 is not driven and only the second fan 250 is driven, the second suction port 211 may be formed to directly suction air outside the air cleaner 1.

The second air cleaning unit 20 may include the second flow path P2 provided between the second suction port 211 and the second discharge port 212 inside the second housing 210. In other words, the second flow path P2 may extend from the second suction port 211 to the second discharge port 212. While the second fan 250 is driven, air suctioned into the second housing 210 through the second suction port 211 may flow along the second flow path P2 and may be discharged to the outside of the second housing 210 through the second discharge port 212. In other words, the second suction port 211 may be provided at one end of the second flow path P2, and the second discharge port 212 may be provided at the other end of the second flow path P2.

For example, the second suction port 211 may be formed at a lower portion of the second housing 210. For example, the second discharge port 212 may be formed at an upper portion of the second housing 210. For example, the second flow path P2 may be formed to have a shape the extends in the up-down direction. Accordingly, air introduced into the second housing 210 through the second suction port 211 may flow upward along the second flow path P2.

However, the present disclosure is not limited thereto, and the second suction port 211 and the second discharge port 212 may be formed at various other positions of the second housing 210. Corresponding thereto, the second flow path P2 provided between the second suction port 211 and the second discharge port 212 may extend in various directions.

The second housing 210 may include a second housing body 213 and a second upper cover 214. The second housing body 213 and the second upper cover 214 may each constitute a portion of the exterior of the second air cleaning unit 20.

The second housing body 213 may form a side surface of the second air cleaning unit 20 in the horizontal direction. The second housing body 213 may be provided to cover various components of the second air cleaning unit 20 in the horizontal direction. The second housing body 213 may be connected to the second upper cover 214. The second housing body 213 may be connected to the intermediate duct 30.

The second housing body 213 may cover the second flow path P2 from outside the second flow path P2 in a radial direction. In other words, the second housing body 213 may cover the second flow path P2 from beside the second flow path P2 in the horizontal direction.

The second housing body 213 may extend in a direction parallel to the second flow path P2. For example, the second housing body 213 may extend in the up-down direction.

The second housing body 213 may be formed in a substantially hollow cylindrical shape. A space formed inside the second housing body 213 may be formed to have a substantially cylindrical shape. However, the present disclosure is not limited thereto, and the second housing body 213 may be formed to have various other shapes according to the outer shape of the second air cleaning unit 20.

The second suction port 211 and the second discharge port 212 may be formed in the second housing body 213. The second suction port 211 may be provided at one end of the second housing body 213 in a direction toward the intermediate duct 30. The second discharge port 212 may be provided at the other end of the second housing body 213 that is opposite the second suction port 211.

For example, the second suction port 211 may be formed at a lower end of the second housing body 213. The second discharge port 212 may be formed at an upper end of the second housing body 213.

However, the present disclosure is not limited thereto, and the second suction port 211 and the second discharge port 212 may be formed at various other positions.

The second upper cover 214 may be provided at an upper portion of the second housing 210. The second upper cover 214 may form an upper surface of the second air cleaning unit 20. The second upper cover 214 may be formed to cover the space inside the first housing 110 from above the space. The second upper cover 214 may form at least one portion of the upper surface of the first housing 110.

The second upper cover 214 may be provided at the second discharge port 212. In other words, the second upper cover 214 may partially cover the second discharge port 212. The second upper cover 214 may be provided to guide a flow of air discharged through the second discharge port 212.

The second upper cover 214 may be formed along the circumference of the second discharge port 212. Alternatively, the second upper cover 214 may be formed along the circumference of the second housing body 213.

The second upper cover 214 may have a shape whose width increases in a direction toward an outer edge thereof. For example, the second upper cover 214 may have a shape whose width increases upward. Accordingly, the second upper cover 214 may guide air discharged through the second discharge port 212 to be diffused outward. In other words, the second upper cover 214 may be formed to have a substantially diffuser-like shape.

However, the present disclosure is not limited thereto, and the second upper cover 214 may be configured in various other ways to form the upper surface of the second air cleaning unit 20.

For example, the second housing body 213 and the second upper cover 214 may be formed as configurations separated from each other. On the other hand, for example, the second housing body 213 and the second upper cover 214 may also be integrally formed with each other.

The second air cleaning unit 20 may include a second discharge port grille 212a provided in the second discharge port 212. The second discharge port grille 212a may be formed to include the shape of a grille to allow air to enter and exit through the second discharge port 212. For example, the second discharge port 212 may be positioned at an upper side of the second flow path P2, and corresponding thereto, the second discharge port grille 212a may be positioned at the upper side of the second flow path P2.

The second discharge port grille 212a may be coupled to the second upper cover 214. The second discharge port grille 212a may support the second upper cover 214.

For example, the second discharge port grille 212a may be coupled to an inner edge of the second upper cover 214. The second discharge port grille 212a may be formed along the inner edge of the second upper cover 214.

However, the present disclosure is not limited thereto, and the second discharge port grille 212a may be configured in various other ways to allow air to be discharged through the second discharge port 212. Unlike the above description, the second discharge port 212 may be formed at various other positions of the second housing 210, such as a side surface of the second housing body 213. Corresponding thereto, the second discharge port grille 212a may be provided at various other positions and formed to have various other shapes.

The second housing 210 described above is only one example of a configuration forming the exterior of the second air cleaning unit 20 and having the second flow path P2 provided therein, and the spirit of the present disclosure is not limited thereto.

The second air cleaning unit 20 may include the second inner frame 220. The second inner frame 220 may be disposed inside the second housing 210. The second inner frame 220 may be coupled to an inner surface of the second housing 210. The second inner frame 220 may support the inner surface of the second housing 210.

The second inner frame 220 may be provided to support at least some of the components of the second air cleaning unit 20. For example, the light source 240, a reflective cover 270, a light blocking member 280, and the like may be supported by the second inner frame 220. Also, the second PBA 53, a control panel 80, and the like may also be supported by the second inner frame 220.

The second inner frame 220 may be covered by the second housing 210. For example, a side of the second inner frame 220 may be covered by the second housing body 213 in the horizontal direction. A top of the second inner frame 220 may be covered by the second upper cover 214 in the vertical direction.

The second inner frame 220 may be formed to be divided into a plurality of frames as illustrated in FIG. 6 and so on. The plurality of frames constituting the second inner frame 220 may be formed to constitute the second inner frame 220 in a state in which the plurality of frames are coupled to each other. Accordingly, it may become easy to disassemble or assemble the second inner frame 220, and ease of access to an internal configuration of the second inner frame 220 by a user may be improved. However, the present disclosure is not limited thereto, and the second inner frame 220 may be a single configuration formed as one body.

A space having a substantially cylindrical shape may be formed inside the second inner frame 220. The light source 240, the reflective cover 270, and the like may be disposed in the space inside the second inner frame 220. At least one portion of the second flow path P2 may be provided in the space inside the second inner frame 220. More specifically, a radiation area RI, which will be described below, may be provided in the space inside the second inner frame 220.

However, the present disclosure is not limited thereto, and the second inner frame 220 may be formed to have various other shapes. For example, the space formed inside the second inner frame 220 may have a shape other than the cylindrical shape. Alternatively, for example, the second inner frame 220 may be provided to support various components of the second air cleaning unit 20 without forming the space therein or covering the outer side of the second flow path P2.

The second inner frame 220 described above is only one example of a configuration provided to support various components of the second air cleaning unit 20, and the spirit of the present disclosure is not limited thereto.

The second air cleaning unit 20 may include the second unit coupler 230 provided to be coupled to the first air cleaning unit 10. The second unit coupler 230 may be provided to be coupled to the first unit coupler 130, which will be described below, so that the first air cleaning unit 10 and the second air cleaning unit 20 are coupled to each other.

For example, the second unit coupler 230 may be disposed at the lower portion of the second air cleaning unit 20. For example, the second unit coupler 230 may be formed to have a shape that extends toward the first unit coupler 130 of the first air cleaning unit 10.

The second unit coupler 230 may include at least one hole 230a formed to allow passage of air flowing along the second flow path P2.

The second unit coupler 230 may be supported by a second fan support frame 261. The second unit coupler 230 may be coupled to a second fan guard 262.

However, the present disclosure is not limited thereto, and the second air cleaning unit 20 may include various other configurations provided to be coupled to the first air cleaning unit 10.

The second air cleaning unit 20 may include the second fan 250. The second fan 250 may be provided in the second flow path P2. The second fan 250 may be disposed between the second suction port 211 and the second discharge port 212. The second fan 250 may generate a suction force by rotating, and air outside the second air cleaning unit 20 may be suctioned into the second suction port 211 due to the suction force of the second fan 250. The air suctioned into the second suction port 211 may flow along the second flow path P2 and be discharged to the second discharge port 212.

The second fan 250 may be disposed between the light source 240, which will be described below, and the second suction port 211. While the second fan 250 is driven, air suctioned into the second suction port 211 may sequentially pass through the second fan 250 and the light source 240 and be discharged through the second discharge port 212.

However, the present disclosure is not limited thereto, and for example, the second fan 250 may be disposed between the light source 240 and second discharge port 212. Hereinafter, description will be given assuming that the second fan 250 is disposed between the light source 240 and the second suction port 211 as illustrated in FIGS. 6 to 9.

The second fan 250 may include a second blade 251, a second motor 252 configured to supply power to the second blade 251, and a second fan rotating shaft 253 connected to the second blade 251 and the second motor 252 to transmit power generated by the second motor 252 to the second blade 251.

The second fan 250 may include a second fan case 254 configured to support the second blade 251, the second motor 252, the second fan rotating shaft 253, and the like. The second blade 251, the second motor 252, and the second fan rotating shaft 253 may be accommodated in the second fan case 254.

More specifically, the second fan case 254 may support the second motor 252 of the second fan 250. The second motor 252 may be fixed to the second fan case 254. The second blade 251 of the second fan 250 is provided to be rotatable about the second fan rotating shaft 253 relative to the second motor 252 and thus may be provided to be rotatable relative to the second fan case 254. In other words, the second blade 251 may be rotatably supported by the second fan case 254.

The second fan case 254 may include a fan inlet 254a formed so that air is introduced into the second fan case 254 and a fan discharge duct 254b formed so that air is discharged to the outside of the second fan case 254. The second flow path P2 may be provided to pass through the fan inlet 254a and the fan discharge duct 254b. As the second fan 250 is driven, air in the second flow path P2 may pass through the fan inlet 254a and the fan discharge duct 254b and flow.

As illustrated in FIGS. 6 to 9, in the second fan 250, a direction in which air is introduced through the fan inlet 254a and a direction in which air is discharged through the fan discharge duct 254b may be different from each other. More specifically, the direction in which air is introduced through the fan inlet 254a may be parallel to the second fan rotating shaft 253. The direction in which air is discharged through the fan discharge duct 254b may be orthogonal to the second fan rotating shaft 253.

In other words, the fan discharge duct 254b may extend in a direction orthogonal to the second fan rotating shaft 253. The fan discharge duct 254b may be provided so that air is discharged in the direction orthogonal to the second fan rotating shaft 253 toward the light source 240.

That is, the second fan 250 may be configured as a centrifugal fan.

The second fan 250 may be provided as a plurality of second fans 250. The plurality of second fans 250 may be formed to have shapes that correspond to each other.

Each of the plurality of second fans 250 may be provided to discharge air in the direction orthogonal to the second fan rotating shaft 253 toward the light source 240. Directions in which air is discharged from the plurality of second fans 250 may be provided to be inclined to have a predetermined angle relative to the direction in which the second flow path P2 extends, that is, the up-down direction. Here, a direction of inclination relative to the up-down direction of a direction in which air is discharged from one of the plurality of second fans 250 and a direction of inclination relative to the up-down direction of a direction in which air is discharged from the other one of the plurality of second fans 250 may be provided to be opposite to each other. More specifically, in each of the plurality of second fans 250, the fan discharge duct 254b may be positioned to be deviated by a predetermined distance from a central axis of the second flow path P2, and here, the fan discharge duct 254b may have an inclined shape in which an outer end through which air is discharged extends toward the central axis of the second flow path P2.

However, the shape, arrangement, number, and the like of the second fans 250 are not limited thereto, and the second fans 250 may be provided in various other ways. For example, the second fans 250 may be configured as various types of fans such as an axial fan. For example, the second fan 250 may be provided as a single second fan 250.

The second fan 250 described above is only one example of a configuration generating pressure to allow air to flow along the second flow path P2 of the second air cleaning unit 20, and the spirit of the present disclosure is not limited thereto.

The second air cleaning unit 20 may include the second fan support frame 261. The second fan 250 may be supported by the second fan support frame 261.

The second fan support frame 261 may be coupled to the second inner frame 220. For example, the second fan support frame 261 may be coupled to a lower portion of the second inner frame 220.

The second fan support frame 261 may be coupled to the second unit coupler 230. For example, the second fan support frame 261 may be coupled to an upper portion of the second unit coupler 230.

However, the present disclosure is not limited thereto, and the second fan 250 may be supported by various other configurations.

The second air cleaning unit 20 may include the second fan guard 262 disposed upstream of the second fan 250 in the second flow path P2. The second fan guard 262 may cover one side of the second fan 250 that is adjacent to the second suction port 211. The second fan guard 262 may be provided between the second fan 250 and the second suction port 211.

The second fan guard 262 may include a fan guard hole 262a. The fan guard hole 262a may be formed to allow passage of air flowing along the second flow path P2. Air introduced into the second housing 210 through the second suction port 211 may pass through the fan guard hole 262a and flow toward the second fan 250.

The second air cleaning unit 20 may include the light source 240 provided in the second flow path P2. The light source 240 may be configured to radiate ultraviolet rays to the second flow path P2. The ultraviolet rays radiated from the light source 240 may have a wavelength range in which sterilization is possible. Organic matter such as bacteria and viruses present in air flowing along the second flow path P2 may be destroyed and removed by the ultraviolet rays radiated from the light source 240. That is, the light source 240 may perform a function of sterilizing the air flowing along the second flow path P2.

Detailed description of the configuration and operation of the light source 240 will be given below.

The second air cleaning unit 20 may include the reflective cover 270 provided to reflect ultraviolet rays radiated from the light source 240. The reflective cover 270 may cover an outer side of the light source 240. The reflective cover 270 may be provided in the second flow path P2.

An inner surface of the reflective cover 270 that faces light source 240 may be configured to include a material with high light reflectivity. For example, the inner surface of the reflective cover 270 may be plated with a metal material with high light reflectivity. Alternatively, for example, the reflective cover 270 may be configured as a single plate made of a metal material with high light reflectivity.

The reflective cover 270 may have a shape formed to be bent to surround the light source 240. For example, the reflective cover 270 may include a plurality of flat plate shapes, and the plurality of plate shapes may be provided to surround the light source 240 while forming a predetermined angle with each other.

As illustrated in FIG. 7, the reflective cover 270 may be provided as a plurality of reflective covers 270. The plurality of reflective covers 270 may each cover the outer side of the light source 240. Specifically, one of the plurality of reflective covers 270 may cover one side of the light source 240, and the other one of the plurality of reflective covers 270 may cover the other side of the light source 240.

However, the present disclosure is not limited thereto, and the reflective cover 270 may also be provided as a single reflective cover 270.

However, the present disclosure is not limited thereto, and the reflective cover 270 may be provided in various other ways to, from outside the light source 240, reflect ultraviolet rays radiated from the light source 240.

The second flow path P2 may include the radiation area RI in which ultraviolet rays are radiated from the light source 240. While the second fan 250 is driven, air introduced into the second housing 210 through the second suction port 211 may be sterilized while passing through the radiation area RI, and organic matter such as bacteria and viruses may be removed from the air.

The radiation area RI may be provided at an inner side of the reflective cover 270. The radiation area RI may be surrounded by the reflective cover 270, and thus an outer side of the radiation area RI may be covered. For example, the reflective cover 270 may cover the radiation area RI from beside the radiation area RI in the horizontal direction.

By the above configuration, ultraviolet rays radiated from the light source 240 may be reflected by the reflective cover 270 and not be incident on an area outside the radiation area RI, and sterilization efficiency of the light source 240 may be improved.

The second air cleaning unit 20 may further include the light blocking member 280 provided to prevent ultraviolet rays radiated from the light source 240 from being incident on the outside of the radiation area RI.

The light blocking member 280 may be provided in the second flow path P2. The light blocking member 280 may be formed to allow passage of air flowing along the second flow path P2. That is, the light blocking member 280 may be provided to, while preventing ultraviolet rays radiated from the light source 240 from being emitted to the outside of the radiation area RI, allow air outside the radiation area RI to flow to the inside of the radiation area RI through the light blocking member 280 or allow air inside the radiation area RI to flow to the outside of the radiation area RI through the light blocking member 280.

For example, the light blocking member 280 may include a first light blocking member 280a, a second light blocking member 280b, and a third light blocking member 280c. For example, the first light blocking member 280a may be provided at one side of the radiation area RI that faces the second suction port 211. The second light blocking member 280b and the third light blocking member 280c may be provided at the other side of the radiation area RI that faces the second discharge port 212. Since the plurality of light blocking member 280b and 280c are provided at the other side of the radiation area RI that faces the second discharge port 212 as illustrated in FIGS. 6 to 9, it is possible to more efficiently prevent ultraviolet rays from being emitted to the outside of the air cleaner 1 through the second discharge port 212 or the like and being introduced into a living space of a user.

The first light blocking member 280a and the second light blocking member 280b may be provided to support the light source 240. More specifically, the first light blocking member 280a and the second light blocking member 280b may be provided to support both ends of the light source 240.

The radiation area RI may be provided between the first light blocking member 280a and the second light blocking member 280b. The first light blocking member 280a and the second light blocking member 280b may be provided at both ends of the radiation area RI. For example, the first light blocking member 280a and the second light blocking member 280b may be provided at both ends of the radiation area RI in the up-down direction.

By the above configuration, ultraviolet rays radiated from the light source 240 may be blocked by the light blocking member 280 and not be incident on an area outside the radiation area RI, and components of the air cleaner 1 provided in the area outside the radiation area RI may be prevented from being damaged due to the ultraviolet rays. Also, it is possible to prevent ultraviolet rays from being emitted to the outside of the air cleaner 1 through the second discharge port 212 or the like and being introduced into a living space of a user.

Detailed description of the configuration and function of the light blocking member 280 will be given below.

The air cleaner 1 may include the control panel 80. The control panel 80 may include an input button 81 and a display 82. The control panel 80 may be disposed in the second air cleaning unit 20. For example, the control panel 80 may be supported by the second inner frame 220. For example, the control panel 80 may be supported by the third light blocking member 280c.

More specifically, the control panel 80 may be disposed at an upper portion of the second air cleaning unit 20. For example, the second air cleaning unit 20 may be provided to partially cover the second discharge port 212. For example, an outer edge of the second discharge port 212 may be covered by the second upper cover 214.

Detailed description of the configuration and operation of the control panel 80 will be given below.

The control device 50 of the air cleaner 1 may include the second PBA 53.

The second PBA 53 may be configured to control the operation of the air cleaner 1. The second PBA 53 may be formed by electronic components for controlling the operation of the air cleaner 1 being mounted on a PCB.

The second PBA 53 may be disposed in the second air cleaning unit 20. For example, the second PBA 53 may be supported by the second inner frame 220 of the second air cleaning unit 20.

More specifically, the second inner frame 220 may include a board mounting portion 221 provided so that the second PBA 53 is mounted. In the case in which the second inner frame 220 is made up of a plurality of frames, the board mounting portion 221 may be provided on at least one of the plurality of frames constituting the second inner frame 220.

The second inner frame 220 may include a board mounting cover 222 configured to cover the second PBA 53. The board mounting cover 222 may be detachably coupled to the board mounting portion 221. The board mounting cover 222 may be provided to protect the second PBA 53.

The second PBA 53 may be electrically connected to various components disposed on the second PBA 53, such as the control panel 80, the light source 240, and the second fan 250. Further, the second PBA 53 may be electrically connected to the first PBA 52 described above. The second PBA 53 may be connected via a wire to the first PBA 52 and may receive a command for controlling the operation of the second air cleaning unit 20 from the first PBA 52.

The second PBA 53 may be configured to include a plurality of boards as illustrated in FIG. 6. In this case, the plurality of boards included in the second PBA 53 may be electrically connected to each other. However, the present disclosure is not limited thereto, and the second PBA 53 may also be configured to include a single board.

Features of the second PBA 53 are not limited thereto, and the second PBA 53 may be disposed at various other positions. Also, the second PBA 53 may be configured in various other ways to control the operation of the air cleaner 1.

The configuration of the second air cleaning unit 20 described above with reference to FIGS. 6 to 9 is only one example for describing the second air cleaning unit of the air cleaner according to the spirit of the present disclosure, and the spirit of the present disclosure is not limited thereto. The second air cleaning unit of the air cleaner according to the spirit of the present disclosure may be provided to include various other configurations for performing a function of purifying air flowing along the second flow path.

Figure 10:
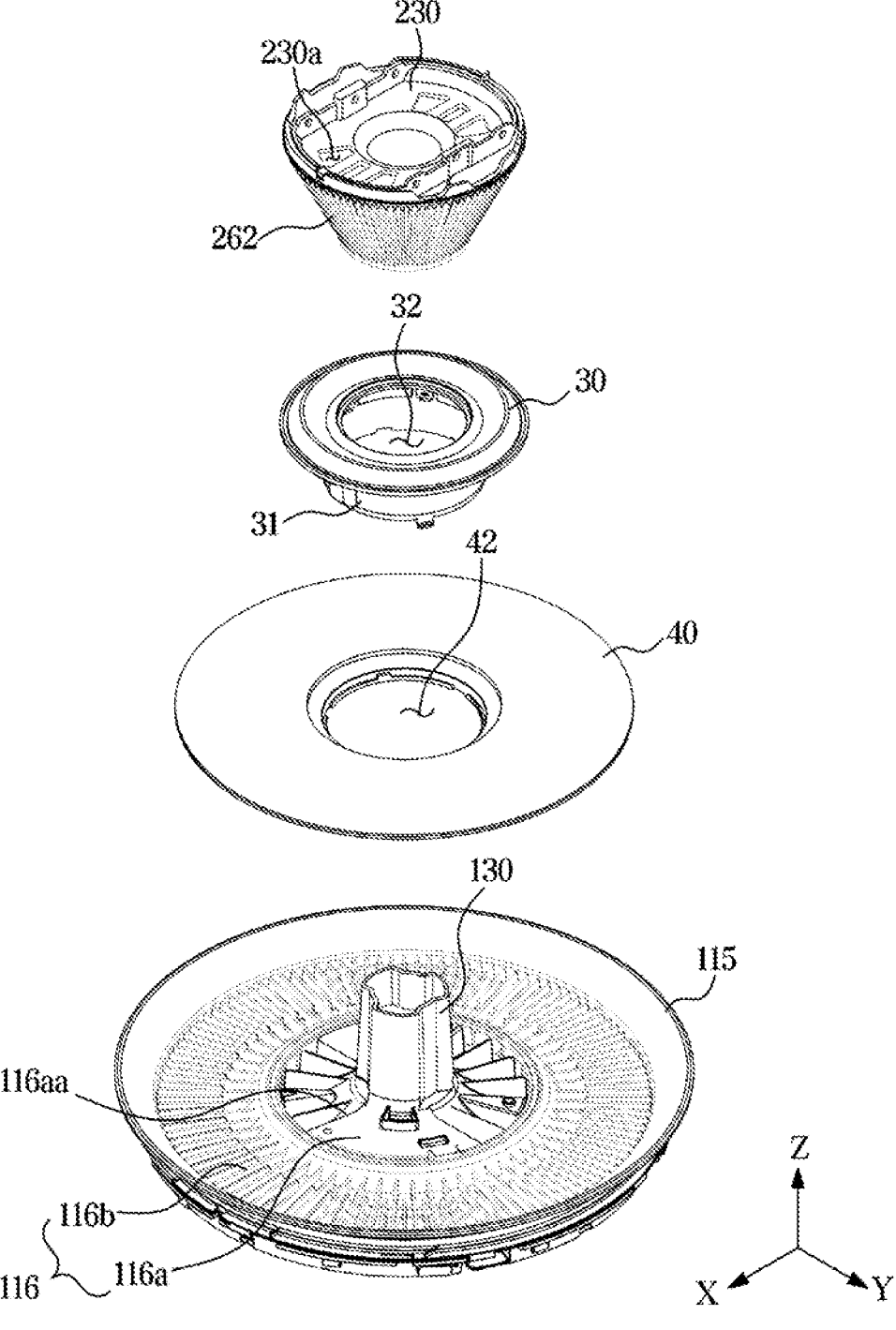
FIG. 10 is a view illustrating an intermediate duct of the air cleaner and a partial configuration of the air cleaner according to one embodiment of the present disclosure.
Figure 11:
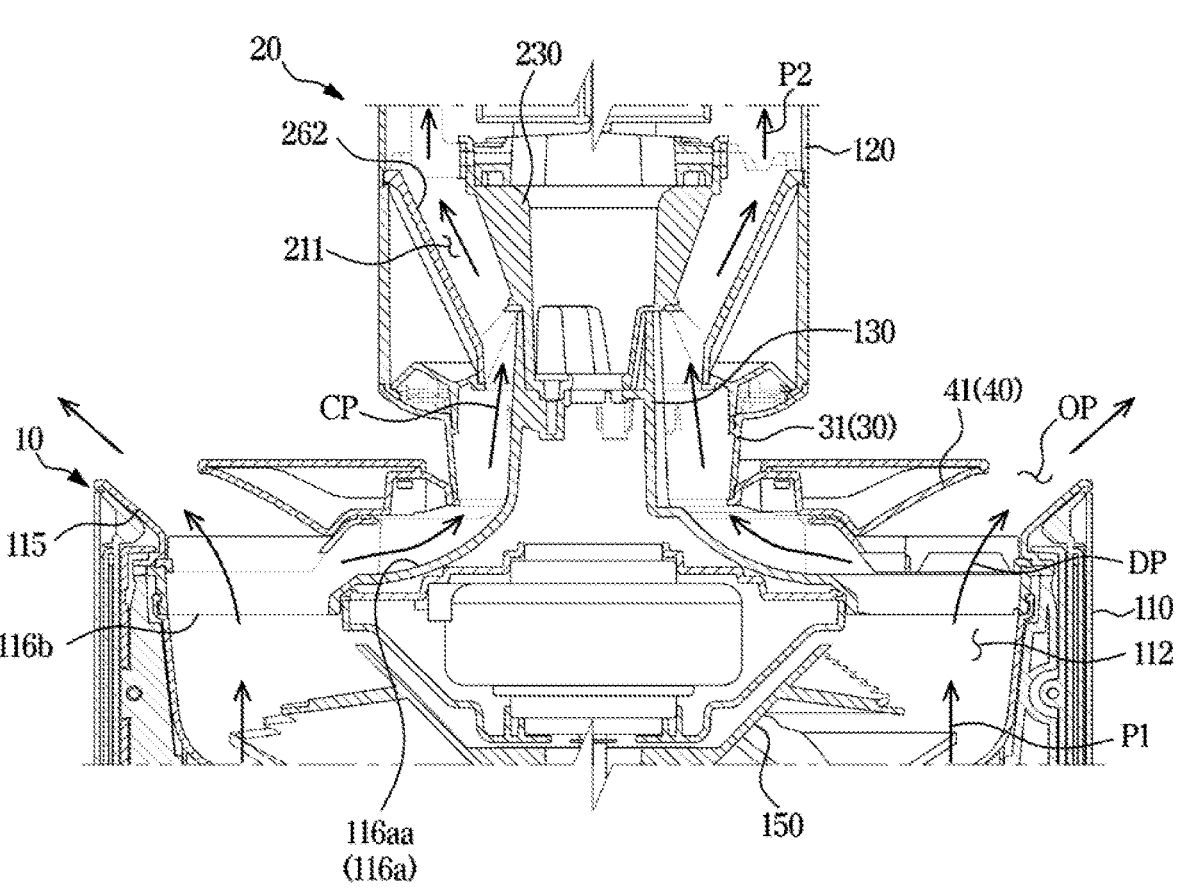
FIG. 11 is an enlarged cross-sectional view showing an enlarged cut-out of a partial configuration of the air cleaner according to one embodiment of the present disclosure.
Figure 11:

FIG. 10 is a view illustrating an intermediate duct of the air cleaner and a partial configuration of the air cleaner according to one embodiment of the present disclosure. FIG. 11 is an enlarged cross-sectional view showing an enlarged cut-out of a partial configuration of the air cleaner according to one embodiment of the present disclosure.

Referring to FIGS. 10 and 11, the air cleaner 1 according to one embodiment of the present disclosure may include the connection flow path CP configured to connect the first flow path P1 and the second flow path P2. The connection flow path CP may be connected between the first flow path P1 and the second flow path P2. The connection flow path CP may be branched from the first flow path P1 and extend toward the second flow path P2.

The connection flow path CP may be provided to extend from at least one portion of the first discharge port 112 toward the second suction port 211. In other words, the connection flow path CP may be provided between the at least one portion of the first discharge port 112 and the second suction port 211.

At least one portion of air discharged from the first discharge port 112 may be introduced into the connection flow path CP. The connection flow path CP may be provided so that the air discharged from the first discharge port 112 and introduced into the connection flow path CP flows to the second flow path P2 through the second suction port 211.

The connection flow path CP may be provided so that, while the second fan 250 is driven, air in the first flow path P1 is introduced into the second flow path P2. For example, while the first fan 150 and the second fan 250 are simultaneously driven, air introduced into the first flow path P1 through the first suction port 111 may be introduced into the second flow path P2 by the connection flow path CP. For example, while the first fan 150 is not driven and the second fan 250 is driven, air outside the air cleaner 1 may be introduced into the first flow path P1 through the first discharge port 112 due to the suction force of the second fan 250, and the air introduced into the first flow path P1 may be discharged back through the first discharge port 112 and introduced into the connection flow path CP. The air introduced into the connection flow path CP may be introduced into the second flow path P2 through the second suction port 211.

The connection flow path CP may extend in a direction from at least one portion of the first discharge port 112 toward the second suction port 211, for example, the up-down direction, as illustrated in FIG. 10. At least one portion of air discharged from the first housing 110 through the first discharge port 112 may flow upward along the connection flow path CP and be introduced into the second housing 210 through the second suction port 211.

The first flow path P1, the second flow path P2, and the connection flow path CP may extend in directions parallel to one another. For example, the first flow path P1, the second flow path P2, and the connection flow path CP may each extend in the up-down direction of the air cleaner 1. While the first fan 150 and the second fan 250 are simultaneously driven, at least one portion of air introduced into the first housing 110 through the first suction port 111 may flow along the first flow path P1, the connection flow path CP, and the second flow path P2 in a direction substantially parallel thereto. Accordingly, efficiency of air flow in the first air cleaning unit 10 and the second air cleaning unit 20 may be improved.

However, the present disclosure is not limited thereto, and the direction in which the connection flow path CP extends may be changed according to the arrangement of the first air cleaning unit 10 and the second air cleaning unit 20, the shapes of the first discharge port 112 and the second suction port 211, and the like.

The air cleaner 1 may include the intermediate duct 30 configured to connect the first housing 110 and the second housing 210. For example, the intermediate duct 30 may connect the upper portion of the first housing 110 and the lower portion of the second housing 210.

The first housing 110 and the second housing 210 may communicate with each other by the intermediate duct 30. The first flow path P1 and the second flow path P2 may communicate by the intermediate duct 30.

The connection flow path CP may be formed inside the intermediate duct 30. The intermediate duct 30 may cover an outer side of the connection flow path CP. The intermediate duct 30 may cover the connection flow path CP from beside the connection flow path CP in the horizontal direction.

The intermediate duct 30 may guide at least one portion of air discharged from the first discharge port 112 to be introduced into the second suction port 211. The at least one portion of the air discharged from the first discharge port 112 may be guided to the second suction port 211 by the intermediate duct 30. The intermediate duct 30 may be provided so that air introduced into the intermediate duct 30 flows to the second housing 210 along the connection flow path CP.

The intermediate duct 30 may cover at least one portion of the first discharge port 112. Accordingly, at least one portion of air discharged from the first discharge port 112 may be introduced into the intermediate duct 30.

The intermediate duct 30 may cover the entire second suction port 211. Accordingly, all of the air flowing along the intermediate duct 30 may be introduced into the second housing 210.

The intermediate duct 30 may extend in a direction from at least one portion of the first discharge port 112 toward the second suction port 211, for example, the up-down direction, as illustrated in FIG. 10. At least one portion of air discharged through the first discharge port 112 may be introduced into the intermediate duct 30, flow upward, and be introduced into the second housing 210 through the second suction port 211.

Hereinafter, one example of a specific shape of the intermediate duct 30 will be described.

The intermediate duct 30 may include a duct body 31 and a duct hollow portion 32 formed inside the duct body 31. The duct body 31 may have a shape through which the duct hollow portion 32 passes.

The duct hollow portion 32 may extend in a direction from the first housing 110 toward the second housing 210. The duct hollow portion 32 may extend in a direction from the first discharge port 112 toward the second suction port 211. For example, the duct hollow portion 32 may extend in the up-down direction.

The duct body 31 may have the connection flow path CP formed therein. The duct body 31 may cover an outer side of the connection flow path CP. The connection flow path CP may be disposed in the duct hollow portion 32.

The duct body 31 may connect the first housing 110 and the second housing 210. The duct body 31 may be connected to each of the upper portion of the first housing 110 and the lower portion of the second housing 210. The duct body 31 may cover at least one portion of the first discharge port 112. The duct body 31 may cover the entire second suction port 211.

One side of the duct body 31 may be coupled to the lower portion of the second housing 210. The one side of the duct body 31 may be coupled to the discharge flow path guide 40. As will be described below, the discharge flow path guide 40 may be coupled to the upper portion of the first housing 110. Accordingly, the duct body 31 may be directly or indirectly connected to each of the first housing 110 and the second housing 210.

The first unit coupler 130 may pass through the intermediate duct 30. The first unit coupler 130 may pass through the duct hollow portion 32 and be coupled to the second unit coupler 230. Here, the connection flow path CP may be formed between an inner peripheral surface of the duct body 31 and an outer peripheral surface of the first unit coupler 130.

The configuration of the intermediate duct 30 described above is only one example of the intermediate duct included in the air cleaner according to the spirit of the present disclosure, and the spirit of the present disclosure is not limited thereto.

The air cleaner 1 may be provided so that at least another portion of the air discharged from the first discharge port 112, excluding the portion of the air that is introduced into the connection flow path CP, is discharged to the outside of the air cleaner 1. In other words, at least another portion of the air discharged from the first discharge port 112 may be discharged to the outside of the first air cleaning unit 10 and the second air cleaning unit 20.

The air cleaner 1 may include the discharge flow path DP provided so that at least one portion of air discharged from the first discharge port 112 is discharged to the outside of the air cleaner 1. While the first fan 150 is driven, the at least one portion of the air discharged from the first discharge port 112 may flow along the discharge flow path DP.

The discharge flow path DP may extend from at least one portion of the first discharge port 112. The discharge flow path DP may be branched from the first flow path P1 and extend toward the outside of the air cleaner 1. An area in which the discharge flow path DP is branched from the first flow path P1 may be positioned adjacent to the first discharge port 112.

The discharge flow path DP may be positioned in a direction outward from an edge of the connection flow path CP. In other words, the discharge flow path DP may be disposed to surround an outer side of the connection flow path CP. Accordingly, one portion of air discharged through the first discharge port 112 may flow inward along the connection flow path CP, and another portion of the air discharged through the first discharge port 112 may flow outward along the discharge flow path DP.

The discharge flow path DP may extend in a direction different from the direction in which the connection flow path CP extends. For example, the connection flow path CP may extend in the up-down direction, and the discharge flow path DP may extend to be inclined to have a predetermined angle relative to the up-down direction.

The discharge flow path DP may extend in a direction moving away from the connection flow path CP in the direction in which air is discharged. In other words, the discharge flow path DP may be provided so that air is discharged in a direction moving away from the connection flow path CP or the intermediate duct 30. For example, the discharge flow path DP may extend to be inclined upward in a direction toward an outer edge of the first discharge port 112.

The air cleaner 1 may include the discharge flow path guide 40 provided to guide a flow of at least one portion of air discharged from the first discharge port 112. The discharge flow path guide 40 may be provided to guide air flowing along the discharge flow path DP. The discharge flow path guide 40 may guide air flow so that one portion not flowing to the connection flow path CP of air discharged from the first discharge port 112 flows along the discharge flow path DP.

The discharge flow path DP may have one side covered by the discharge flow path guide 40. The other side of the discharge flow path DP may be covered by the first housing 110, for example, the first discharge port cover 116 or the first upper cover 115.

The discharge flow path guide 40 may be disposed to face the first discharge port 112 outside the first air cleaning unit 10. The discharge flow path guide 40 may cover at least one portion of the first discharge port 112. For example, the discharge flow path guide 40 may cover at least one portion of the first discharge port 112 from above the first discharge port 112.

The discharge flow path guide 40 may extend in a direction corresponding to the direction in which the first discharge port 112 extends. For example, in the case in which the first discharge port 112 extends in the horizontal direction of the air cleaner 1, the discharge flow path guide 40 may also extend to correspond thereto, and accordingly, air flowing along the discharge flow path DP may flow in the horizontal direction or a direction similar thereto relative to the air cleaner 1 and be discharged to the outside.

The discharge flow path guide 40 may be coupled to the first air cleaning unit 10. More specifically, the discharge flow path guide 40 may be coupled to the first housing 110. For example, the discharge flow path guide 40 may be coupled to the upper portion of the first air cleaning unit 10 or may be coupled to the upper portion of the first housing 110.

The discharge flow path guide 40 may be positioned in a direction outward from the intermediate duct 30. In other words, the discharge flow path guide 40 may be formed to surround an outer side of the intermediate duct 30.

The air cleaner 1 may include the guide opening OP formed between an outer edge of the discharge flow path guide 40 and the outer edge of the first discharge port 112. Specifically, the guide opening OP may be formed between an outer end of the discharge flow path guide 40 and an outer end of the first upper cover 115. The guide opening OP may be disposed parallel to the edge of the first discharge port 112.

The discharge flow path DP may extend from at least one portion of the first discharge port 112 toward the guide opening OP. The first discharge port 112 may be provided at one end of the discharge flow path DP, and the guide opening OP may be provided at the other end of the discharge flow path DP.

While the first fan 150 and the second fan 250 are simultaneously driven or only the first fan 150 is driven, the guide opening OP may serve as an outlet through which air discharged from the first discharge port 112 is discharged from the discharge flow path DP. While the first fan 150 is not driven and only the second fan 250 is driven, the guide opening OP may serve as an inlet through which outside air is introduced into the discharge flow path DP.

Due to the discharge flow path guide 40, air flowing toward the connection flow path CP and air flowing toward the discharge flow path DP may be isolated from each other.

Hereinafter, one example of a specific shape of the discharge flow path guide 40 will be described.

The discharge flow path guide 40 may include a guide surface 41 configured to guide air flowing along the discharge flow path DP. A flow of at least one portion of air discharged through the first discharge port 112 may be guided by the guide surface 41.

The guide surface 41 may be formed at one surface of the discharge flow path guide 40 that faces the discharge flow path DP. The guide surface 41 may be formed at one surface of the discharge flow path guide 40 that faces the first discharge port 112.

The guide surface 41 may extend in a direction inclined relative to the direction in which the first discharge port 112 extends. For example, the guide surface 41 may extend in a direction inclined relative to the horizontal direction of the air cleaner 1. For example, the guide surface 41 may extend to be inclined upward in a direction outward from the edge of the discharge flow path guide 40. The guide surface 41 may have a shape inclined in a direction corresponding to the first upper cover 115.

The guide surface 41 may be formed to have a shape concavely recessed relative to the discharge flow path DP. For example, a slope of the guide surface 41 relative to the horizontal direction may gradually become gentler in the direction outward from the edge of the discharge flow path guide 40. For example, the slope of the guide surface 41 may become closer to the horizontal direction in the direction in which air is discharged along the discharge flow path DP. In other words, the slope of the guide surface 41 relative to the horizontal direction may gradually become gentler in a direction from the first discharge port 112 toward the guide opening OP.

The guide surface 41 may be formed to have a curved shape.

The discharge flow path guide 40 may include a guide hollow portion 42 formed inside the discharge flow path guide 40. The discharge flow path guide 40 may have a shape through which the guide hollow portion 42 passes.

The guide hollow portion 42 may extend in the direction from the first housing 110 toward the second housing 210. The guide hollow portion 42 may extend in the direction from the first discharge port 112 toward the second suction port 211. For example, the guide hollow portion 42 may extend in the up-down direction.

The intermediate duct 30 may pass through the discharge flow path guide 40. Specifically, the intermediate duct 30 may pass through the guide hollow portion 42. The intermediate duct 30 may pass through the guide hollow portion 42 and connect the first housing 110 and the second housing 210.

As described above, the first unit coupler 130 may pass through the duct hollow portion 32 of the intermediate duct 30 and be coupled to the second unit coupler 230. Accordingly, the first unit coupler 130 may be disposed to simultaneously pass through the duct hollow portion 32 and the guide hollow portion 42.

The discharge flow path guide 40 may be coupled to the upper portion of the first housing 110, for example, the first discharge port cover 116. More specifically, the discharge flow path guide 40 may be fastened by a screw (not illustrated) to a central portion 116a, which will be described below, provided at the first discharge port cover 116. However, the present disclosure is not limited thereto, and the discharge flow path guide 40 may be fixed by being coupled in various other ways to various other configurations such as the first housing 110, the second housing 210, and the intermediate duct 30.

The configuration of the discharge flow path guide 40 described above is only one example of the discharge flow path guide included in the air cleaner according to the spirit of the present disclosure, and the spirit of the present disclosure is not limited thereto.

As described above, the first housing 110 may further include the first discharge port cover 116 configured to cover the first discharge port 112. Air flowing along the first flow path P1 may be discharged from the first housing 110 via the first discharge port cover 116.

Hereinafter, one example of a specific shape of the first discharge port cover 116 will be described.

The first discharge port cover 116 may include the central portion 116a and an edge grille 116b provided along an outer edge of the central portion 116a. The central portion 116a may cover the center of an upper side of the first housing 110. The edge grille 116b may cover a peripheral portion of the upper side of the first housing 110. The edge grille 116b may include a penetrated shape. While the first fan 150 is driven, at least one portion of air discharged from the first discharge port 112 may pass through the penetrated shape of the edge grille 116b and flow to the discharge flow path DP. While the first fan 150 is not driven and the second fan 250 is driven, air outside the air cleaner 1 may flow along the discharge flow path DP, pass through the penetrated shape of the edge grille 116b, and be introduced into the first housing 110.

The edge grille 116b may have one side covered by the discharge flow path guide 40. For example, the discharge flow path guide 40 may cover at least one portion of the edge grille 116b from above the edge grille 116b. The guide surface 41 of the discharge flow path guide 40 may be provided to face the at least one portion of the edge grille 116b.

The central portion 116a may include a guide portion 116aa configured to extend from the edge grille 116b toward the connection flow path CP. The guide portion 116aa may be provided to guide air from the edge grille 116b to the connection flow path CP.

The guide portion 116aa may be formed along the circumference of the central portion 116a. The guide portion 116aa may be divided by a plurality of rib structures.

The guide portion 116aa may be formed to have a slope that becomes closer to a direction parallel to the direction in which the connection flow path CP extends, toward the connection flow path CP. In other words, an angle formed between the slope of the guide portion 116aa and the direction in which the connection flow path CP extends may decrease toward the connection flow path CP. For example, the guide portion 116aa may be formed so that the slope relative to the horizontal direction increases toward the connection flow path CP. For example, the guide portion 116aa may be formed to include a concave shape.

The guide portion 116aa may be formed to include a curved shape.

The intermediate duct 30 may cover at least one portion of the guide portion 116aa. The intermediate duct 30 may be connected to one end of the guide portion 116aa that is adjacent to the connection flow path CP.

For example, the central portion 116a may be integrally formed with the first unit coupler 130 described above. For example, the first unit coupler 130 may extend upward from the central portion 116a. For example, the guide portion 116aa may be disposed in the circumferential direction of the first unit coupler 130.

By such a configuration, at least one portion of air discharged from the first discharge port 112 may flow to the connection flow path CP along the guide portion 116aa, and at least another portion of the air discharged from the first discharge port 112 may flow to the discharge flow path DP.

The configuration of the first discharge port cover 116 described above is only one example of the first discharge port cover included in the air cleaner according to the spirit of the present disclosure, and the spirit of the present disclosure is not limited thereto.

Figure 12:
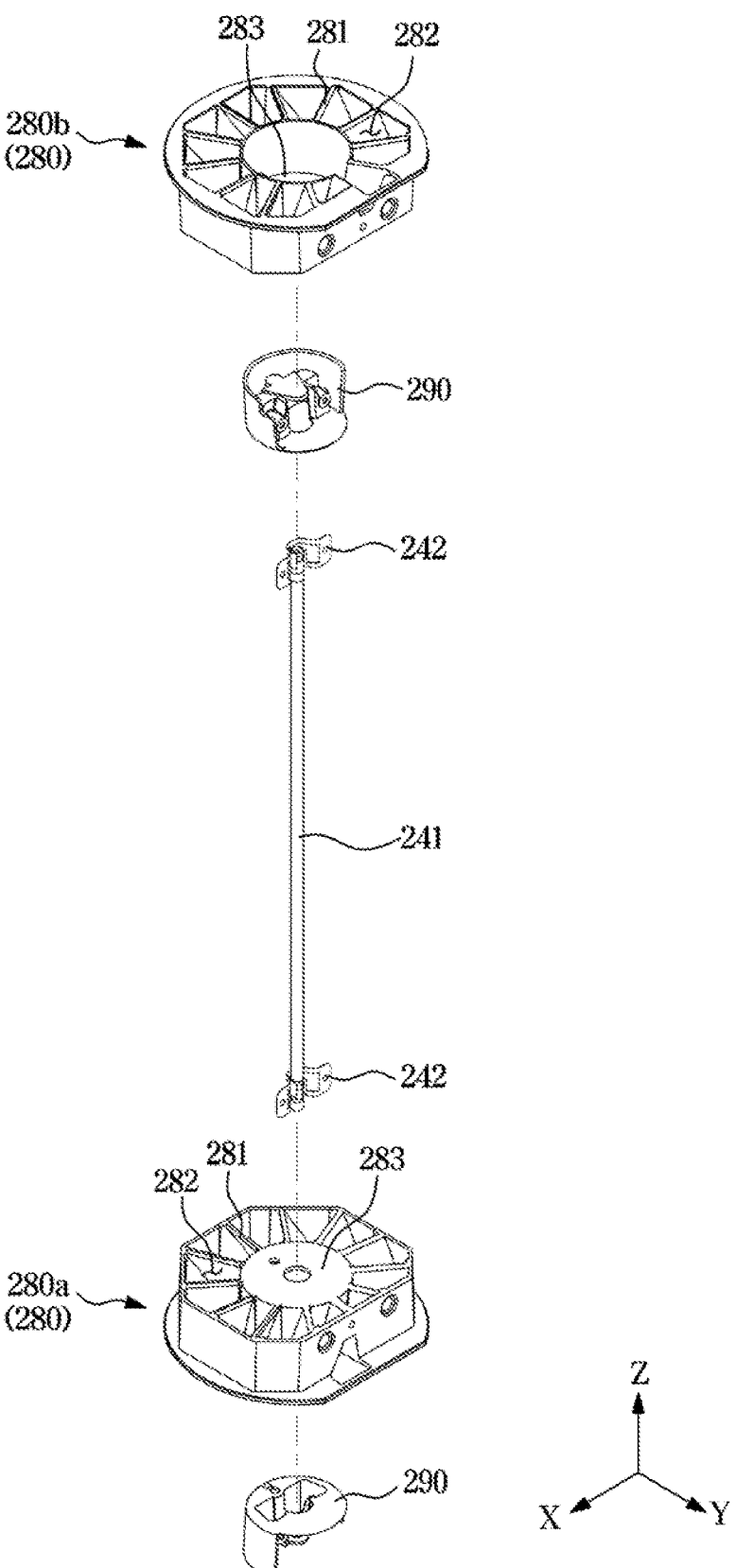
FIG. 12 is a view illustrating a light source of the air cleaner and a partial configuration of the air cleaner according to one embodiment of the present disclosure.
Figure 13:
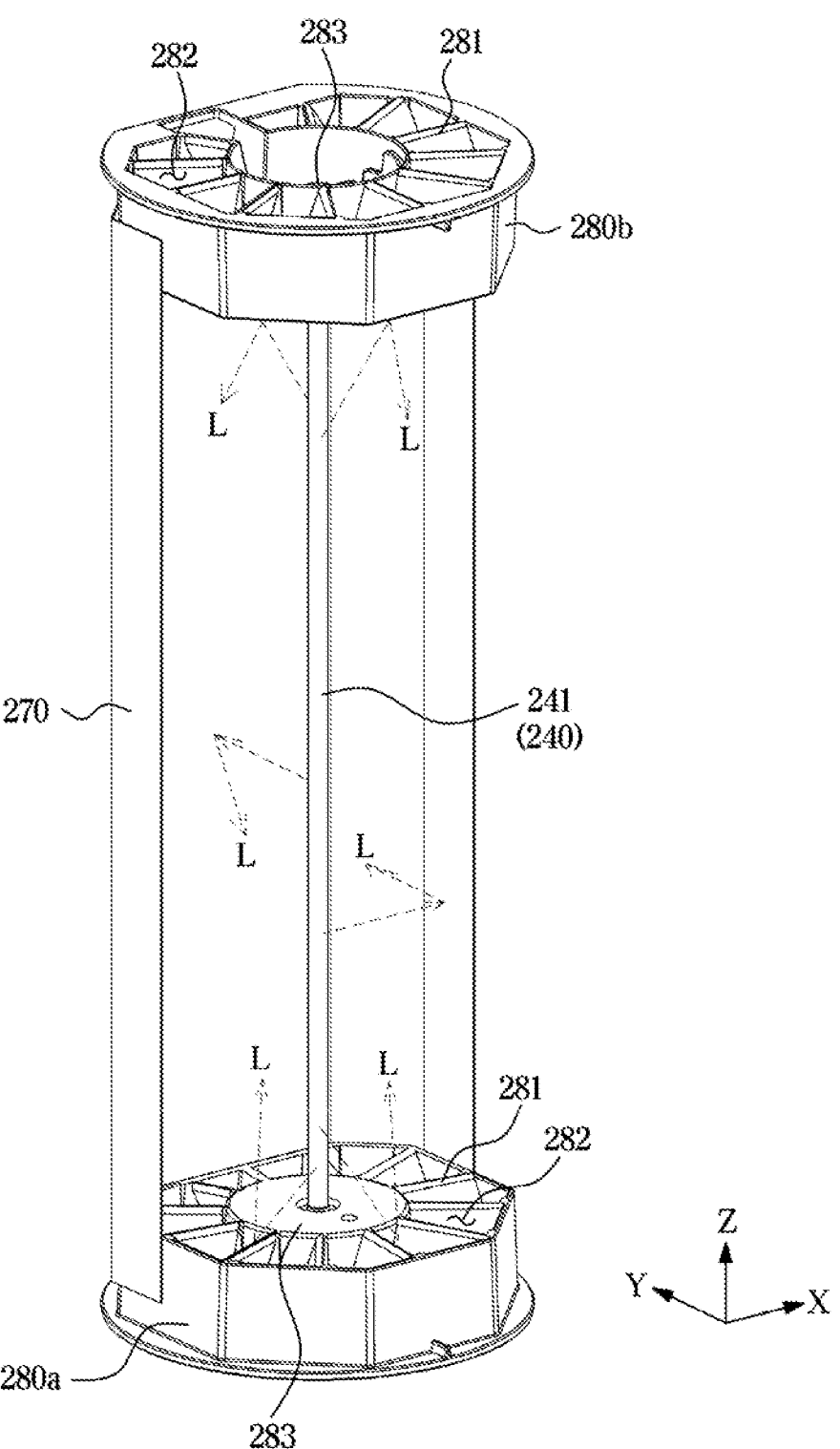
FIG. 13 is a view illustrating a propagation path of light radiated from the light source in the air cleaner according to one embodiment of the present disclosure.
Figure 14:
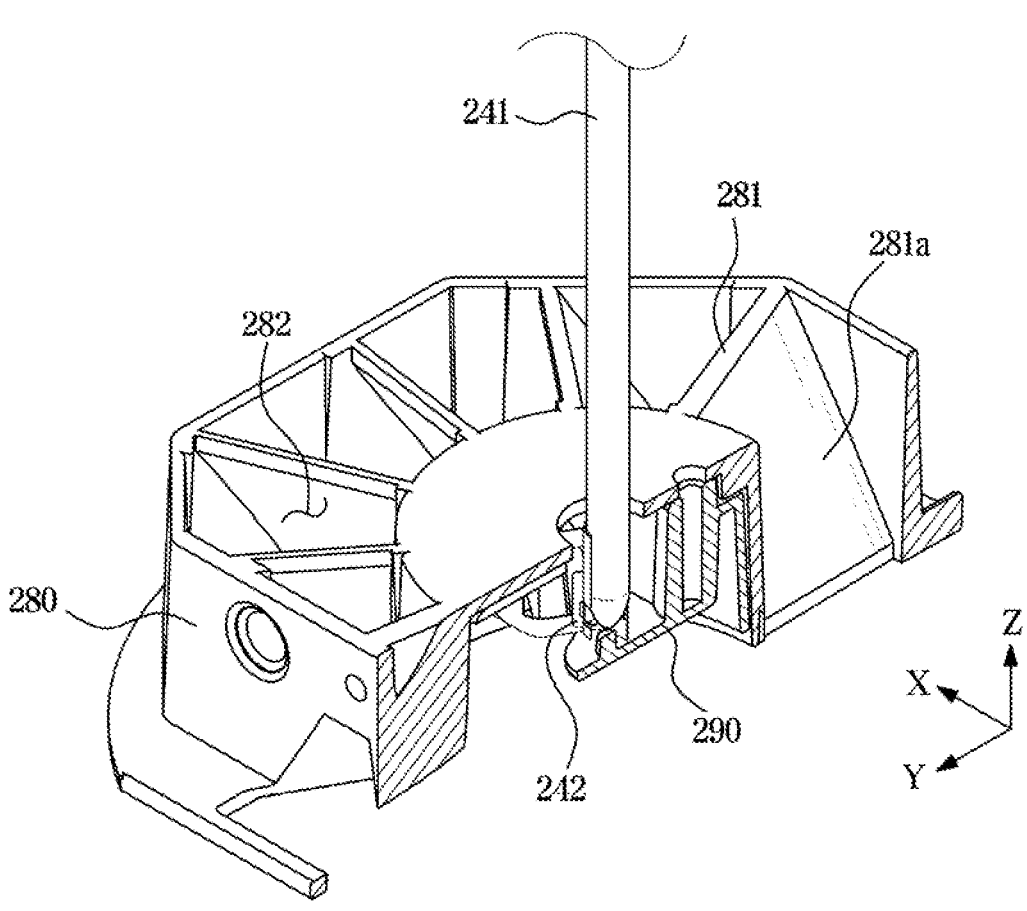
FIG. 14 is a cross-sectional perspective view illustrating a cut-out of the light source of the air cleaner and a partial configuration of the air cleaner according to one embodiment of the present disclosure.

FIG. 12 is a view illustrating a light source of the air cleaner and a partial configuration of the air cleaner according to one embodiment of the present disclosure. FIG. 13 is a view illustrating a propagation path of light radiated from the light source in the air cleaner according to one embodiment of the present disclosure. FIG. 14 is a cross-sectional perspective view illustrating a cut-out of the light source of the air cleaner and a partial configuration of the air cleaner according to one embodiment of the present disclosure.

The configuration and operation of the above-described light source 240 of the second air cleaning unit 20 will be described in detail with reference to FIGS. 12 to 14.

Referring to FIGS. 12 to 14, the air cleaner 1 may include the light source 240 provided in the second flow path P2. The air cleaner 1 may include each of the dust collector filter 140 provided in the first flow path P1 in the first housing 110 and the light source 240 provided in the second flow path P2 in the second housing 210 and thus improve air purification efficiency. The light source 240 may be one configuration included in the second air cleaning unit 20.

The light source 240 may be provided to radiate ultraviolet rays to the radiation area RI. Specifically, the light source 240 may be provided to radiate ultraviolet rays in a wavelength region suitable for removing organic matter such as bacteria and viruses. For example, the light source 240 may be provided to radiate ultraviolet rays included in the UV-C wavelength region (for example, a wavelength region having a range of about 250 to 260 nm). In this respect, the light source 240 may be referred to as a sterilization device, a sterilization lamp, or the like.

The light source 240 applied to a sterilization device may be configured using various methods such as a method in which an electrode inside a glass tube is used as in a hot cathode florescent lamp (HCFL) and a cold cathode florescent lamp (CCFL) and a method in which an electrode outside a glass tube is used as in an external electrode fluorescent lamp (EEFL).

Hereinafter, a specific configuration and operation of the light source 240 will be described in detail while assuming that the light source 240 is configured using the EEFL method.

The light source 240 may include a lamp body 241 from which light L is projected and an electrode portion 242 configured to receive power.

The lamp body 241 may have a substantially cylindrical shape. The lamp body 241 may extend in one direction. For example, the lamp body 241 may extend in the up-down direction.

The lamp body 241 may be configured to include a material through which ultraviolet rays can pass. For example, the lamp body 241 may be configured to include a material such as quartz or borosilicate.

The lamp body 241 may include a hollow discharge space S therein. A gas (not illustrated) for emitting ultraviolet rays through discharge may be accommodated in the lamp body 241. A rare gas or the like may be used as the gas for emitting ultraviolet rays through discharge. When voltage is applied to a gas, such as a rare gas, in a ground state, an excited dimer (hereinafter referred to as an "excimer") may be formed. The excimer is in an unstable state and thus immediately returns to the ground state, and in this process, ultraviolet rays may be generated. A rare gas with which the lamp body 241 is filled may be made of xenon (Xe), a Xe-mixed gas (including Xe, Ar, Ne, etc.), and the like.

An inner wall of the lamp body 241 may be coated with a fluorescent body (not illustrated) configured to convert a light emission wavelength region of Xe (for example, about 172 nm) into a sterilization wavelength region (for example, about 250 to 260 nm). However, the gas accommodated in the lamp body 241 is not limited to a rare gas such as Xe and a gas mixed with the rare gas, and various other types of gases configured to emit ultraviolet rays through discharge may be accommodated in the lamp body 241. The inner wall of the lamp body 241 may be coated with various other types of fluorescent bodies according to the wavelength of the emitted ultraviolet rays.

The light source 240 may include an external electrode (not illustrated) disposed at an outer surface of the lamp body 241. The external electrode may extend in a direction in which the lamp body 241 extends. In other words, the external electrode may be disposed on the outer surface of the lamp body 241 and extend in the longitudinal direction of the lamp body 241.

The external electrode may include a pair of external electrodes. The pair of external electrodes may be disposed to oppose each other on an outer peripheral surface of the lamp body 241, with respect to a central axis of the lamp body 241.

The external electrode may be provided in the shape of a thin tape on the outer surface of the lamp body 241. The external electrode may be configured to include a conductive material. For example, the external electrode may be configured to include a conductive metal material such as gold, silver, nickel, carbon, gold palladium, silver palladium, platinum, aluminum, or an alloy thereof.

The electrode portion 242 may be configured to receive power from a device provided outside the light source 240. For example, the electrode portion 242 may be electrically connected to the second PBA 53 and receive power from the second PBA 53.

The electrode portion 242 may be configured to include a conductive material in order to receive power form the outside. For example, the electrode portion 242 may be configured to include a conductive metal material.

The electrode portion 242 may be provided to receive power from the outside and transmit power to the external electrode provided on the outer surface of the lamp body 241. The electrode portion 242 may be electrically connected to the external electrode.

The electrode portion 242 may be provided as a pair of electrode portions 242, and each of the pair of electrode portions 242 may be fixed to one of both ends of the lamp body 241. The pair of electrode portions 242 may be configured to receive voltages of different polarities.

Each of the pair of electrode portions 242 may be electrically connected to one of the pair of external electrodes. Any one of the pair of external electrodes may be electrically connected to any one of the pair of electrode portions 242. The other one of the pair of external electrodes may be electrically connected to the other one of the pair of electrode portions 242. Accordingly, the pair of external electrodes may receive voltages of different polarities.

The light source 240 described above is only one example of the light source included in the air cleaner according to the spirit of the present disclosure, and the spirit of the present disclosure is not limited thereto.

The second air cleaning unit 20 may include a light source fixing member 290 provided to fix the light source 240. The light source fixing member 290 may fix the electrode portion 242 of the light source 240. The light source fixing member 290 may be provided as a pair of light source fixing members 290 to correspond to the number of electrode portions 242 of the light source 240. The pair of light source fixing members 290 may be arranged in parallel to a direction in which the light source 240 extends. For example, the pair of light source fixing members 290 may be arranged in the up-down direction.

For example, each of the pair of electrode portions 242 may be inserted into one of the pair of light source fixing members 290. Each of the pair of electrode portions 242 may be configured to be connected to one of the pair of light source fixing members 290 and receive power.

The light source fixing member 290 may be supported by the light blocking member 280. For example, any one of the pair of light source fixing members 290 may be supported by the first light blocking member 280a, and the other one of the pair of light source fixing members 290 may be supported by the second light blocking member 280b.

In this way, by supporting the light source fixing member 290, the light blocking member 280 may support the electrode portion 242 and support the light source 240. However, the present disclosure is not limited thereto, and the light blocking member 280 may also be formed to directly support the electrode portion 242.

By such a configuration, the light source 240 may receive power from the outside and be configured to radiate ultraviolet rays.

Hereinafter, the configuration and operation of the light source 240 in the radiation area RI will be described in detail with reference to FIGS. 13 and 14.

The light source 240 may extend in one direction. The direction in which the light source 240 extends may correspond to a direction of extension of the radiation area RI in which ultraviolet rays L are radiated from the light source 240. Further, the direction in which the light source 240 extends may correspond to the direction in which the second flow path P2 extends. In other words, the radiation area RI may extend in one direction to correspond to the light source 240. For example, the direction in which the light source 240 or the radiation area RI extends may be the up-down direction of the air cleaner 1.

The reflective cover 270 may be provided to reflect at least one portion of the ultraviolet rays L radiated from the light source 240. The reflective cover 270 may extend in the direction of extension of the light source 240 in order to correspond to the light source 240. The reflective cover 270 may extend in the direction of extension of the radiation area RI in order to correspond to the radiation area RI. For example, the direction in which the reflective cover 270 extends may be the up-down direction of the air cleaner 1.

The reflective cover 270 may cover the outer side of the light source 240. The reflective cover 270 may be disposed in the circumferential direction of the light source 240. The reflective cover 270 may cover the light source 240 from beside the light source 240 in the horizontal direction.

The reflective cover 270 may cover the outer side of the radiation area RI. The reflective cover 270 may be disposed in the circumferential direction of the radiation area RI. The reflective cover 270 may cover the radiation area RI from beside the radiation area RI in the horizontal direction.

The reflective cover 270 may cover at least one portion of a side surface of the light blocking member 280 from outside the light blocking member 280. The reflective cover 270 may be disposed in the circumferential direction of the light blocking member 280. The reflective cover 270 may cover the at least one portion of the side surface of the light blocking member 280 from beside the light blocking member 280 in the horizontal direction. The reflective cover 270 may be formed to have a shape that corresponds to the shape of the side surface or edge of the light blocking member 280.

The light blocking member 280 may be provided in the second flow path P2. The light blocking member 280 may be provided at one side of the radiation area RI in one direction (that is, the direction of extension of the light source 240, the radiation area RI, and the like). Specifically, each of the plurality of light blocking members 280a and 280b may be provided at one of both sides of the radiation area RI in the one direction.

The radiation area RI is one configuration of the second flow path P2 and should be provided to allow an air flow, and accordingly, the light blocking member 280 should be provided to allow passage of air flowing along the second flow path P2. This is particularly because the light blocking member 280 may be disposed at one side of the radiation area RI in the one direction.

However, since the ultraviolet rays L radiated from the light source 240 may have high energy, there is a possibility of damage to other components of the second air cleaning unit 20 when the ultraviolet rays L are emitted to the outside of the radiation area RI. Also, when the ultraviolet rays L are emitted through the second discharge port 212, there is a possibility that the ultraviolet rays L may enter a living space of a user.

The light blocking member 280 may be provided to prevent the ultraviolet rays L radiated from the light source 240 from being incident on the outside of the radiation area RI. Also, the light blocking member 280 may be provided to allow passage of air flowing along the second flow path P2.

For example, the light blocking member 280 may include a plurality of grille portions 281 and an air ventilation portion 282 formed between the plurality of grille portions 281 and configured to be penetrated to allow passage of air in the second flow path P2. Air introduced into the second housing 210 through the second suction port 211 may be introduced into the radiation area RI through the air ventilation portion 282 of the first light blocking member 280a, discharged from the radiation area RI through the air ventilation portion 282 of the second light blocking member 280b and the third light blocking member 280c, and flow to the second discharge port 212.

Each of the plurality of grille portions 281 may be formed so that one surface 281a facing the grille portion 281 adjacent thereto is inclined relative to the one direction in which the radiation area RI extends. In other words, each of the plurality of grille portions 281 may extend in a direction inclined relative to the one direction in which the radiation area RI extends. Hereinafter, the one surface of each of the plurality of grille portions 281 that faces the grille portion 281 adjacent thereto will be referred to as an inclined surface 281a.

Since the inclined surface 281a is formed to be inclined relative to the direction in which the radiation area RI extends, in order to correspond thereto, the air ventilation portion 282 may also be formed to be inclined relative to the direction in which the radiation area RI extends.

A portion of the ultraviolet rays L radiated from the light source 240 may be incident toward the light blocking member 280. A rectilinear propagation path of the ultraviolet rays L incident toward the light blocking member 280 may be blocked by the inclined surface 281a. The ultraviolet rays L incident on the inclined surface 281a may be absorbed by the inclined surface 281a or reflected back toward the radiation area RI.

The light blocking member 280 may be configured to include an opaque material so that the ultraviolet rays L cannot pass therethrough. The ultraviolet rays L incident on the light blocking member 280 may be absorbed or reflected by the light blocking member 280. For example, light reflectivity of the light blocking member 280 may be configured to be lower than light reflectivity of the reflective cover 270, but the present disclosure is not limited thereto.

By such a configuration, the light blocking member 280 may allow passage of air flowing along the second flow path P2 but prevent the ultraviolet rays L radiated from the light source 240 from being incident on the outside of the radiation area RI.

The light blocking member 280 may include a light source support portion 283 provided to support the light source 240. The light source support portion 283 may be formed so that one portion of the light source 240 passes therethrough. More specifically, the light source support portion 283 may be formed to be penetrated by an end of the lamp body 241 of the light source 240. The light source fixing member 290 provided to fix the electrode portion 242 may be accommodated in the light source support portion 283. The light source support portion 283 may support the light source fixing member 290 and, accordingly, support the light source 240. That is, the light blocking member 280 may be provided to also perform a function of supporting or fixing the light source 240.

The above-described grille portion 281 and air ventilation portion 282 may be formed along the circumference of the light source support portion 283. The grille portion 281 and the air ventilation portion 282 may be provided to surround the light source support portion 283.

However, the present disclosure is not limited thereto, and the light blocking member 280 may be formed to have various other shapes.

The light source fixing member 290 may be covered by the light blocking member 280. Specifically, the light source fixing member 290 may be covered by the light source support portion 283 in the one direction (that is, the direction of extension of the light source 240, the radiation area RI, and the like). For example, the light blocking member 280 may cover the light source fixing member 290 in a direction toward the radiation area RI. Accordingly, the light source fixing member 290 may be protected from the ultraviolet rays L radiated from the light source 240.

By the above configuration, at least one portion of the ultraviolet rays L radiated from the light source 240 may be reflected by the reflective cover 270, and organic matter may be removed from air flowing along the radiation area RI. Also, at least another portion of the ultraviolet rays L radiated from the light source 240 may be incident toward the light blocking member 280 and may be absorbed or reflected by the light blocking member 280.

However, the above-described features of the configurations provided in the light source 240 or the radiation area RI are only some examples of the configuration for removing organic matter in the second flow path using the light source radiating ultraviolet rays in the air cleaner according to the spirit of the present disclosure. The spirit of the present disclosure is not limited to the above description.

For example, the light source provided in the second flow path P2 may be configured as a point light source by a light emitting diode (LED). Alternatively, for example, the light source provided in the second flow path P2 may be configured by a plurality of LEDs extending in one direction.

Also, for example, the light source, the radiation area, the reflective cover, and the like provided in the second flow path P2 may not extend in parallel to the one direction. In such a case, the light source may be disposed in various other ways to radiate ultraviolet rays to the radiation area, and the reflective cover may be disposed in various other ways to uniformly radiate light to the radiation area. Here, the light blocking member configured to prevent the ultraviolet rays radiated from the light source from being incident on the outside of the radiation area may be provided on at least one side of the radiation area.

Figure 15:
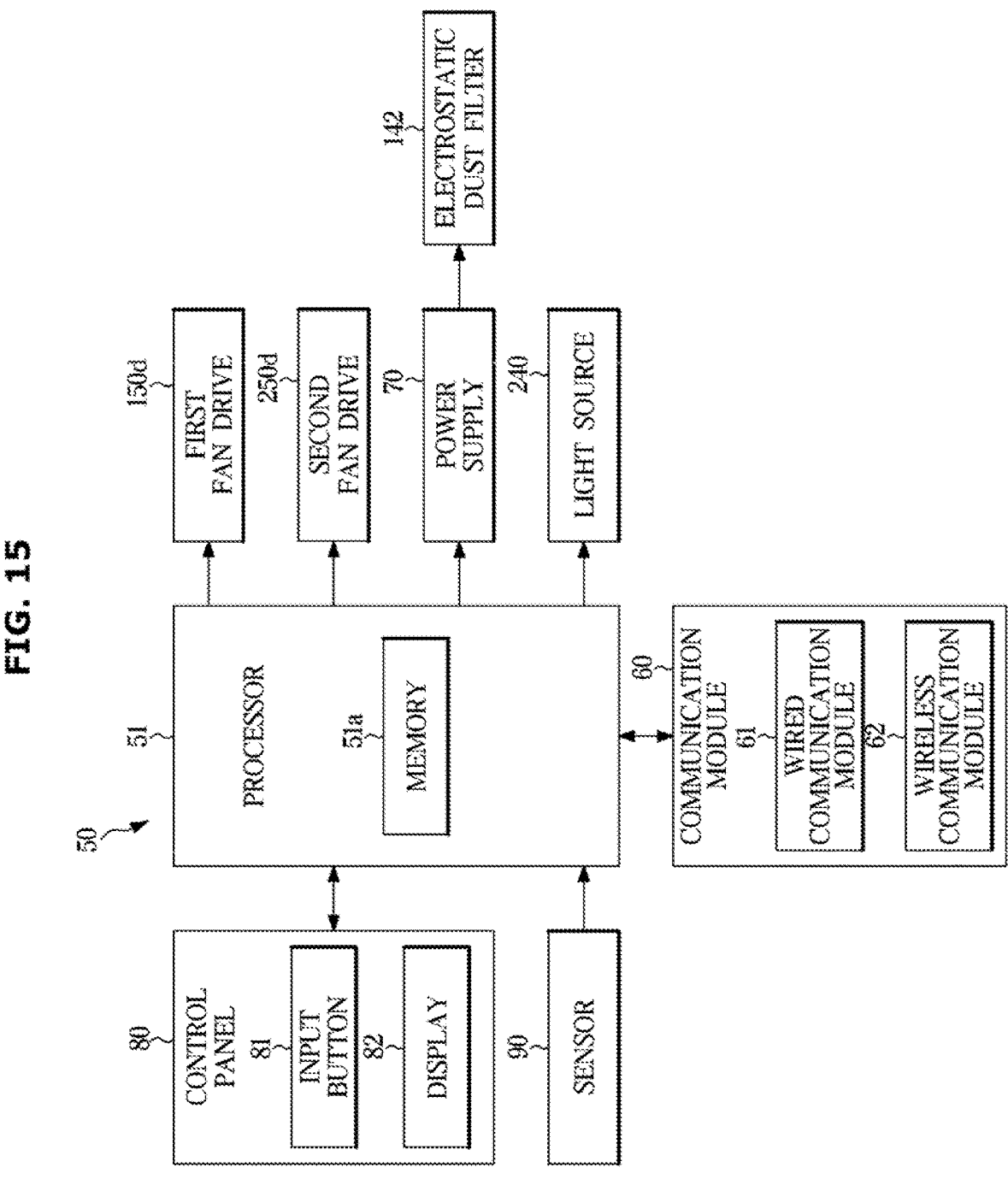
FIG. 15 is a block diagram illustrating a configuration of the air cleaner according to one embodiment of the present disclosure.

FIG. 15 is a block diagram illustrating a configuration of the air cleaner according to one embodiment of the present disclosure.

Referring to FIG. 15, the air cleaner 1 according to one embodiment of the present disclosure may include the control device 50 configured to control the operation of the air cleaner 1. The control device 50 may include a processor 51. The processor 51 may be configured using the above-described first PBA 52 or second PBA 53. For example, the processor 51 may be electrically connected to each of the power supply 70, a first fan drive 150d, a second fan drive 250d, the electrostatic dust filter 142, and the light source 240. For example, the processor 51 may be configured to control the operation of each of the power supply 70, the first fan drive 150d, the second fan drive 250d, the electrostatic dust filter 142, and the light source 240.

The control panel 80 may provide a user interface for interaction with a user to the user. Although an embodiment in which the control panel 80 is disposed at the upper portion of the second air cleaning unit 20 is illustrated in FIGS. 1 to 20, the present disclosure is not limited thereto, and the control panel 80 may be provided at various other positions in the air cleaner 1.

The control panel 80 may include the input button 81 and/or the display 82.

The input button 81 may obtain a user input related to the operation of the air cleaner 1. For example, the input button 81 may include a power button for turning the operation of the air cleaner 1 on or off, an air volume button for controlling an air volume of the air cleaner 1, and an operation mode button for selecting an operation mode of the air cleaner 1 (for example, a mode in which the operation of the first air cleaning unit 10 and the operation of the second air cleaning unit 20 are simultaneously performed (hereinafter referred to as a "first mode 1A," see FIG. 16), a mode in which only the operation of the first air cleaning unit 10 is performed (hereinafter referred to as a "second mode 1B," see FIG. 17), or a mode in which only the operation of the second air cleaning unit 20 is performed (hereinafter referred to as a "third mode 1C," see FIG. 18).

The input button 81 may provide an electrical signal corresponding to a user input (a user input signal) (for example, a voltage signal or a current signal) to the processor 51. The processor 51 may identify the user input based on processing the user input signal.

The input button 81 may include a tact switch, a push switch, a slide switch, a toggle switch, a microswitch, or a touch switch.

The display 82 may obtain operation information of the air cleaner 1 from the processor 51 and display the operation information of the air cleaner 1.

For example, the display 82 may display the operation mode (the first mode 1A, the second mode 1B, the third mode 1C, or the like) of the air cleaner 1 selected by the user. The display 82 may display the air volume of the air cleaner 1. Also, the display 82 may display information on an air condition (for example, concentration of dust, a gas, organic matter, or the like in air) measured by the sensor 90.

For example, the display 82 may include a liquid crystal display (LCD) panel, an LED panel, an LED, or the like.

The display 82 may be integrated with the input button 81. For example, a plurality of LEDs configured to emit light may be provided behind the input button 81 or inside the input button 81. As another example, the control panel 80 may include a touchscreen in which the display and a touchpad are integrated.

The sensor 90 may detect air around the air cleaner 1 and measure a condition of the air. In other words, the sensor 90 may measure a condition of air in an indoor space where the air cleaner 1 is installed.

For example, information on the air condition measured by the sensor 90 may include information on concentration of dust in air, concentration of carbon dioxide in air, concentration of other harmful gases (e.g., total volatile organic compounds (TVOC)) in air, concentration of organic matter in air, and the like.

The sensor 90 may send an electrical signal (for example, a voltage signal or a current signal) corresponding to the measured air condition (for example, concentration of dust, concentration of carbon dioxide, concentration of other harmful gases, and concentration of organic matter in air) to the processor 51. The processor 51 may identify a condition of air around the air cleaner 1 based on the electrical signal received from the sensor 90.

The sensor 90 may be disposed in the first air cleaning unit 10. Specifically, the sensor 90 may be disposed at the first inner frame 120 and may detect outside air through the sensing hole 113a provided in the first housing 110. However, the present disclosure is not limited thereto, and the sensor 90 may be disposed in various other ways. For example, the sensor 90 may be disposed at a position adjacent to the first suction port 111 and detect air suctioned into the first suction port 111. Alternatively, for example, the sensor 90 may be provided in the second air cleaning unit 20 and detect outside air. Alternatively, for example, the sensor 90 may be provided inside the second air cleaning unit 20 and detect air in the second flow path P2.

Alternatively, for example, the sensor 90 may be configured as a flow sensor (not illustrated) configured to detect a flow rate or flow velocity of air flowing along the second flow path P2. The flow sensor may be provided inside the second air cleaning unit 20 and configured to output an electrical signal corresponding to the flow rate or flow velocity of air flowing along the second flow path P2. For example, the flow sensor may be disposed inside the radiation area RI and configured to output an electrical signal corresponding to a flow rate or flow velocity of air flowing along the radiation area RI. The processor 51 may be configured to, based on a signal output from the flow sensor, determine the flow rate or flow velocity of air flowing along the second flow path P2.

Alternatively, for example, the sensor 90 may be configured as a flow sensor (not illustrated) configured to detect a flow rate or flow velocity of air flowing along the connection flow path CP. The flow sensor may be provided inside the intermediate duct 30 and configured to output an electrical signal corresponding to the flow rate or flow velocity of air flowing along the connection flow path CP. The processor 51 may be configured to, based on a signal output from the flow sensor, determine the flow rate or flow velocity of air flowing along the connection flow path CP.

The first air cleaning unit 10 may include the first fan drive 150*d* electrically connected to the first fan 150. The first fan drive 150*d* may receive an electrical signal relating to driving of the first fan 150 from the processor 51. The first fan drive 150*d* may control the driving of the first fan 150 based on the electrical signal received from the processor 51.

The second air cleaning unit 20 may include the second fan drive 250*d* electrically connected to the second fan 250. The second fan drive 250*d* may receive an electrical signal relating to driving of the second fan 250 from the processor 51. The second fan drive 250*d* may control the driving of the second fan 250 based on the electrical signal received from the processor 51.

A communication module 60 may exchange data with external devices such as a server and/or a user device according to control of the processor 51.

The communication module 60 may include a wired communication module 61 configured to exchange data with the external devices via a wire and a wireless communication module 62 configured to wirelessly exchange data with the external devices.

The wired communication module 61 may connect to a wired communication network and communicate with the external devices through the wired communication network. For example, the wired communication module 61 may connect to the wired communication network through the Ethernet (based on IEEE 802.3) and receive data from the external devices through the wired communication network.

The wireless communication module 62 may wirelessly communicate with a base station or an access point (AP) and may connect to the wired communication network through the base station or AP. The wireless communication module 62 may also communicate with the external devices connected to the wired communication network via the base station or AP. For example, the wireless communication module 62 may wirelessly communicate with the AP using WiFi™ (based on IEEE 802.11) or may communicate with the base station using Code-Division Multiple Access (CDMA), Wideband Code Division Multiple Access (WCDMA), Global System for Mobile Communications (GSM), Long Term Evolution (LTE), Wireless Broadband Internet (WiBro), or the like. The wireless communication module 62 may also receive data from the external devices via the base station or AP.

Further, the wireless communication module 62 may directly communicate with the external devices. For example, the wireless communication module 62 may wirelessly receive data from the external devices using WiFi™, Bluetooth™ (based on IEEE 802.15.1), ZigBee™ (based on IEEE 802.15.4), or the like.

In this way, the communication module 60 may exchange data with the external devices. The communication module 60 may transmit data received from the external devices to the processor 51 and may send data received from the processor 51 to the external devices.

The processor 51 may generate a control signal for controlling the operation of the air cleaner 1. The processor 51 may include a memory 51*a* configured to recall and/or store a program and data for generating the control signal. The processor 51 may include a single processor or two or more processors, and the memory 51*a* may be integrally provided with the processor 51 or separately provided from the processor 51.

The processor 51 may process data and/or a signal according to the program stored in the memory 51*a* and may, based on a processing result, provide a control signal to each configuration of the air cleaner 1.

The processor 51 may receive an electrical signal indicating a user input on the control panel 80 and an electrical signal indicating an output value of the sensor 90 relating to an air condition. The processor 51 may, based on processing the electrical signals, identify the user input and the measured air condition.

The processor 51 may determine driving of the air cleaner 1 based on the user input on the control panel 80, the communication data of the communication module 60, or the output value of the sensor 90.

For example, in a case in which the user inputs a selected operation mode among the operation modes of the air cleaner 1 (the first mode 1A, the second mode 1B, the third mode 1C, and the like) using the control panel 80 or an external device performing communication with the communication module 60, the processor 51 may determine driving of the first air cleaning unit 10 and the second air cleaning unit 20 that corresponds to the selected operation mode.

For example, in a case in which the user inputs a selected air volume using the control panel 80 or an external device performing communication with the communication module 60, the processor 51 may determine a rotational speed of the first fan 150 and the second fan 250 that corresponds to the selected air volume.

For example, the processor 51 may identify concentration of dust, a gas, or the like in air that is measured by the sensor 90 and determine the rotational speed of the first fan 150 and the second fan 250 for providing a target air volume according to the concentration of the dust, gas, or the like.

The processor 51 may store a table including data relating to concentration of dust, a gas, or the like in air, data relating to a target air volume of the air cleaner 1 corresponding thereto, and data relating to a rotational speed of the first fan 150 and the second fan 250 corresponding thereto. Using the table, the processor 51 may determine an air volume of the air cleaner 1 that corresponds to the measured concentration of the dust, gas, or the like in the air and may determine the rotational speed of the first fan 150 and the second fan 250.

For example, the processor 51 may identify concentration of organic matter in air that is measured by the sensor 90 and may determine an operation mode of the air cleaner 1 that corresponds to the concentration of the organic matter. For example, the processor 51 may determine the first mode 1A as the operation mode of the air cleaner 1 in a case in which the concentration of the organic matter in the air is higher than a first concentration value. The processor 51 may determine the second mode 1B as the operation mode of the air cleaner 1 in a case in which the concentration of the organic matter in the air is lower than the first concentration value and higher than a second concentration value. The processor 51 may determine the third mode 1C as the operation mode of the air cleaner 1 in a case in which the concentration of the organic matter in the air is lower than the second concentration value.

The processor 51 may store a table including data relating to concentration of organic matter in air and the operation modes of the air cleaner 1 corresponding thereto. Using the table, the processor 51 may determine an operation mode of the air cleaner 1 that corresponds to the measured concentration of the organic matter in the air.

The processor 51 may, based on the user input on the control panel 80, the communication data of the communication module 60, or the output value of the sensor 90, provide a control signal for driving of the air cleaner 1 to the first fan drive 150*d*, the second fan drive 250*d*, the light source 240, the electrostatic dust filter 142, the power supply 70, and the like.

Control of each configuration by the processor 51 will be described by referring to the case in which the first air cleaning unit 10 operates as a first operation and referring to the case in which the second air cleaning unit 20 operates as a second operation.

The processor 51 may control the first fan drive 150*d* to rotate the first fan 150 in the first operation. In the first operation, the processor 51 may be configured to apply power to the electrostatic dust filter 142. For example, the processor 51 may control the power supply 70 to apply power to the electrostatic dust filter 142.

The processor 51 may control the second fan drive 250*d* to rotate the second fan 250 in the second operation. In the second operation, the processor 51 may control the light source 240 to radiate ultraviolet rays to the radiation area RI.

The first mode 1A of the air cleaner is an operation mode in the case in which the first operation and the second operation are simultaneously performed.

For example, in the case in which the processor 51 determines the first mode 1A as the operation mode of the air cleaner 1, the processor 51 may control the first fan drive 150*d* and the second fan drive 250*d* to rotate the first fan 150 and the second fan 250, control the power supply 70 to apply power to the electrostatic dust filter 142, and control the light source 240 to radiate ultraviolet rays.

The second mode 1B of the air cleaner is an operation mode in the case in which only the first operation is performed among the first operation and the second operation.

For example, in the case in which the processor 51 determines the second mode 1B as the operation mode of the air cleaner 1, the processor 51 may control the first fan drive 150*d* and the second fan drive 250*d* to rotate the first fan 150 and not rotate the second fan 250, control the power supply 70 to apply power to the electrostatic dust filter 142, and control the light source 240 to not radiate ultraviolet rays.

The third mode 1C of the air cleaner is an operation mode in the case in which only the second operation is performed among the first operation and the second operation.

For example, in the case in which the processor 51 determines the third mode 1C as the operation mode of the air cleaner 1, the processor 51 may control the first fan drive 150*d* and the second fan drive 250*d* to not rotate the first fan 150 and to rotate the second fan 250, control the power supply 70 to not apply power to the electrostatic dust filter 142, and control the light source 240 to radiate ultraviolet rays.

The configuration of the air cleaner 1 described above with reference to FIG. 15 is only one example of a configuration of the air cleaner according to the spirit of the present disclosure, and the present disclosure is not limited thereto.

Figure 16:
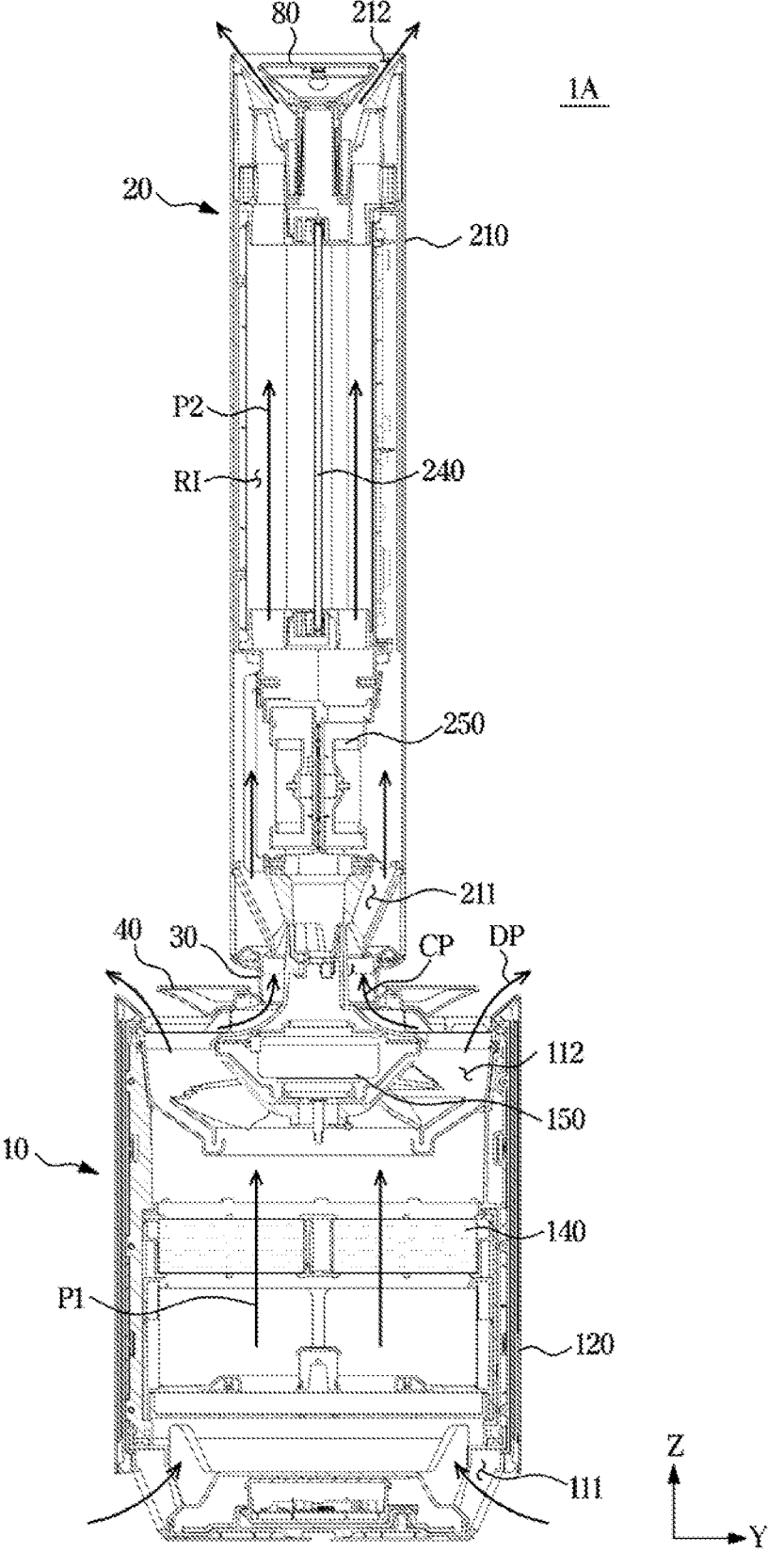
FIG. 16 is a lateral cross-sectional view for describing an operation according to a first mode of the air cleaner according to one embodiment of the present disclosure.

FIG. 16 is a lateral cross-sectional view for describing an operation according to the first mode of the air cleaner according to one embodiment of the present disclosure.

Referring to FIG. 16, the air cleaner 1 according to one embodiment of the present disclosure may be operated in the first mode 1A in which the first air cleaning unit 10 and the second air cleaning unit 20 may be simultaneously driven. In the first mode 1A, the first air cleaning unit 10 may purify air of the first flow path P1, and the second air cleaning unit 20 may purify air of the second flow path P2.

In the first mode 1A, the first fan 150 and the second fan 250 may be simultaneously driven.

In the first mode 1A, the dust collector filter 140 and the light source 240 may be simultaneously driven.

In the first mode 1A, the first flow path P1 may be provided so that air introduced from the first suction port 111 flows to be discharged to the first discharge port 112. For example, in the first mode 1A, air flowing along the first flow path P1 may flow in the up-down direction.

In the first mode 1A, the second flow path P2 may be provided so that air introduced from the second suction port 211 flows to be discharged to the second discharge port 212. For example, in the first mode 1A, air flowing along the second flow path P2 may flow in the up-down direction.

In the first mode 1A, the connection flow path CP may be provided so that at least one portion of air discharged from the first discharge port 112 flows to be discharged to the second suction port 211. For example, in the first mode 1A, air flowing along the connection flow path CP may flow in the up-down direction.

In the first mode 1A, the discharge flow path DP may be provided so that at least another portion of the air discharged from the first discharge port 112 flows to be discharged to the outside of the air cleaner 1.

In order to improve purification efficiency of the air cleaner 1, a flow rate of air purified by the first air cleaning unit 10 and a flow rate of air purified by the second air cleaning unit 20 need to be appropriately set. In other words, a flow rate of air flowing along the first flow path P1 and a flow rate of air flowing along the second flow path P2 need to be appropriately set. The flow rates may be changed according to a ratio between a flow rate of air flowing along the connection flow path CP branched from the first flow path P1 and a flow rate of air flowing along the discharge flow path DP branched from the first flow path P1.

In order to improve air sterilization efficiency according to the second air cleaning unit 20, a flow velocity of air flowing in the second flow path P2 may need to be appropriately set in consideration of the quantity, wavelength, or the like of ultraviolet rays radiated from the light source 240. This is because, in a case in which the flow velocity of air flowing along the second flow path P2 is too high, there is a possibility that sterilization of air by ultraviolet rays may not be sufficiently performed, and conversely, in a case in which the flow velocity of air flowing along the second flow path P2 is too low, there is a possibility that air purification efficiency may be reduced.

In order to optimize the flow velocity of air flowing along the second flow path P2, a flow rate of air introduced into the second flow path P2 through the connection flow path CP may need to be appropriately set. In order to optimize the flow rate of the air introduced into the second flow path P2, a ratio between a flow rate of air flowing to the connection flow path CP and a flow rate of air flowing to the discharge flow path DP in the first mode 1A may need to be appropriately set.

For example, in order to improve efficiency of sterilization by ultraviolet rays radiated from the light source 240, the flow velocity of air flowing along the second flow path P2 may be set to be maintained at about 0.05 CMM (Cubic Meter per Minute). The flow rate of air introduced into the second flow path P2 may be set in consideration of the flow velocity of air, a cross-sectional area of the second flow path P2, and the like, and for example, a flow rate of air introduced into the connection flow path CP and a flow rate of air introduced into the discharge flow path DP may be set to have a ratio of about 20 to 80.

The numerical values relating to the flow velocity of air, the ratio between the flow rates, and the like described above are only some examples given to describe the process of setting the flow velocity of air in the second flow path P2, the ratio between the flow rates of air introduced into the connection flow path CP and air introduced into the discharge flow path DP, and the like in order to improve purification efficiency of the air cleaner 1 according to one embodiment of the present disclosure, and the spirit of the present disclosure is not limited thereto.

The flow velocity of air, the ratio between the flow rates, and the like in the air cleaner 1 may be set in various ways according to characteristics, such as the quantity and wavelength, of ultraviolet rays radiated from the light source 240, the length or cross-sectional area of the second flow path P2, the shape of the connection flow path CP and the discharge flow path DP, and other features of configurations constituting the air cleaner 1.

Hereinafter, an example of a method of controlling the operation of the air cleaner 1 in order to efficiently purify air in the first mode 1A will be described.

For example, the light source 240 of the air cleaner 1 may be configured to radiate ultraviolet rays in different quantities of various intensities such as a first quantity and a second quantity whose intensity is higher than the first quantity. The "first quantity," "second quantity," and the like mentioned herein are only terms used to compare the sizes of quantities of ultraviolet rays radiated from the light source 240, and the interpretation of the quantity of ultraviolet rays radiated from the light source 240 is not limited by expressions such as "first" and "second."

For example, the second fan 250 of the air cleaner 1 may be configured to rotate at various rotational speeds such as a first rotational speed and a second rotational speed faster than the first rotational speed.

The "first rotational speed," "second rotational speed," and the like mentioned herein are only terms used to compare the rotational speeds of the second fan 250, and the interpretation of the rotational speed of the second fan 250 is not limited by expressions such as "first" and "second."

The processor 51 of the air cleaner 1 may be configured to determine the quantity of ultraviolet rays radiated from the light source 240 and the rotational speed of the second fan 250 in order to efficiently purify air in the first mode 1A. The processor 51 may be configured to control the light source 240 based on the determined quantity of ultraviolet rays. The processor 51 may be configured to control the second fan drive 250d based on the determined rotational speed of the second fan 250.

For example, in the air cleaner 1 operated in the first mode 1A, the processor 51 which has received a user input, an output value of the sensor 90, or the like may determine to increase the flow velocity of air flowing along the second flow path P2 in order to improve an air purification speed. Based on the determination, the processor 51 may control the second fan drive 250d so that the rotational speed of the second fan 250 changes from the first rotational speed to the second rotational speed.

As the flow velocity of air flowing along the second flow path P2 increases, the intensity of ultraviolet rays radiated to the radiation area RI may be required to be increased. Accordingly, the processor 51 may determine to increase the quantity of ultraviolet rays radiated to the radiation area RI from the first quantity to the second quantity. Based on the determination, the processor 51 may control the light source 240 so that the quantity of ultraviolet rays radiated to the radiation area RI changes from the first quantity to the second quantity.

Conversely, for example, in the air cleaner 1 operated in the first mode 1A, the processor 51 which has received a user input, an output value of the sensor 90, or the like may determine to decrease the flow velocity of air flowing along the second flow path P2. Based on the determination, the processor 51 may control the second fan drive 250d so that the rotational speed of the second fan 250 changes from the second rotational speed to the first rotational speed.

As the flow velocity of air flowing along the second flow path P2 decreases, the intensity of ultraviolet rays radiated to the radiation area RI may be sufficient to purify air even when decreased. Accordingly, the processor 51 may determine to decrease the quantity of ultraviolet rays radiated to the radiation area RI from the second quantity to the first quantity. Based on the determination, the processor 51 may control the light source 240 so that the quantity of ultraviolet rays radiated to the radiation area RI changes from the second quantity to the first quantity.

Although description has been given above while assuming that the rotational speed of the second fan 250 is determined and then the quantity of ultraviolet rays radiated from the light source 240 is determined to correspond thereto, the present disclosure is not limited thereto. The processor 51 may also determine the quantity of ultraviolet rays radiated from the light source 240 and then determine the rotational speed of the second fan 250 to correspond thereto. Here, determining of the rotational speed of the second fan 250 and determining of the quantity of ultraviolet rays radiated from the light source 240 may be performed almost simultaneously.

The rotational speed of the second fan 250 may be configured to have discontinuous values. Alternatively, the rotational speed of the second fan 250 may be configured to have continuous values.

The quantity of ultraviolet rays radiated from the light source 240 may be configured to have discontinuous values. Alternatively, the quantity of ultraviolet rays radiated from the light source 240 may be configured to have continuous values.

Alternatively, for example, the first fan 150 may be configured to rotate at various rotational speeds. As described above in the example in which the rotational speed of the second fan 250 changes, the processor 51 may be configured to determine the quantity of ultraviolet rays radiated from the light source 240 and the rotational speed of the first fan 150 in order to efficiently purify air in the first mode 1A. The processor 51 may be configured to control the light source 240 based on the determined quantity of ultraviolet rays. The processor 51 may be configured to control the first fan drive 150d based on the determined rotational speed of the first fan 150.

For example, in a case in which the rotational speed of the first fan 150 increases, the flow velocity may increase in all of the flow paths including the first flow path P1, the connection flow path CP, and the second flow path P2, and accordingly, the quantity of ultraviolet rays of the light source 240 may be required to be increased. Accordingly, the processor 51 may control the first fan drive 150d so that the rotational speed of the first fan 150 increases and may control the light source 240 so that the quantity of ultraviolet rays radiated to the radiation area RI increases.

Conversely, in a case in which the rotational speed of the first fan 150 decreases, the flow velocity may decrease in all of the flow paths including the first flow path P1, the connection flow path CP, and the second flow path P2, and accordingly, the quantity of ultraviolet rays of the light source 240 may be sufficient even when decreased. Accordingly, the processor 51 may control the first fan drive 150d so that the rotational speed of the first fan 150 decreases and may control the light source 240 so that the quantity of ultraviolet rays radiated to the radiation area RI decreases.

The processor 51 may be configured to determine the flow velocity of air by various configurations in order to control the fan drives 150d and 250d, the light source 240, or the like.

For example, the air cleaner 1 may include a flow sensor (not illustrated) configured to measure the flow rate or flow velocity of air, and the processor 51 may be configured to determine the flow rate or flow velocity of the air based on an electrical signal output from the flow sensor and, based on the determined flow rate or flow velocity of the air, control driving of each configuration of the air cleaner 1.

For example, the flow sensor may be provided in the first air cleaning unit 10 and configured to output an electrical signal that corresponds to the flow rate or flow velocity of air flowing along the first flow path P1, and the processor 51 may be configured to, based on the electrical signal output from the flow sensor, determine the flow rate or flow velocity of the air flowing along the first flow path P1. The processor 51 may be configured to control the first fan drive 150d or the light source 240 based on the determined flow rate or flow velocity of the air in the first flow path P1.

For example, the flow sensor may be provided in the second air cleaning unit 20 and configured to output an electrical signal that corresponds to the flow rate or flow velocity of air flowing along the second flow path P2, and the processor 51 may be configured to, based on the electrical signal output from the flow sensor, determine the flow rate or flow velocity of the air flowing along the second flow path P2. The processor 51 may be configured to control the second fan drive 250d or the light source 240 based on the determined flow rate or flow velocity of the air in the second flow path P2.

For example, the flow sensor may be provided in the intermediate duct 30 and configured to output an electrical signal that corresponds to the flow rate or flow velocity of air flowing along the connection flow path CP, and the processor 51 may be configured to, based on the electrical signal output from the flow sensor, determine the flow rate or flow velocity of the air flowing along the connection flow path CP. The processor 51 may be configured to control the second fan drive 250d or the light source 240 based on the determined flow rate or flow velocity of the air in the connection flow path CP.

Alternatively, for example, the processor 51 may store a table including data relating to current/voltage input to the fan drives 150d and 250d and data relating to current/voltage input to the light source 240 corresponding thereto. The processor 51 may be configured to, using the table, control the fan drives 150d and 250d and the light source 240.

However, the content described above is only one of various examples of the method in which the processor 51 controls each configuration of the air cleaner 1 to improve air purification efficiency of the air cleaner 1 in the first mode 1A, and the spirit of the present disclosure is not limited thereto.

Figure 17:
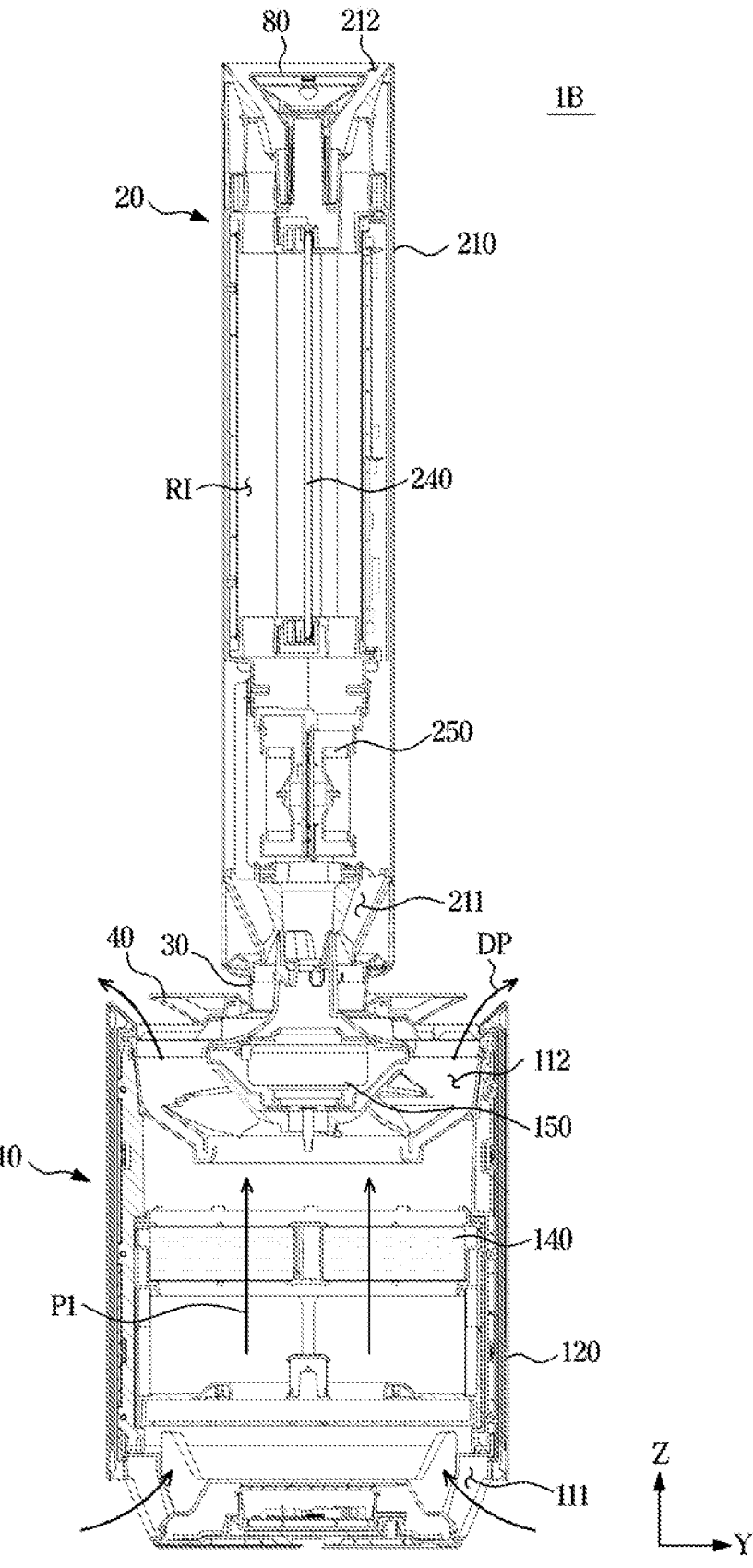
FIG. 17 is a lateral cross-sectional view for describing an operation according to a second mode of the air cleaner according to one embodiment of the present disclosure.

FIG. 17 is a lateral cross-sectional view for describing an operation according to the second mode of the air cleaner according to one embodiment of the present disclosure.

Referring to FIG. 17, the air cleaner 1 according to one embodiment of the present disclosure may be operated in the second mode 1B in which only the first air cleaning unit 10 may be driven among the first air cleaning unit 10 and the second air cleaning unit 20. In the second mode 1B, the first air cleaning unit 10 may purify air of the first flow path P1, and the second air cleaning unit 20 may purify air of the second flow path P2.

In the second mode 1B, only the first fan 150 may be driven among the first fan 150 and the second fan 250.

In the second mode 1B, only the dust collector filter 140 may be driven among the dust collector filter 140 and the light source 240.

In the second mode 1B, the first flow path P1 may be provided so that air introduced from the first suction port 111 flows to be discharged to the first discharge port 112. For example, in the second mode 1B, air flowing along the first flow path P1 may flow in the up-down direction.

In the second mode 1B, the discharge flow path DP may be provided so that air discharged from the first discharge port 112 flows to be discharged to the outside of the air cleaner 1.

In the second mode 1B, air discharged from the first discharge port 112 may not flow to the second flow path P2 through the connection flow path CP.

In the second mode 1B, even in a case in which the first fan 150 is driven and generates pressure for an air flow, since the second fan 250 is not driven, resistance may be generated for an air flow in the second flow path P2. In other words, the second fan 250 may generate pressure opposite to the pressure generated by the first fan 150 and may generate resistance in the opposite direction for air about to flow along the second flow path P2.

Accordingly, although the first flow path P1 and the second flow path P2 are still connected by the connection flow path CP, and the first housing 110 and the second housing 210 still communicate in the second mode 1B, most of the air discharged from the first discharge port 112 may flow to the discharge flow path DP and not flow to the second flow path P2.

In particular, in the following embodiment in which the second fan 250 is configured as a centrifugal fan, air may be more efficiently prevented from flowing from the first flow path P1 to the second flow path P2 while the second fan 250 is not driven.

When a direction in which the connection flow path CP and the second flow path P2 are connected is referred to as a first direction, and a direction of the rotating shaft of the second fan 250, that is, the second fan rotating shaft 253, is referred to as a second direction, the first direction and the second direction may be orthogonal to each other. In other words, the connection flow path CP and the second flow path P2 may be connected in the first direction, and the second fan 250 may have the rotating shaft parallel to the second direction orthogonal to the first direction.

The second fan 250 may be provided so that air is discharged in the direction orthogonal to the second direction, which is the direction of the second fan rotating shaft 253, toward the light source 240. The direction orthogonal to the second direction mentioned herein may be a direction corresponding to the above first direction but may also be a direction inclined to have a predetermined angle relative to the first direction.

For example, the connection flow path CP and the second flow path P2 may extend in the up-down direction of the air cleaner 1. The second fan 250 may have the rotating shaft parallel to the horizontal direction of the air cleaner 1. The second fan 250 may be provided so that air introduced into the second fan case 254 is discharged in the direction orthogonal to the horizontal direction toward the light source 240.

In such a case, air may flow in the up-down direction as a whole in the connection flow path CP and the second flow path P2, but since air flow directions in the inlet 254a and the outlet 254b of the second fan 250 are different from each other (see FIG. 9 and so on), resistance may be efficiently generated for air about to flow from the first flow path P1 to the second flow path P2.

In this way, the second fan 250 may, while driven, allow introduction of air from the first flow path P1 to the second flow path P2 and, while not driven, serve as a damper that prevents introduction of air from the first flow path P1 to the second flow path P2.

However, the present disclosure is not limited thereto, and unlike in FIGS. 1 to 18, the air cleaner according to one embodiment of the present disclosure may include a separate damper configured to open and close the connection flow path CP or the second flow path P2. The damper may be open in the first mode 1A or the third mode 1C and may be closed in the second mode 1B.

By the above configuration, the air cleaner 1 may be operated in the second mode 1B in a case in which an air purification function can be sufficiently performed by operating only the first air cleaning unit 10 or a case in which a user wants to operate only the first air cleaning unit 10. Accordingly, an unnecessary operation of the second air cleaning unit 20 may be stopped to reduce power consumption.

Hereinafter, an example of controlling the operation of the air cleaner 1 to efficiently purify air in the second mode 1B will be described.

For example, the electrostatic dust filter 142 may be configured to receive voltage/current of various sizes through the power supply 70.

For example, the first fan 150 may be configured to rotate at various rotational speeds.

The processor 51 may be configured to determine the size of the voltage/current applied to the electrostatic dust filter 142 and the rotational speed of the first fan 150 in order to efficiently purify air in the second mode 1B. The processor 51 may be configured to control the power supply 70 based on the determined size of the voltage/current applied to the electrostatic dust filter 142. The processor 51 may be configured to control the first fan drive 150d based on the determined rotational speed of the first fan 150.

For example, in a case in which the rotational speed of the first fan 150 increases, the flow velocity of air flowing along the first flow path P1 may increase, and accordingly, the intensity of the voltage/current applied to the electrostatic dust filter 142 may be required to be increased. Accordingly, the processor 51 may control the first fan drive 150d so that the rotational speed of the first fan 150 increases and may control the power supply 70 so that the intensity of the voltage/current applied to the electrostatic dust filter 142 increases.

Conversely, for example, in a case in which the rotational speed of the first fan 150 decreases, the flow velocity of air flowing along the first flow path P1 may decrease, and accordingly, the intensity of the voltage/current applied to the electrostatic dust filter 142 may be sufficient even when decreased. Accordingly, the processor 51 may control the first fan drive 150d so that the rotational speed of the first fan 150 decreases and may control the power supply 70 so that the intensity of the voltage/current applied to the electrostatic dust filter 142 decreases.

Here, for example, determining of the rotational speed of the first fan 150 and determining of the voltage/current applied to the electrostatic dust filter 142 may be performed almost simultaneously.

The rotational speed of the first fan 150 may be configured to have discontinuous values. Alternatively, the rotational speed of the first fan 150 may be configured to have continuous values.

The voltage/current applied to the electrostatic dust filter 142 may be configured to have discontinuous values. Alternatively, the voltage/current applied to the electrostatic dust filter 142 may be configured to have continuous values.

The processor 51 may be configured to determine the flow velocity of air by various configurations in order to control the first fan drive 150d, the power supply 70, or the like.

For example, the air cleaner 1 may include a flow sensor (not illustrated) provided in the first air cleaning unit 10 and configured to output an electrical signal that corresponds to the flow rate or flow velocity of air flowing along the first flow path P1. The processor 51 may be configured to, based on the electrical signal output from the flow sensor, determine the flow rate or flow velocity of the air flowing along the first flow path P1. The processor 51 may be configured to control the first fan drive 150d or the power supply 70 based on the determined flow rate or flow velocity of the air in the first flow path P1.

Alternatively, for example, the processor 51 may store a table including data relating to current/voltage input to the first fan drive 150d and data relating to current/voltage applied to the electrostatic dust filter 142 corresponding thereto. The processor 51 may be configured to, using the table, control the first fan drive 150d and the power supply 70.

However, the content described above is only one of various examples of the method in which the processor 51 controls each configuration of the air cleaner 1 to improve air purification efficiency of the air cleaner 1 in the second mode 1B, and the spirit of the present disclosure is not limited thereto.

Figure 18:
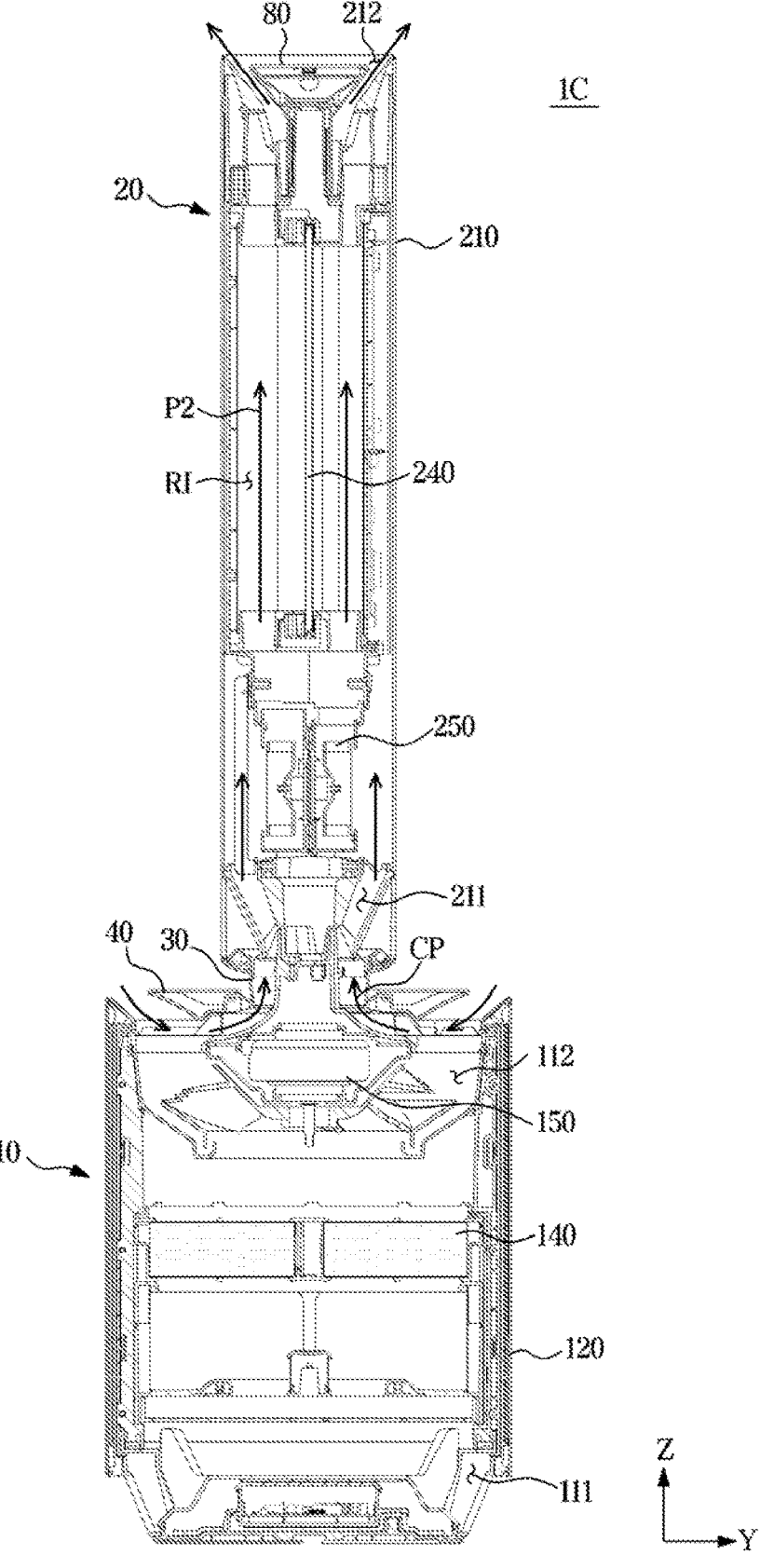
FIG. 18 is a lateral cross-sectional view for describing an operation according to a third mode of the air cleaner according to one embodiment of the present disclosure.

FIG. 18 is a lateral cross-sectional view for describing an operation according to the third mode of the air cleaner according to one embodiment of the present disclosure.

Referring to FIG. 18, the air cleaner 1 according to one embodiment of the present disclosure may be operated in the third mode 1C in which only the second air cleaning unit 20 may be driven among the first air cleaning unit 10 and the second air cleaning unit 20. In the third mode 1C, the second air cleaning unit 20 may purify air of the second flow path P2.

In the third mode 1C, only the second fan 250 may be driven among the first fan 150 and the second fan 250.

In the third mode 1C, only the light source 240 may be driven among the dust collector filter 140 and the light source 240.

In the third mode 1C, air may not flow along the first flow path P1.

In the third mode 1C, the second flow path P2 may be provided so that air introduced from the second suction port 211 flows to be discharged to the second discharge port 212. For example, in the third mode 1C, air flowing along the second flow path P2 may flow in the up-down direction.

In the third mode 1C, the connection flow path CP may be provided so that air introduced into the first flow path P1 from the outside through the discharge flow path DP and the first discharge port 112 flows to the second flow path P2 through the second suction port 211. For example, in the third mode 1C, air flowing along the connection flow path CP may flow in the up-down direction.

However, the present disclosure is not limited thereto, and the second air cleaning unit 20 may include a separate suction port (not illustrated) distinguished from the second suction port 211 and may be configured to suction air through the separate suction port.

By the above configuration, the air cleaner 1 may be operated in the third mode 1C in a case in which an air purification function can be sufficiently performed by operating only the second air cleaning unit 20 or a case in which a user wants to operate only the second air cleaning unit 20. Accordingly, an unnecessary operation of the first air cleaning unit 10 may be stopped to reduce power consumption.

By the above configuration, the air cleaner 1 according to one embodiment of the present disclosure may drive the dust collector filter 140 provided in the first flow path P1 and the light source 240 provided in the second flow path P2 as necessary and may improve air purification efficiency.

Also, in the air cleaner 1 according to one embodiment of the present disclosure, since the connection flow path CP and the discharge flow path DP are included, flow paths for air purification can be configured in various ways.

Also, since the operations of the first air cleaning unit 10 and the second air cleaning unit 20 of the air cleaner 1 according to one embodiment of the present disclosure can be selectively controlled, power consumption can be reduced, and efficient operation of the air cleaner 1 may be promoted.

Hereinafter, an example of controlling the operation of the air cleaner 1 to efficiently purify air in the third mode 1C will be described.

For example, the light source 240 of the air cleaner 1 may be configured to radiate ultraviolet rays in different quantities of various intensities such as a third quantity and a fourth quantity whose intensity is higher than the third quantity. The "third quantity," "fourth quantity," and the like mentioned herein are only terms used to compare the sizes of quantities of ultraviolet rays radiated from the light source 240, and the interpretation of the quantity of ultraviolet rays radiated from the light source 240 is not limited by expressions such as "third" and "fourth."

For example, the second fan 250 of the air cleaner 1 may be configured to rotate at various rotational speeds such as a third rotational speed and a fourth rotational speed faster than the third rotational speed. The "third rotational speed," "fourth rotational speed," and the like mentioned herein are only terms used to compare the rotational speeds of the second fan 250, and the interpretation of the rotational speed of the second fan 250 is not limited by expressions such as "third" and "fourth."

The processor 51 of the air cleaner 1 may be configured to determine the quantity of ultraviolet rays radiated from the light source 240 and the rotational speed of the second fan 250 in order to efficiently purify air in the third mode 1C. The processor 51 may be configured to control the light source 240 based on the determined quantity of ultraviolet rays. The processor 51 may be configured to control the second fan drive 250_d_ based on the determined rotational speed of the second fan 250.

For example, in the air cleaner 1 operated in the first mode 1A, the processor 51 may control the second fan drive 250_d_ so that the second fan 250 rotates at the third rotational speed. Also, in the air cleaner 1 operated in the first mode

1A, the processor 51 may control the light source 240 so that the third quantity of ultraviolet rays is radiated from the light source 240.

Here, even in a case in which the operation mode of the air cleaner 1 is changed from the first mode 1A to the third mode 1C, when the rotational speed of the second fan 250 is maintained, there is a possibility that the flow rate of air flowing along the second flow path P2 may be decreased and air purification efficiency may be reduced.

Accordingly, when the operation mode of the air cleaner 1 is changed from the first mode 1A to the third mode 1C, the processor 51 may determine to increase the flow rate and flow velocity of air flowing along the second flow path P2. Based on the determination, the processor 51 may control the second fan drive 250_d_ so that the rotational speed of the second fan 250 changes from the third rotational speed to the fourth rotational speed.

As the flow velocity of air flowing along the second flow path P2 increases, the intensity of ultraviolet rays radiated to the radiation area RI may be required to be increased. Accordingly, the processor 51 may determine to increase the quantity of ultraviolet rays radiated to the radiation area RI from the third quantity to the fourth quantity. Based on the determination, the processor 51 may control the light source 240 so that the quantity of ultraviolet rays radiated to the radiation area RI changes from the third quantity to the fourth quantity.

Conversely, for example, when the operation mode of the air cleaner 1 is changed from the third mode 1C to the first mode 1A, the processor 51 may determine to decrease the flow velocity of air flowing along the second flow path P2. Based on the determination, the processor 51 may control the second fan drive 250_d_ so that the rotational speed of the second fan 250 changes from the fourth rotational speed to the third rotational speed.

As the flow velocity of air flowing along the second flow path P2 decreases, the intensity of ultraviolet rays radiated to the radiation area RI may be sufficient for air purification even when decreased. Accordingly, the processor 51 may determine to decrease the quantity of ultraviolet rays radiated to the radiation area RI from the fourth quantity to the third quantity. Based on the determination, the processor 51 may control the light source 240 so that the quantity of ultraviolet rays radiated to the radiation area RI changes from the fourth quantity to the third quantity.

Although description has been given above while assuming that the rotational speed of the second fan 250 is determined and then the quantity of ultraviolet rays radiated from the light source 240 is determined to correspond thereto, the present disclosure is not limited thereto. The processor 51 may also determine the quantity of ultraviolet rays radiated from the light source 240 and then determine the rotational speed of the second fan 250 to correspond thereto. Here, determining of the rotational speed of the second fan 250 and determining of the quantity of ultraviolet rays radiated from the light source 240 may be performed almost simultaneously.

The rotational speed of the second fan 250 may be configured to have discontinuous values. Alternatively, the rotational speed of the second fan 250 may be configured to have continuous values.

The quantity of ultraviolet rays radiated from the light source 240 may be configured to have discontinuous values. Alternatively, the quantity of ultraviolet rays radiated from the light source 240 may be configured to have continuous values.

The processor 51 may be configured to determine the flow velocity of air by various configurations in order to control the second fan drive 250*d*, the light source 240, or the like.

For example, the air cleaner 1 may include a flow sensor (not illustrated) configured to measure the flow rate or flow velocity of air, and the processor 51 may be configured to determine the flow rate or flow velocity of the air based on an electrical signal output from the flow sensor and, based on the determined flow rate or flow velocity of the air, control driving of each configuration of the air cleaner 1.

For example, the flow sensor may be provided in the second air cleaning unit 20 and configured to output an electrical signal that corresponds to the flow rate or flow velocity of air flowing along the second flow path P2, and the processor 51 may be configured to, based on the electrical signal output from the flow sensor, determine the flow rate or flow velocity of the air flowing along the second flow path P2. The processor 51 may be configured to control the second fan drive 250*d* or the light source 240 based on the determined flow rate or flow velocity of the air in the second flow path P2.

For example, the flow sensor may be provided in the intermediate duct 30 and configured to output an electrical signal that corresponds to the flow rate or flow velocity of air flowing along the connection flow path CP, and the processor 51 may be configured to, based on the electrical signal output from the flow sensor, determine the flow rate or flow velocity of the air flowing along the connection flow path CP. The processor 51 may be configured to control the second fan drive 250*d* or the light source 240 based on the determined flow rate or flow velocity of the air in the connection flow path CP.

Alternatively, for example, the processor 51 may store a table including data relating to current/voltage input to the second fan drive 250*d* and data relating to current/voltage input to the light source 240 corresponding thereto. The processor 51 may be configured to, using the table, control the second fan drive 250*d* and the light source 240.

However, the content described above is only one of various examples of the method in which the processor 51 controls each configuration of the air cleaner 1 to improve air purification efficiency of the air cleaner 1 in the third mode 1C, and the spirit of the present disclosure is not limited thereto.

Meanwhile, embodiments in which the flow rate and flow velocity of air flowing along the first flow path P1, the second flow path P2, and the connection flow path CP are controlled by the rotational speed of the fans 150 and 250 (further, whether the fans 150 and 250 are rotated or stopped) have been described above with reference to FIGS. 16 to 18.

However, the spirit of the present disclosure is not limited thereto, and the flow rate and flow velocity of air flowing along the first flow path P1, the second flow path P2, and the connection flow path CP may be controlled by various other methods corresponding to the operation modes 1A, 1B, and 1C of the air cleaner 1.

Hereinafter, an embodiment in which the flow rate and flow velocity of air flowing along the connection flow path CP and the second flow path P2 are controlled using a damper will be described in detail with reference to FIGS. 19 and 20.

Figure 19:
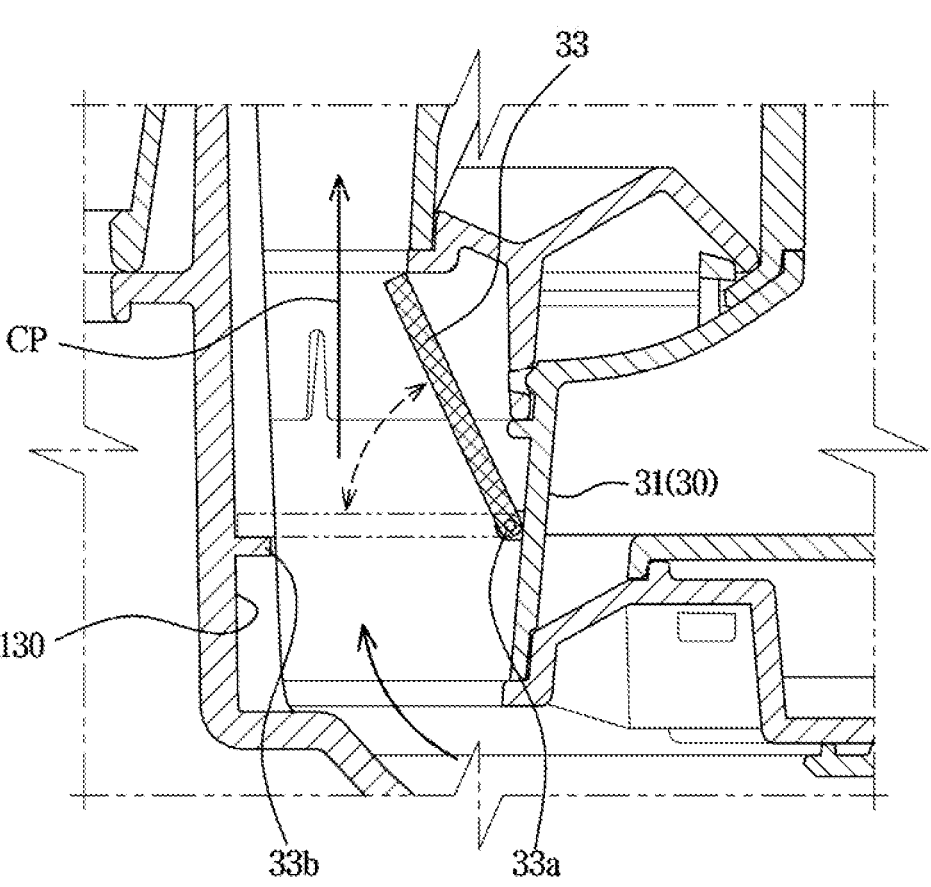
FIG. 19 is a view for describing one example of a configuration provided to control a flow rate of air introduced into a second flow path through a connection flow path in the air cleaner according to one embodiment of the present disclosure.

FIG. 19 is a view for describing one example of a configuration provided to control a flow rate of air introduced into the second flow path through the connection flow path in the air cleaner according to one embodiment of the present disclosure.

In describing the embodiment of FIG. 19, configurations identical to the configurations illustrated in FIGS. 1 to 18 may be denoted by the same reference numerals, and description thereof may be omitted.

Referring to FIG. 19, the air cleaner 1 according to one embodiment of the present disclosure may include a damper 33 provided to open and close the connection flow path CP. The damper 33 may be provided to open and close the connection flow path CP as the damper 33 rotates about a rotating shaft 33*a*. The damper 33 may be provided inside the intermediate duct 30.

The rotating shaft 33*a* of the damper 33 may be provided to be rotatable relative to the intermediate duct 30. For example, the rotating shaft 33*a* of the damper 33 may be rotatably supported by an inner wall of the duct body 31.

The damper 33 may receive a rotational force by a driving source (not illustrated). For example, the rotating shaft 33*a* of the damper 33 may be configured to be connected to a driving source such as a motor (not illustrated) and transmit a rotational force to the damper 33.

The processor 51 may be electrically connected to the driving source of the damper 33. The processor 51 may be configured to determine the position of the damper 33 and, based on the determined position of the damper 33, control driving of the driving source of the damper 33. For example, the processor 51 may determine the position of the damper 33 based on the operation modes 1A, 1B, and 1C of the air cleaner 1 and the flow rate or flow velocity of air determined to be introduced into the second flow path P2.

For example, the processor 51 may be configured to determine one of a position at which the damper 33 opens the connection flow path CP and a position at which the damper 33 closes the connection flow path CP as the position of the damper 33.

Alternatively, for example, the processor 51 may be configured to determine one of the position at which the damper 33 opens the connection flow path CP, the position at which the damper 33 closes the connection flow path CP, and a position at which the damper 33 opens only a portion of the connection flow path CP as the position of the damper 33.

The air cleaner 1 may include a damper support portion 33*b* configured to support the other side of the damper 33 that opposes one side of the damper 33 at which the rotating shaft 33*a* is provided. For example, the damper support portion 33*b* may be provided to support the other side of the damper 33 when the damper 33 is at the closing position.

The damper 33 may be provided as a plurality of dampers 33. For example, as in the case of the embodiment of FIG. 19, the connection flow path CP may be formed to have a substantially annular shape, and the plurality of dampers 33 may be arranged in the substantially annular shape along the connection flow path CP.

For example, the processor 51 may simultaneously control driving sources of the dampers 33 so that the plurality of dampers 33 are simultaneously opened or closed. Alternatively, for example, the processor 51 may separately control the driving sources of the dampers 33 so that the plurality of dampers 33 are separately opened or closed.

The configurations such as the rotating shaft 33*a* and the damper support portion 33*b* of the damper 33 may be provided to correspond to the arrangement of the plurality of dampers 33.

However, the present disclosure is not limited thereto, and the damper 33 may also be provided as a single damper 33 according to the shape or the like of the connection flow path CP.

Alternatively, for example, even in the case in which the connection flow path CP is formed in a substantially annular shape as in the embodiment of FIG. 19, the damper 33 may include a flexible member (not illustrated) configured to include a stretchable material and may be configured as a single damper 33.

The configuration described above is only one example of the damper provided to control the flow rate and flow velocity of air introduced into the second flow path through the connection flow path in the air cleaner according to the spirit of the present disclosure, and the spirit of the present disclosure is not limited thereto.

Although FIG. 19 is illustrated while assuming that the damper 33 is open when rotated toward a direction in which the second air cleaning unit 20 is located (when rotated clockwise in FIG. 19) and the damper 33 is closed when rotated in the opposite direction (when rotated counterclockwise in FIG. 19), the present disclosure is not limited thereto. For example, the damper 33 may be configured to be closed when rotated toward the direction in which the second air cleaning unit 20 is located and may be configured to be open when rotated in the opposite direction.

Unlike in FIG. 19, the rotating shaft 33*a* of the damper 33 may also be provided at the first unit coupler 130.

Although the configuration in which the damper 33 is provided inside the intermediate duct 30 and provided to open and close the connection flow path CP has been described above as an example, the present disclosure is not limited thereto. For example, the damper 33 may also be provided inside the second air cleaning unit 20 and provided to open and close the second flow path P2.

Figure 20:
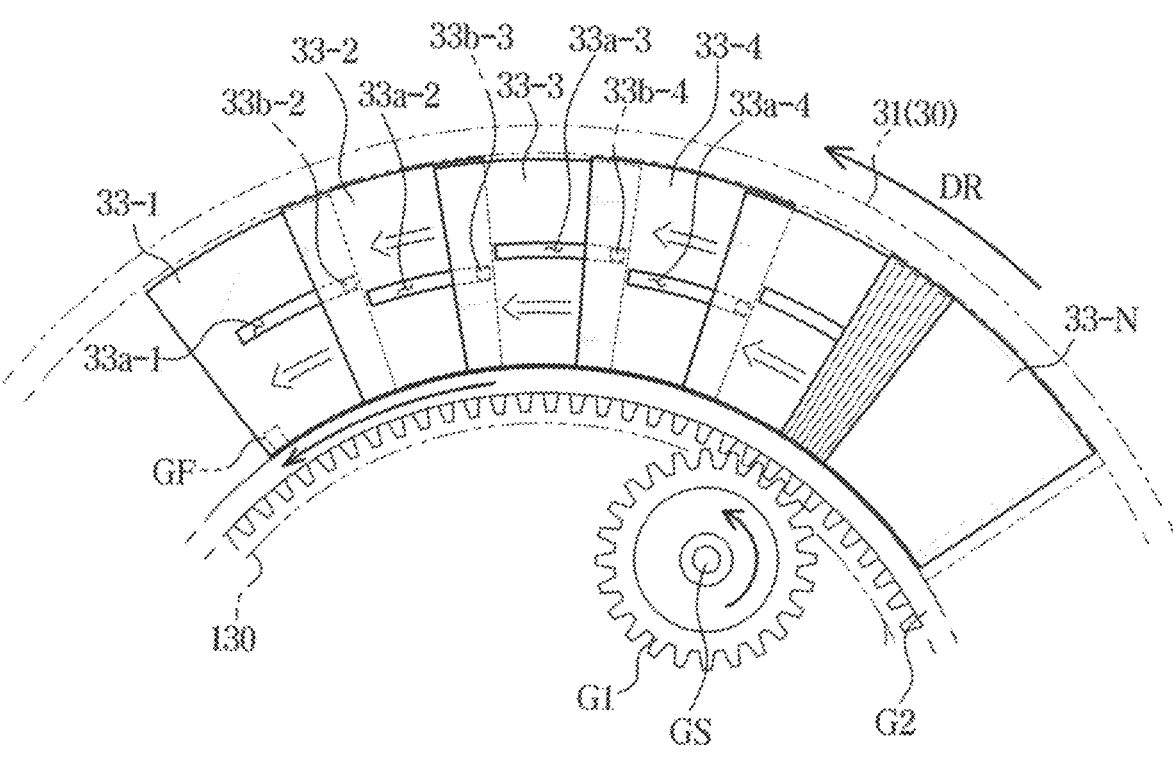
FIG. 20 is a view for describing one example of a configuration provided to control the flow rate of air introduced into the second flow path through the connection flow path in the air cleaner according to one embodiment of the present disclosure.

FIG. 20 is a view for describing one example of a configuration provided to control the flow rate of air introduced into the second flow path through the connection flow path in the air cleaner according to one embodiment of the present disclosure.

In describing the embodiment of FIG. 20, configurations identical to the configurations illustrated in FIGS. 1 to 19 may be denoted by the same reference numerals, and description thereof may be omitted.

FIG. 20 is a transverse cross-sectional view schematically illustrating the intermediate duct 30 and a partial configuration adjacent thereto of the air cleaner 1 that are cut out in a direction parallel to the X-Y plane. The partial configuration of the air cleaner 1 is illustrated as facing the Z-axis direction.

Referring to FIG. 20, the air cleaner 1 according to one embodiment of the present disclosure may include a damper 33-1, 33-2, . . . , 33-N provided to open and close the connection flow path CP. The damper 33-1, 33-2, . . . , 33-N may be provided as a plurality of dampers 33-1, 33-2, . . . , 33-N.

The plurality of dampers 33-1, 33-2, . . . , 33-N may be provided to move in the transverse direction (the direction parallel to the X-Y plane) and open and close the connection flow path CP. The dampers 33-1, 33-2, . . . , 33-N may be provided inside the intermediate duct 30.

Hereinafter, one example in which the plurality of dampers 33-1, 33-2, . . . , 33-N are configured to open and close the connection flow path CP will be described in detail.

The plurality of dampers 33-1, 33-2, . . . , 33-N may be configured as N dampers. Here, N may be an integer that is 1 or greater. For convenience of description, individual dampers included in the plurality of dampers 33-1, 33-2, . . . , 33-N will be referred to as a first damper 33-1, a second damper 33-2, a third damper 33-3, a fourth damper 33-4, . . . , an N-th damper 33-N, and the like. The first damper 33-1, the second damper 33-2, the third damper 33-3, the fourth damper 33-4, . . . , the N-th damper 33-N may be sequentially arranged with each other.

The air cleaner 1 may include power transmission members G1 and G2 provided to transmit power to the plurality of dampers 33-1, 33-2, . . . , 33-N.

For example, the power transmission members G1 and G2 may include a first gear G1 configured to maintain a fixed position relative to the connection flow path CP and a second gear G2 engaged with the first gear G1 and provided to be movable relative to the connection flow path CP.

The first gear G1 may be provided to be rotatable about a gear rotating shaft GS. The gear rotating shaft GS may be connected to a driving source (not illustrated) configured to transmit a rotational force to the first gear G1.

The second gear G2 may be engaged with the first gear G1 and provided to move as the first gear G1 rotates about the gear rotating shaft GS.

For example, the second gear G2 may be disposed in the circumferential direction of the connection flow path CP and may move in the circumferential direction of the connection flow path CP when the first gear G1 rotates.

For example, the first gear G1 may be provided at the first unit coupler 130 side. For example, the second gear G2 may be provided along the outer circumference of the first unit coupler 130.

The present disclosure is not limited thereto, and the plurality of dampers 33-1, 33-2, . . . , 33-N may be configured to receive power and be movable by various other configurations.

The first damper 33-1 may be fixed to the second gear G2. The first damper 33-1 may move together with the second gear G2 when the second gear G2 moves according to rotation of the first gear G1. Specifically, the first damper 33-1 may move in the circumferential direction of the connection flow path CP when the second gear G2 moves.

For example, the second gear G2 may include a gear fixing portion GF fixed to the first damper 33-1. The gear fixing portion GF may protrude toward the first damper 33-1 and be coupled to one surface of the first damper 33-1 or be inserted into the first damper 33-1. Alternatively, a protruding portion (not illustrated) of the first damper 33-1 may be inserted into the second gear G2 and fixed.

The plurality of dampers 33-1, 33-2, . . . , 33-N may be connected to each other. When the first damper 33-1 moves, at least some of the plurality of dampers 33-1, 33-2, . . . , 33-N may be provided to be movable according to the first damper 33-1.

For example, when the first damper 33-1 moves, among the plurality of dampers 33-1, 33-2, . . . , 33-N, the dampers excluding the N-th damper 33-N may be configured to be sequentially movable in the circumferential direction of the connection flow path CP together with the first damper 33-1.

For example, the N-th damper 33-N may be configured to maintain a fixed position relative to the connection flow path CP.

In an example illustrated in FIG. 20, in a case in which the first gear G1 rotates counterclockwise based on FIG. 20, the second gear G2 may also move counterclockwise based on FIG. 20. Likewise, the first damper 33-1 fixed to the second gear G2 may move counterclockwise based on FIG. 20. Here, the plurality of dampers 33-1, 33-2, . . . , 33-N may move to close the connection flow path CP.

In a case in which the first gear G1 rotates clockwise based on FIG. 20, the second gear G2 may also move clockwise based on FIG. 20. Likewise, the first damper 33-1 fixed to the second gear G2 may move clockwise based on FIG. 20. Here, the plurality of dampers 33-1, 33-2, . . . , 33-N may move to open the connection flow path CP.

For convenience of description, a direction in which the plurality of dampers 33-1, 33-2, . . . , 33-N move to close the connection flow path CP will be referred to as a closing direction DR and described below.

A first damper groove 33a-1 may be formed in one surface of the first damper 33-1 where the first damper 33-1 faces the second damper 33-2. The first damper groove 33a-1 may extend in a direction parallel to the closing direction DR.

A second damper protrusion 33b-2 having a shape that protrudes toward the first damper groove 33a-1 may be provided on one side of the second damper 33-2 where the second damper 33-2 faces the first damper 33-1. The second damper protrusion 33b-2 may be inserted into the first damper groove 33a-1. The second damper protrusion 33b-2 may be provided to be movable along the first damper groove 33a-1. That is, the second damper protrusion 33b-2 may be inserted into the first damper groove 33a-1 and may be provided to be movable in the closing direction DR or a direction opposite thereto along the first damper groove 33a-1.

In a case in which the first damper 33-1 moves in the closing direction DR in a state in which the second damper protrusion 33b-2 is disposed at one end of the first damper groove 33a-1 in the closing direction DR, the other end of the first damper groove 33a-1 may reach the second damper protrusion 33b-2. In a case in which the first damper 33-1 further moves in the closing direction DR when the other end of the first damper groove 33a-1 in a direction opposite to the closing direction DR has reached the second damper protrusion 33b-2, the first damper groove 33a-1 may press the second damper protrusion 33b-2 in the closing direction DR. Accordingly, the second damper 33-2 may move in the closing direction DR.

In a case in which the second damper 33-2 moves in the closing direction DR, a second damper groove 33a-2 of the second damper 33-2 may move to a position at which the second damper groove 33a-2 presses, in the closing direction DR, a third damper protrusion 33b-3 of the third damper 33-3 that is inserted into the second damper groove 33a-2, and accordingly, the third damper 33-3 may move in the closing direction DR.

Likewise, as the third damper 33-3 moves in the closing direction DR, a third damper groove 33a-3 may press a fourth damper protrusion 33b-4 in the closing direction DR, the fourth damper 33-4 may move in the closing direction DR, and a fourth damper groove 33a-4 may press a damper protrusion of another damper connected to the fourth damper 33-4. In this way, the above-described operations may sequentially occur. Accordingly, among the plurality of dampers 33-1, 33-2, . . . , 33-N, the dampers excluding the N-th damper 33-N may sequentially move in the closing direction DR from the first damper 33-1.

Conversely, in a case in which the first damper 33-1 moves in the direction opposite to the closing direction DR in a state in which the second damper protrusion 33b-2 is disposed at the other end of the first damper groove 33a-1 in the direction opposite to the closing direction DR, the one end of the first damper groove 33a-1 in the closing direction DR may reach the second damper protrusion 33b-2. In a case in which the first damper 33-1 further moves in the direction opposite to the closing direction DR when the one end of the first damper groove 33a-1 in the closing direction DR has reached the second damper protrusion 33b-2, the first damper groove 33a-1 may press the second damper protrusion 33b-2 in the direction opposite to the closing direction DR. Accordingly, the second damper 33-2 may move in the direction opposite to the closing direction DR.

Likewise, as the second damper 33-2 moves in the direction opposite to the closing direction DR, the second damper groove 33a-2 may press the third damper protrusion 33b-3 in the direction opposite to the closing direction DR, and the third damper groove 33a-3 may press the fourth damper protrusion 33b-4 in the direction opposite to the closing direction DR. In this way, the operations may sequentially occur, and among the plurality of dampers 33-1, 33-2, . . . , 33-N, the dampers excluding the N-th damper 33-N may sequentially move in the direction opposite to the closing direction DR from the first damper 33-1.

As described above, the operations in which the individual dampers included in the plurality of dampers 33-1, 33-2, . . . , 33-N move may, in the case in which the individual dampers move in the closing direction DR, produce a result in which the connection flow path CP is closed and may, in the case in which the individual dampers move in the direction opposite to the closing direction DR, produce a result in which the connection flow path CP is open.

The processor 51 may be electrically connected to driving sources of the power transmission members G1 and G2. The processor 51 may be configured to determine the positions of the plurality of dampers 33-1, 33-2, . . . , 33-N and, based on the determined positions of the plurality of dampers 33-1, 33-2, . . . , 33-N, control driving of the driving sources of the power transmission members G1 and G2. For example, the processor 51 may determine the positions of the plurality of dampers 33-1, 33-2, . . . , 33-N based on the operation modes 1A, 1B, and 1C of the air cleaner 1 and the flow rate or flow velocity of air determined to be introduced into the second flow path P2.

For example, the processor 51 may be configured to determine positions at which the plurality of dampers 33-1, 33-2, . . . , 33-N open the connection flow path CP or positions at which the plurality of dampers 33-1, 33-2, . . . , 33-N close the connection flow path CP as the positions of the plurality of dampers 33-1, 33-2, . . . , 33-N.

Alternatively, for example, the processor 51 may be configured to determine the positions at which the plurality of dampers 33-1, 33-2, . . . , 33-N open the connection flow path CP, the positions at which the plurality of dampers 33-1, 33-2, . . . , 33-N close the connection flow path CP, or positions at which the plurality of dampers 33-1, 33-2, . . . , 33-N open a portion of the connection flow path CP and close the other portion thereof as the positions of the plurality of dampers 33-1, 33-2, . . . , 33-N.

The configurations described above are only one example of the dampers provided to control the flow rate and flow velocity of air introduced into the second flow path through the connection flow path in the air cleaner according to the spirit of the present disclosure, and the spirit of the present disclosure is not limited thereto.

Although FIG. 20 is illustrated while assuming that the plurality of dampers 33-1, 33-2, . . . , 33-N are closed when moved counterclockwise based on FIG. 20 and are open when moved clockwise, the present disclosure is not limited thereto. For example, the dampers 33-1, 33-2, . . . , 33-N may also be configured to be closed when moved clockwise based on FIG. 20 and be open when moved counterclockwise.

Unlike in FIG. 20, the power transmission members G1 and G2 configured to transmit power to the dampers 33-1, 33-2, . . . , 33-N may also be provided at the duct body 31 side.

Although the configuration in which the dampers 33-1, 33-2, . . . , 33-N are provided inside the intermediate duct 30 and provided to open and close the connection flow path CP has been described above as an example, the present disclosure is not limited thereto. For example, the dampers 33-1, 33-2, . . . , 33-N may also be provided inside the second air cleaning unit 20 and provided to open and close the second flow path P2.

Meanwhile, description has been given above with reference to FIGS. 1 to 20 while assuming that the intermediate duct 30 of the air cleaner 1 according to one embodiment of the present disclosure is a configuration distinguished from the first air cleaning unit 10 and the second air cleaning unit 20 and is a configuration connecting the first housing 110 and the second housing 210.

However, unlike this, the intermediate duct according to the spirit of the present disclosure may be one configuration of the first air cleaning unit 10 or the second air cleaning unit 20. Here, the intermediate duct may be construed as one configuration forming the exterior of the first air cleaning unit 10 together with the first housing 110 or one configuration forming the exterior of the second air cleaning unit 20 together with the second housing 210. Alternatively, the intermediate duct may be construed as one configuration forming the connection flow path CP configured to connect the first air cleaning unit 10 and the second air cleaning unit 20 and provided between the first flow path P1 and the second flow path P2.

Embodiments of the present disclosure may provide an air cleaner including a first air cleaning unit including a first suction port, a first discharge port, a first flow path configured to extend from the first suction port to the first discharge port, a first fan provided in the first flow path, and a dust collector filter provided in the first flow path, a second air cleaning unit coupled to the first air cleaning unit and including a second suction port, a second discharge port, a second flow path configured to extend from the second suction port to the second discharge port and communicate with the first flow path, a second fan provided in the second flow path, and a light source provided in the second flow path and configured to radiate ultraviolet rays to the second flow path, a discharge flow path configured to extend from at least one portion of the first discharge port and provided so that, in a state in which the first fan is driven, air flowing along the first flow path is discharged to an outside of the first air cleaning unit and the second air cleaning unit, and a connection flow path configured to extend from at least another portion of the first discharge port to the second suction port to connect the first flow path and the second flow path and provided so that, in a state in which the second fan is driven, air in the first flow path is introduced into the second flow path.

The air cleaner may further include an intermediate duct configured to have the connection flow path formed therein. The first air cleaning unit may include a first housing configured to form an exterior of the first air cleaning unit. The second air cleaning unit may include a second housing configured to form an exterior of the second air cleaning unit. The intermediate duct may be connected to each of an upper portion of the first housing and a lower portion of the second housing.

The air cleaner may further include a discharge flow path guide disposed to face the first discharge port outside the first air cleaning unit and configured to cover one side of the discharge flow path. The discharge flow path guide may be provided to guide air flowing along the discharge flow path.

The first flow path, the second flow path, and the connection flow path may extend in directions parallel to each other.

Embodiments of the present disclosure may provide an air cleaner including a first housing configured to have a first flow path formed therein, a second housing configured to have a second flow path, branched from the first flow path, formed therein, a first fan provided in the first flow path, a first fan drive electrically connected to the first fan, an electrostatic dust filter provided in the first flow path and configured to collect dust using an electrostatic force, a second fan provided in the second flow path, a second fan drive electrically connected to the second fan, a light source provided in the second flow path and provided to radiate ultraviolet rays to a radiation area in the second flow path, and a processor configured to control an operation of each of the first fan drive, the second fan drive, the electrostatic dust filter, and the light source. The processor may be configured to apply power to the electrostatic dust filter in a first operation in which the processor controls the first fan drive to rotate the first fan and may be configured to control the light source to radiate the ultraviolet rays to the radiation area in a second operation in which the processor controls the second fan drive to rotate the second fan.

Meanwhile, a control method of the above-described air cleaner may be implemented in the form of recording media storing computer-executable instructions. The instructions may be stored in the form of program codes and may, when executed by a processor, generate a program module to perform operations of the disclosed embodiments. The recording media may be implemented as computer-readable recording media.

The computer-readable recording media include all kinds of recording media in which computer-readable instructions are stored. Examples of the computer-readable recording media may include a read-only memory (ROM), a random-access memory (RAM), a magnetic tape, a magnetic disk, a flash memory, an optical data storage device, and the like.

Device-readable storage media may be provided in the form of non-transitory storage media. Here, "non-transitory" only indicates that the storage media are tangible devices and do not contain signals (e.g., electromagnetic waves), and this term does not distinguish between a case in which data is semi-permanently stored in storage media and a case in which data is temporarily stored. For example, "non-transitory storage media" may include a buffer in which data is temporarily stored.

According to one embodiment, control methods of the air cleaner according to various embodiments disclosed in this document may be provided by being included in computer program products. The computer program products may be traded between sellers and buyers as commodities. The computer program products may be distributed in the form of device-readable storage media (e.g., a compact disc read-only memory (CD-ROM)) or may be, through an application store (e.g., Play Store™) or between two different user devices (e.g., smartphones), directly distributed (e.g., downloaded or uploaded) online. In the case of online distribution, at least a part of the computer program products (e.g., downloadable apps) may be at least temporarily stored in device-readable storage media such as a server of a manufacturer, a server of an application store, or a memory of a relay server or may be temporarily generated.

According to the spirit of the present disclosure, by including a dust collector filter provided in a first flow path in a first housing and a light source provided in a second flow path in a second housing, an air cleaner can improve air purification efficiency.

According to the spirit of the present disclosure, since an air cleaner includes a connection flow path configured to connect a first flow path and a second flow path and a discharge flow path through which air is discharged to the outside of the air cleaner, an air flow path can be configured in various ways.

According to the spirit of the present disclosure, since an air cleaner includes a first air cleaning unit in which a first flow path is provided and a second air cleaning unit in which a second flow path is provided, and the first air cleaning unit and the second air cleaning unit include a first fan and a second fan, respectively, operations of the first air cleaning unit and the second air cleaning unit can be selectively controlled.

Advantageous effects according to the spirit of the present disclosure are not limited to those mentioned above, and other unmentioned advantageous effects should be clearly understood by those of ordinary skill in the art to which the present disclosure pertains from the description above.

Specific embodiments illustrated in the drawings have been described above. However, the present disclosure is not limited to the embodiments described above, and those of ordinary skill in the art to which the disclosure pertains may make various changes thereto without departing from the gist of the technical spirit of the disclosure defined in the claims below.

What is claimed is:

1. An air cleaner comprising:
a first housing including a first suction port and a first discharge port;
a first flow path extending from the first suction port to the first discharge port inside the first housing;
a first fan in the first flow path and configured to be drivable so that air flows through the first flow path;
a dust collector filter in the first flow path;
a second housing including a second suction port and a second discharge port;
a second flow path extending from the second suction port to the second discharge port inside the second housing;
a second fan in the second flow path and configured to be drivable so that air flows through the second flow path;
a light source in the second flow path to radiate ultraviolet rays; and
a connection flow path extending from at least a first portion of the first discharge port to the second suction port and configured so that:
at least a first portion of air discharged from the first discharge port is introduced into the connection flow path and flows to the second flow path through the second suction port,
wherein a second portion of the air discharged from the first discharge port is discharged to an outside of the air cleaner.

2. The air cleaner of claim 1, further comprising:
a discharge flow path guide configured to guide a flow of the second portion of the air discharged from the first discharge port;
a guide opening formed between an outer edge of the discharge flow path guide and an outer edge of the first discharge port; and
a discharge flow path configured to have one side covered by the discharge flow path guide, and to extend from at least a second portion of the first discharge port toward the guide opening.

3. The air cleaner of claim 2, wherein
the discharge flow path is formed in a direction outward from an edge of the connection flow path.

4. The air cleaner of claim 2, wherein
the discharge flow path guide is arranged to face the first discharge port.

5. The air cleaner of claim 1, further comprising:
an intermediate duct configured to connect the first housing and the second housing,
wherein the connection flow path is inside the intermediate duct.

6. The air cleaner of claim 5, wherein
the intermediate duct is configured to cover the second suction port and the at least first portion of the first discharge port.

7. The air cleaner of claim 1, wherein:
the first housing includes:
a discharge port cover configured to cover the first discharge port,
the discharge port cover includes:
a central portion, and
an edge grille positioned along an outer edge of the central portion, and including a penetrated shape, and
the central portion includes:
a guide portion configured to extend from the edge grille toward the connection flow path to guide air from the edge grille to the connection flow path.

8. The air cleaner of claim 1, wherein:
the connection flow path and the second flow path are connected in a first direction, and
the second fan has a rotating shaft arranged to be parallel to a second direction orthogonal to the first direction.

9. The air cleaner of claim 8, wherein
the second fan is configured so that air is discharged toward the light source in a direction orthogonal to the second direction.

10. The air cleaner of claim 1, wherein:
the light source extends in a first direction,
the second flow path includes a radiation area to which ultraviolet rays are radiated from the light source and which extends in the first direction to correspond to the light source, and
the air cleaner further comprises:
a reflective cover configured to extend in the first direction to correspond to the radiation area, and configured about the light source to reflect the ultraviolet rays radiated from the light source.

11. The air cleaner of claim 10, further comprising:
a light blocking member positioned at one side of the radiation area in the first direction in the second flow path, and configured to prevent the ultraviolet rays radiated from the light source from being incident on an outside of the radiation area.

12. The air cleaner of claim 11, wherein:
the light blocking member includes:
a plurality of grille portions, and
an air ventilation portion formed between the grille portions of the plurality of grille portions and configured to be penetrated to allow passage of air in the second flow path, and
each of the grille portions of the plurality of grille portions is formed so that a surface facing the grille portion adjacent thereto is inclined relative to the first direction.

13. The air cleaner of claim 11, wherein:

the light source includes:

a lamp body configured to extend in the first direction, and an electrode portion provided at an end of the lamp body in the first direction and configured to receive power applied thereto, and the light blocking member supports the electrode portion.

14. The air cleaner of claim 1, wherein:

the first flow path is configured so that, in a state in which the first fan is driven, air introduced from the first suction port flows in an up-down direction to be discharged to the first discharge port;

the second flow path is configured so that, in a state in which the second fan is driven, air introduced from the second suction port flows in the up-down direction to be discharged to the second discharge port; and the connection flow path is configured so that, in a state in which the first fan and the second fan are simultaneously driven, the at least first portion of the air discharged from the first discharge port flows in the up-down direction to be introduced into the second suction port.

\* \* \* \* \*